(12) United States Patent
Hatch

(10) Patent No.: US 9,437,230 B2
(45) Date of Patent: Sep. 6, 2016

(54) AND METHOD OF OPERATION OF MICRO-MILLIACTUATORS AND MICRO-MICROACTUATORS

(71) Applicant: MARVELL INTERNATIONAL LTD., Hamilton (BM)

(72) Inventor: Michael Hatch, Mountain View, CA (US)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 14/082,784

(22) Filed: Nov. 18, 2013

(65) Prior Publication Data
US 2014/0139953 A1 May 22, 2014

Related U.S. Application Data

(60) Provisional application No. 61/727,506, filed on Nov. 16, 2012.

(51) Int. Cl.
G11B 5/48 (2006.01)
G11B 5/60 (2006.01)

(52) U.S. Cl.
CPC ............. *G11B 5/4873* (2013.01); *G11B 5/483* (2015.09); *G11B 5/6058* (2013.01)

(58) Field of Classification Search
USPC ..................................................... 360/294.4
See application file for complete search history.

(56) References Cited

U.S. PATENT DOCUMENTS

| | | | |
|---|---|---|---|
| 6,781,791 B1 * | 8/2004 | Griffin et al. | 360/128 |
| 7,375,911 B1 * | 5/2008 | Li et al. | 360/75 |
| 8,134,279 B2 * | 3/2012 | Hawwa et al. | 310/318 |
| 8,437,100 B2 | 5/2013 | McCaslin et al. | |
| 8,760,798 B2 * | 6/2014 | Arisaka et al. | 360/97.19 |
| 2008/0229842 A1 | 9/2008 | Ohtsuka et al. | |
| 2009/0183359 A1 * | 7/2009 | Tsutsumi et al. | 29/603.07 |
| 2010/0142095 A1 * | 6/2010 | Zhu | G11B 5/4833 360/244 |
| 2010/0271729 A1 * | 10/2010 | Hong et al. | 360/55 |
| 2013/0107397 A1 * | 5/2013 | McCaslin et al. | 360/244.2 |

OTHER PUBLICATIONS

Banther, Michael, et al., "Optimal Strain Gauge Placement for an Instrumented Disk Drive Suspension", Proceedings of the American Control Conference; Philadelphia, Pennsylvania; Jun. 1998, 5 pgs.
Felix, Sarah, et al., "Strain Sensing With Piezoelectric Zinc Oxide Thin Films for Vibration Suppression in Hard Disk Drives", Proceedings of DSCC2008; 2008 ASME Dynamic Systems and Control Conference Oct. 20-22, 2008, Ann Arbor, Michigan, USA; DSCC2008-2206, (Oct. 22, 2008), 8 pgs.

(Continued)

*Primary Examiner* — Carlos E Garcia

(57) ABSTRACT

A micro-milliactuator, a micro-microactuator, an actuator arm assembly, a hard disk drive and a method for operation of the hard disk are provided. In accordance with one aspect, the actuator arm assembly includes an arm, a slider for reading and writing information to disk media in response to read/write signals, and an actuator selected from the group comprising a micro-milliactuator and a micro-microactuator. The actuator has the slider mounted thereon and supports it above the disk media. The actuator includes one or more piezoelectric actuators for horizontally shifting the slider in response to actuator control signals. The actuator further includes one or more sensors physically coupled thereto for vibration sensing, compensation and suppression, the one or more sensors generating sensor signals in response to sensed vibrations during operation, wherein the actuator control signals are generated at least partially in response to the sensor signals.

22 Claims, 62 Drawing Sheets

(56) References Cited

OTHER PUBLICATIONS

Kon, Stanley, et al., "Fabrication of Piezoelectric Sensors on Steel Substrates for Instrumented Suspensions", Computer Mechanics Laboratory, University of California, Berkeley, (Jan. 24, 2005), 5 pgs.

Oldham, Kenn, et al., "Fabrication and Optimal Strain Sensor Placement in an Instrumented Disk Drive Suspension for Vibration Suppression", Proceedings of the 2004 American Control Conference; Boston, Massachusetts Jun. 30-Jul. 2, 2004, (Jul. 2, 2004), 7 pgs.

* cited by examiner

AND METHOD OF OPERATION OF MICRO-MILLIACTUATORS AND MICRO-MICROACTUATORS

CLAIM OF PRIORITY

This patent application claims the benefit of priority to U.S. Provisional Patent Application No. 61/727,506, filed 16 Nov. 2012, which is hereby incorporated by reference in its entirety.

FIELD OF THE INVENTION

The present invention generally relates to hard disk drives and actuators for such hard disk drives, and more particularly relates to milliactuators and microactuators and methods for precision operation of such actuators.

BACKGROUND OF THE DISCLOSURE

Mobile computing and/or communication devices are becoming smaller thereby driving the weight and size of data storage devices down. In a typical hard disk drive, the rotary voice coil actuator, including a voice coil, pivot bearing, E-block and suspensions, support the sliders with embedded read/write elements as they fly over the rotating disk in order to read information from and store information onto the disk medium. Thinner hard drive actuators can use a stainless steel arm to which a mount plate or suspension assembly is welded, creating a "unimount" arm/suspension assembly, instead of using an E-block.

As the number of tracks per inch (TPI) for drives increases, it is necessary to improve the accuracy of the servo-mechanical system that is following the servo information embedded on each track of the disk.

There are two common methods of improving track-following accuracy, using milliactuators and using microactuators, each in a two-stage servo-mechanical system. The "coarse" actuation arises from exciting the voice coil, rotating the entire actuator, while the "fine" actuation arises from moving either the complete loadbeam/slider assembly (milliactuator) or translating or rotating only the slider (microactuator).

Milliactuators typically interpose a pair of piezoelectric actuators between the end of the arm and the loadbeam, such that expanding one piezoelectric actuator while contracting the other causes the loadbeam to rotate, displacing the slider at the end of the loadbeam. Because the inertia of the rotating portion of the loadbeam is smaller than the entire voice-coil actuator and has higher frequency resonances, it enhances the ability of the servo to follow more accurately.

Microactuators typically move or rotate only the slider or a portion of the slider. Since the slider is much less massive than the loadbeam, moving or rotating only the slider allows much better accuracy in following the tracks than does a milliactuator because fewer actuator and arm modes are excited. From a performance standpoint microactuators are preferred over milliactuators because they provide higher frequency resonance characteristics. However, microactuators involve very small, very precise parts that are more expensive to assemble and manufacture than the parts required for a milliactuator.

This leads to the need for a smaller milliactuator, one that uses less expensive components than microactuators and uses existing milliactuator manufacturing processes, but which can provide improved dynamics and hence improved servo-mechanical accuracy. Yet, as said before, with TPI for drives increasing, it is imperative to improve the accuracy of the servo-mechanical system that is following the servo information embedded on each track of the disk.

Thus, there is a need for apparati and methods for vibration compensation and suppression to improve the accuracy of track following in hard disk drives for both milliactuators and microactuators. Furthermore, other desirable features and characteristics will become apparent from the subsequent detailed description and the appended claims, taken in conjunction with the accompanying drawings and this background of the disclosure.

SUMMARY

According to the Detailed Description, a micro-milliactuator is provided. The micro-milliactuator includes a piezoelectric actuator mount plate, one or more piezoelectric actuators, a suspension loadbeam, a suspension flexure, and one or more sensors. The one or more piezoelectric actuators are mounted in the piezoelectric actuator mount plate for rotating the micro-milliactuator suspension loadbeam in response to control signals. The suspension loadbeam is coupled to the piezoelectric actuator mount plate at a first end and mounts a slider at a second end opposite the first end. The suspension flexure is physically coupled to the suspension loadbeam and carries a plurality of conductive traces. Some of the plurality of conductive traces provide data signals via flexure legs to the slider. The one or more sensors are coupled to the suspension flexure and the suspension loadbeam for vibration compensation and suppression by generating sensor signals in response to sensed vibrations during operation and providing the sensor signals to corresponding ones of the plurality of conductive traces for generation of the control signals, the control signals including voice coil motor coarse control signals and micro-milliactuator fine control signals.

In accordance with another aspect, a micro-microactuator is provided. The micro-microactuator includes a suspension loadbeam, a suspension flexure, a flexure tongue to which is mounted one or more piezoelectric actuators, and one or more sensors. The suspension flexure is physically coupled to the suspension loadbeam and carries a plurality of conductive traces. Some of the plurality of conductive traces provide data signals via conductive traces on the flexure legs to a slider. The flexure tongue is coupled to the flexure legs and the slider is mounted thereon. The one or more piezoelectric actuators are mounted in the flexure tongue for rotating the slider in response to control signals. And the one or more sensors are coupled to the suspension flexure and the suspension loadbeam for vibration compensation and suppression by generating sensor signals in response to sensed vibrations during operation and providing the sensor signals to corresponding ones of the plurality of conductive traces for generation of the control signals, the control signals including voice coil motor and micro-microactuator control signals.

In accordance with a further aspect, an actuator arm assembly is provided. The actuator arm assembly includes an arm, a slider for reading and writing information to disk media in response to data signals, and a fine actuator selected from the group comprising a micro-milliactuator and a micro-microactuator. The fine actuator has the slider mounted thereon and supports it above the disk media. The fine actuator includes one or more piezoelectric actuators for translating or rotating the slider in response to fine actuator control signals. The fine actuator further includes one or more sensors physically coupled thereto for vibration compensation and suppression, the one or more sensors generating sensor signals in response to sensed vibrations during operation, wherein the fine actuator control signals are generated at least partially in response to the sensor signals.

In accordance with yet another aspect, a hard disk drive is provided. The hard disk drive includes a disk media for storing information on tracks identified thereon and a motor for rotating the disk media. The hard disk drive further includes an actuator assembly for flying a slider mounted on the assembly above the disk media, the slider locatable above an identified track in response to coarse control signals controlling a rotating coil for rotating the actuator assembly and in response to the fine control signals controlling translation or rotation of the slider by activating one or more piezoelectric actuators. The hard disk drive also includes a controller for generating the coarse and fine control signals in response to location information corresponding to the identified track and sensor signals received from one or more sensors physically coupled to the actuator assembly for vibration compensation and suppression, the sensor signals generated in response to vibrations sensed by the one or more sensors during operation of the hard disk drive.

And in accordance with a further aspect, a method for controlling a hard disk drive actuator assembly is provided. The method includes the steps of determining location information corresponding to a location on a disk media for performing a read or write operation and generating coarse and fine actuator control signals for locating a slider mounted on the actuator assembly above an identified track of the disk media in response to the location information. The method further includes providing motor control signals to a motor coupled to the disk media for rotating the disk media and providing the coarse and fine actuator control signals to the actuator assembly for rotation of the actuator assembly by a rotating coil and rotation or translation of the slider by one or more piezoelectric actuators, the coarse and fine actuator control signals modified during operation of the actuator assembly in response to sensor signals for vibration compensation and/or suppression, the sensor signals being received from one or more sensors physically coupled to the actuator assembly for sensing vibrations during operation.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present invention.

FIG. 5, comprising FIGS. 5A and 5B, illustrate views of a micro-milliactuator in accordance with present embodiments, wherein FIG. 5A depicts a top front left perspective view of a micro-milliactuator with unimount arm in accordance with the present embodiment and FIG. 5B depicts a top front left perspective view of a micro-milliactuator with E-block arm in accordance with the present embodiment.

FIG. 14, comprising FIGS. 14A and 14B, illustrate a loadbeam piezoelectric sensor attachment in accordance with an aspect of the present embodiment, wherein FIG. 14A depicts a top front left perspective view of the micro-milliactuator suspension of FIG. 7 highlighting optional loadbeam slots in accordance with the aspect of the present embodiment, and FIG. 14B depicts a cross-section planar view of a loadbeam piezoelectric sensor attachment in accordance with the aspect of the present embodiment.

FIG. 26, comprising FIGS. 26A, 26B and 26C, illustrate views of micro-microactuators mounted on a unimount arm and on actuator assemblies in accordance with the present embodiments, wherein FIG. 26A depicts a top front left perspective view of a micro-microactuator mounted on a unimount arm in accordance with the present embodiment, FIG. 26B depicts a micro-microactuator with unimount arm actuator assembly for double-sided disk reading and writing in accordance with the present embodiment, and FIG. 26C depicts a top front left perspective view of a micro-microactuator with E-block arm in accordance with the present embodiment.

FIGS. 67A and 67B, depicts perspective views of a micro-milliactuator mounted on a unimount arm in accordance with an alternate embodiment, wherein FIG. 67A is a top, front, left perspective view of the micro-milliactuator in accordance with the alternate embodiment and FIG. 67B is a bottom, front, left perspective view of the micro-milliactuator in accordance with the alternate embodiment.

FIG. 68, comprising FIGS. 68A and 68B, depicts bottom, front, left perspective views of the micro-milliactuator mounted on a unimount arm focused on the flexure piezoelectric sensors in accordance with the alternate embodiment of FIG. 67, wherein FIG. 68A is a view of the loadbeam with flexure structure attached thereto and FIG. 68B is a view of the flexure structure alone.

Skilled artisans will appreciate that elements in the figures are illustrated for simplicity and clarity and have not necessarily been drawn to scale. For example, the dimensions of some of the elements in the figures illustrating actuator arm structure and/or hard disk drive designs may be exaggerated relative to other elements to help to improve understanding of the present and alternate embodiments.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In hard disk drives, the actuator assembly rotates about its pivot to locate the recording head (mounted at one end of the actuator arm to allow it to "fly" over the disk) over a particular location on a particular track for writing information to and/or reading information from such location. Some hard disk drives have a two-sided disk medium which allows writing to and reading from tracks on both sides of the disk medium. In such cases, there will be a dual arm construction which will have separate sliders "flying" over each side of the disk medium. In addition, some hard disks include multiple two-sided disk medium and use a multiple-arm E-block arm construction (as discussed hereinbelow) for mounting four or more sliders to "fly" over each side of the multiple disks.

Conventional actuator arm structures include either milliactuators or microactuators mounted on either a unimount arm construction (a single milli- or microactuator mounted on the unimount arm or two milli- or microactuators dually mounted on the unimount arm) or an E-block arm construction with multiple milli- or microactuators mounted thereon.

Figure 1:
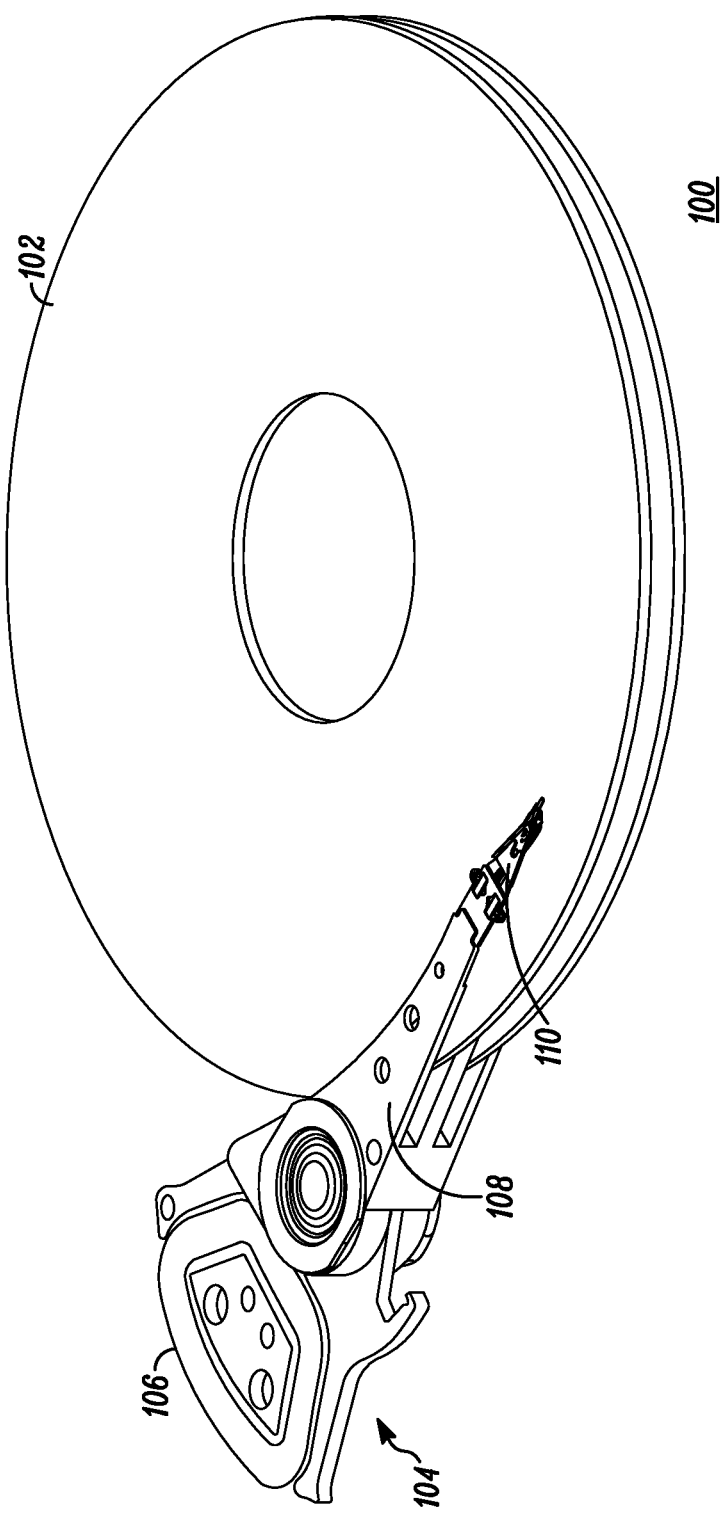
FIG. 1 depicts a top front left perspective view of a hard disk drive (HDD) including an actuator assembly, a disk and micro- or milliactuators attached to the actuator arm ends.

Referring to FIG. 1, a top front left perspective view 100 of an exemplary hard disk drive (HDD) includes disks 102 and a unimount actuator assembly 104 positioned over the disk 102. The unimount actuator assembly 104 includes a voice coil 104, the rotating portion of a Voice Coil Motor (VCM), for rotating an arm 108 of the unimount actuator assembly 104 over the disk 102. One or more milliactuator(s) 110 are attached to an end of the arm 108 opposite the coil motor 106. As hard disk drives shrink in size and the density of information stored on the disk media increases, the size of conventional milliactuators are ill equipped to support and guide the slider for accurate reading and writing of information from the disk media. While microactuators (e.g., a microactuator 110 instead of the milliactuator 110 pictured) are fit for such low profile, high density hard disk drive applications, manufacturing of microactuators is more expensive and time consuming than milliactuators.

Figure 2:
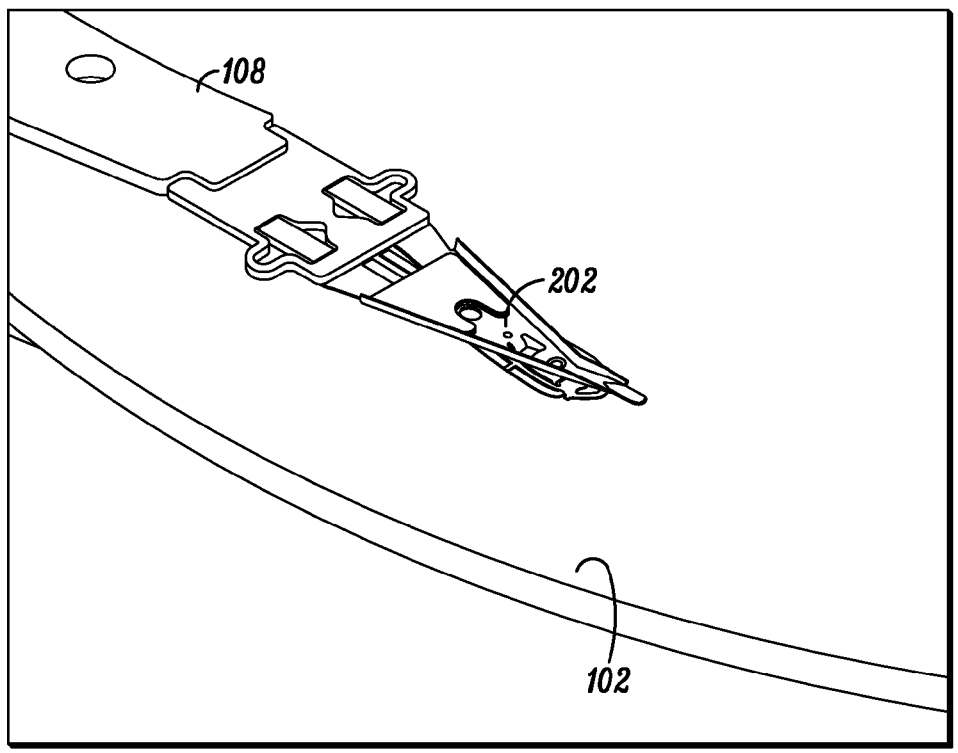
FIG. 2 depicts a top front left perspective view of a milliactuator flying over the disk of FIG. 1.

The present embodiment presents a micro-milliactuator arm and a micro-microactuator arm. The micro-milliactuator arm assembly includes an arm, a piezoelectric actuator mount plate, a suspension loadbeam, a suspension flexure and a slider wherein the micro-milliactuator suspension is designed to have reduced inertia as compared to a standard milliactuator. It also has a tab design feature for the mount plate/arm interface which enables laser weld or adhesive attachment of the two. The micro-milliactuator also has a flexure-mounted piezoelectric sensor design and/or a loadbeam-mounted piezoelectric sensor design to sense vibration modes during operation for vibration compensation and suppression. Another benefit of the micro-milliactuator over the milliactuator is that the smaller size leads to higher resonant frequencies, benefiting the dynamic performance of the system. Referring to FIG. 2, a top front left perspective view 200 depicts a magnified view of the arm 108 flying over the disk 102 and having a micro-milliactuator 202 mounted thereon.

The micro-microactuator includes a suspension loadbeam, a suspension flexure, a flexure tongue to which is mounted one or more piezoelectric actuators, and one or more piezoelectric sensors. The one or more sensors are mounted on the suspension flexure and/or the suspension loadbeam for vibration compensation and suppression by generating sensor signals in response to sensed vibrations during operation and providing sensor signals for generation of voice coil motor and micro-microactuator control signals for control. As with the micro-milliactuator, the smaller size of the micro-microactuator leads to higher resonant frequencies, benefiting the dynamic performance of the system.

In accordance with the present embodiments, location information corresponding to a location on a disk media for performing a read or write operation is used to generate coarse and fine actuator control signals for locating a slider mounted on the actuator arm assembly above an identified location on the disk media. The coarse actuator control signals are used to control the rotation of the actuator arm assembly by a voice coil at one end thereof. The fine actuator control signals are used for horizontal movement of the micro-milliactuator or micro-micro-actuator above the disk media in response to offtrack error as determined from a position error signal (PES) and vibration sensing information determined from the piezoelectric sensors. More specifically, the coarse and fine actuator control signals are modified during operation of the actuator assembly in response to sensor signals for vibration compensation and suppression, the sensor signals being received from one or more piezoelectric sensors physically coupled to the micro-milliactuator or micro-microactuator for sensing vibrations of the arms, disks, and fine actuators during operation.

Figure 3:
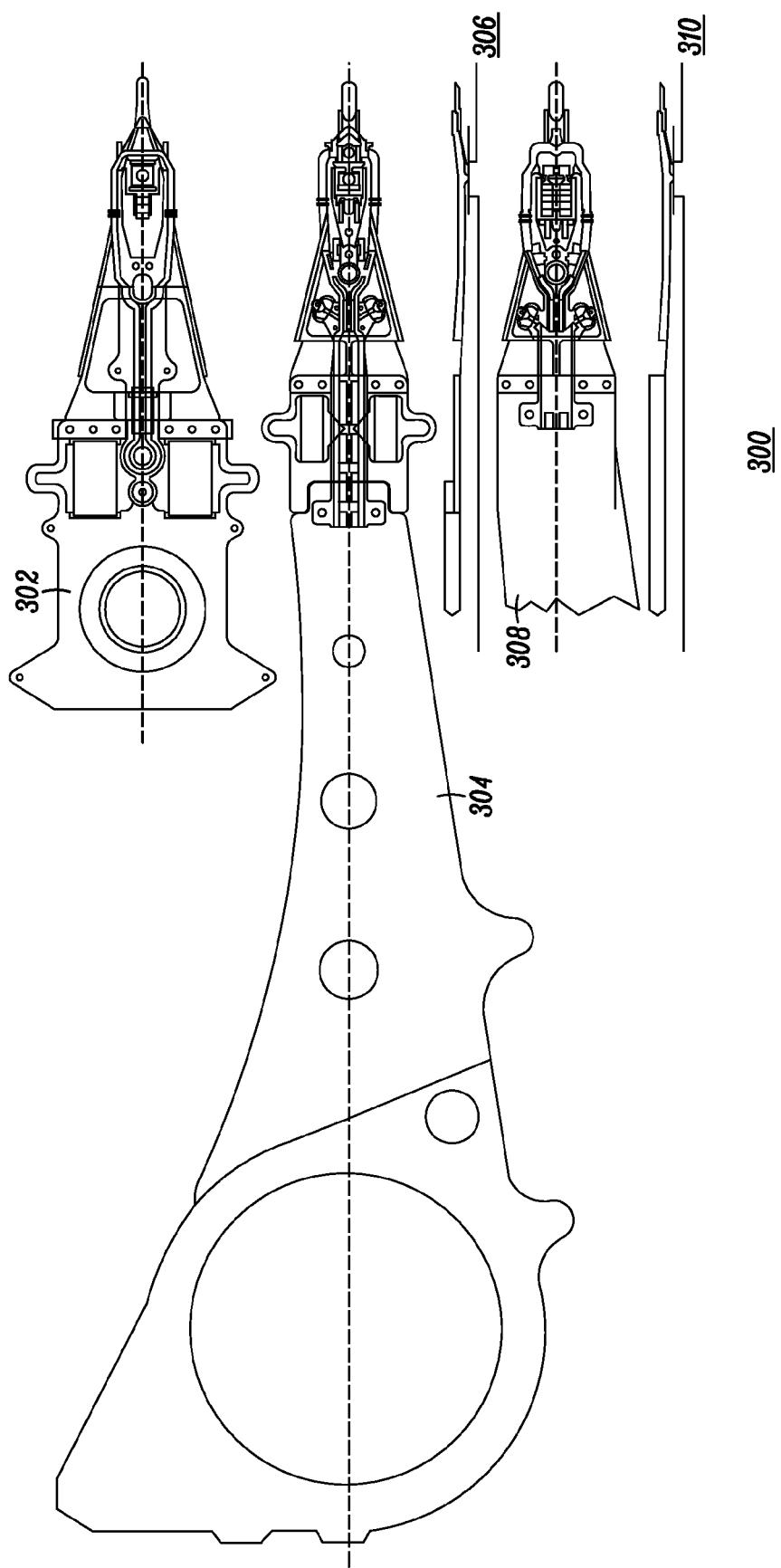
FIG. 3 illustrates a top planar view of a prior art milliactuator as compared to top and side planar views of a micro-milliactuator in accordance with one aspect of a present embodiment and a micro-microactuator in accordance with another aspect of the present embodiment.

Referring to FIG. 3, a side-by-side same-scaled comparison view 300 illustrates a top planar view 302 of a prior art milliactuator as compared to a top planar view 304 and a side planar view 306 of a micro-milliactuator in accordance with one aspect of a present embodiment and a top planar view 308 and a side planar view 310 of a micro-microactuator in accordance with another aspect of the present embodiment. The top planar view 302 depicts the conventional milliactuator suspension loadbeam for suspending the slider above the disk medium. The top and side planar views 304, 306 depict same-scaled views of the micro-milliactuator in accordance with the present embodiment as mounted on a unimount arm. Note that the suspension loadbeam is smaller than the conventional milliactuator suspension loadbeam. The top and side planar views 308, 310 depict same-scaled views of the micro-microactuator in accordance with the present embodiment. Note that the micro-microactuator suspension loadbeam is the same size as the micro-milliactuator suspension loadbeam but the overall size is reduced as the mounting plate with the piezoelectric actuators is not present in the micro-microactuator as the piezoelectric actuators for the micro-microactuator are located under the loadbeam above the slider.

Figure 4:
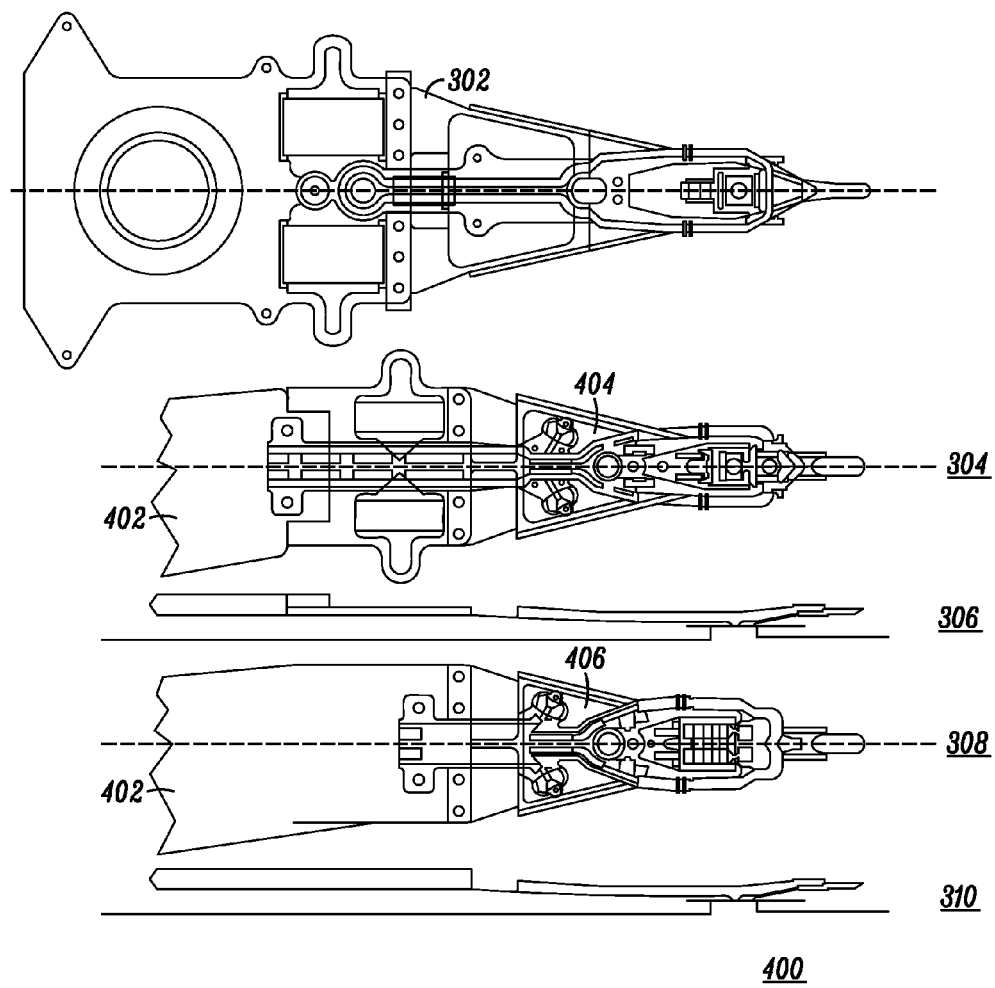
FIG. 4 illustrates magnified views of an end of the actuators depicted in FIG. 3, including a top planar view of the prior art milliactuator and top and side planar views of the micro-milliactuator and the micro-microactuator in accordance with aspects of the present embodiment.

FIG. 4 illustrates a collection 400 of magnified views of the end of the actuators depicted in FIG. 3, including the top planar view 302 of the prior art milliactuator, the top and side planar views 304, 306 of the micro-milliactuator, and the top and side planar views 308, 310 of the micro-microactuator in accordance with aspects of the present embodiment. In these views, the unimount arm 402 is similar for mounting the micro-milliactuator and the micro-microactuator. While the suspension loadbeam 404 for the micro-milliactuator is similar in size to the suspension loadbeam 406 for the micro-microactuator, the overall length of the micro-microactuator is shorter as it does not include the mounting plate with piezoelectric actuators shown in the micro-milliactuator views 304, 306.

Figure 5A:
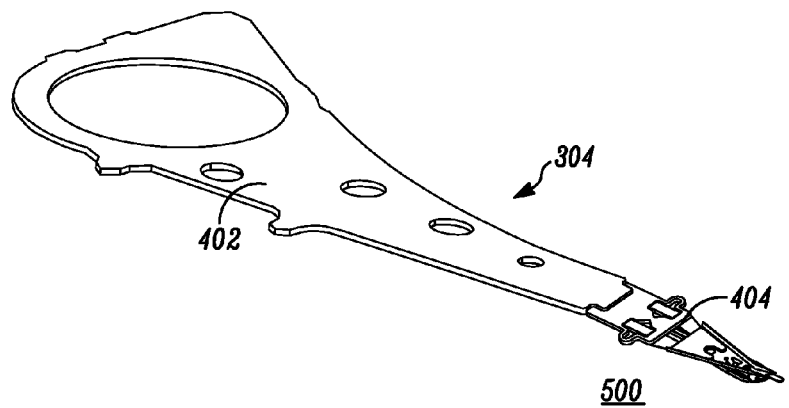
Figure 5B:
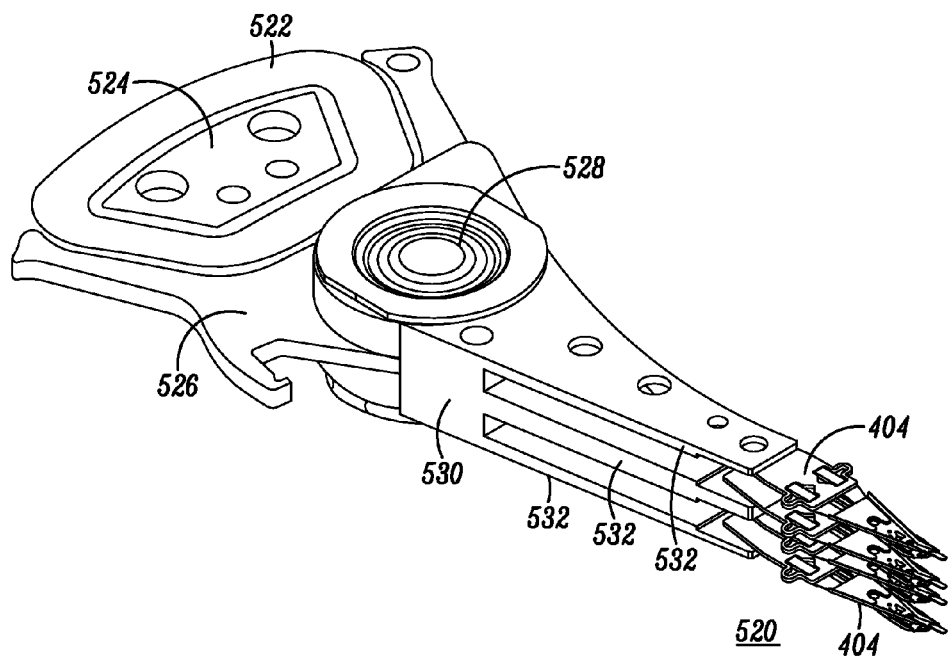

FIG. 5, comprising FIGS. 5A and 5B, illustrate views of a micro-milliactuator in accordance with present embodiments. FIG. 5A depicts a top front left perspective view 500 of an actuator arm assembly 304 including a unimount arm 402 having a micro-milliactuator 404 in accordance with the present embodiment mounted at an end thereof. FIG. 5B depicts a top front left perspective view 520 of micro-milliactuators 404 in accordance with the present embodiment mounted on an E-block arm. A coil 522 for a voice coil motor (VCM) surrounds a coil stiffener 524 and is supported at an end of the E-block arm opposite the micro-milliactuators 404 by an E-block actuator coil support 526. In response to actuator control signals, the coil 522 rotates the E-block arm around a pivot bearing cartridge 528 to fly the four recording heads of the four micro-milliactuators 404 over both sides of rotating disks (not shown) by rotating an E-block actuator 530. Three E-block actuator arms 532 are integrally connected to the E-block actuator 530 to give the E-block arm its distinctive "E-block" shape.

Figure 6:
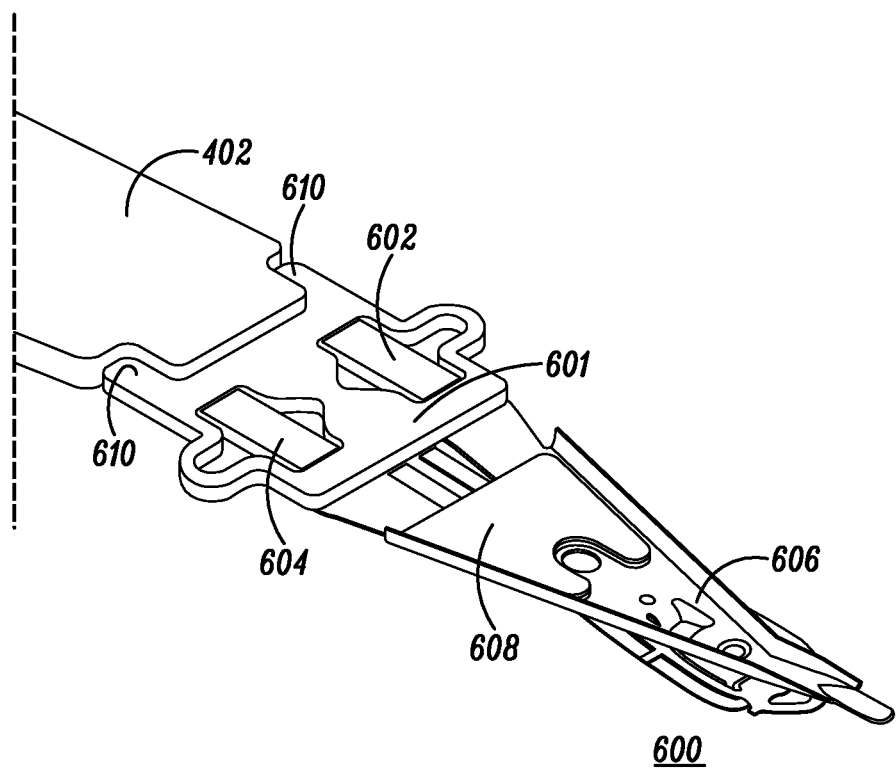
FIG. 6 depicts a top front left magnified perspective view of the micro-milliactuator of FIG. 5A showing the unimount arm and loadbeam in accordance with the present embodiment.

Referring to FIG. 6, a top front left magnified perspective view 600 of the micro-milliactuator 404 depicts the unimount arm 402 coupled to a suspension loadbeam 606 in accordance with the present embodiment by a piezoelectric actuator mount plate 601 including an inner diameter piezoelectric actuator 602 and an outer diameter piezoelectric actuator 604. Coarse actuator control signals rotate the actuator assembly by actuating a rotating coil (e.g., coil 522 (FIG. 5B)) and fine actuator control signals rotate the loadbeam by actuating the piezoelectric actuators 602, 604. A loadbeam damper 608 is mounted on the loadbeam 606 to dampen vibrations of the loadbeam 606 during operation. The piezoelectric actuator mount plate 601 further includes side tabs 610 for enabling laser weld or adhesive attachment of the piezoelectric actuator mount plate 601 to the unimount arm 402.

Figure 7:
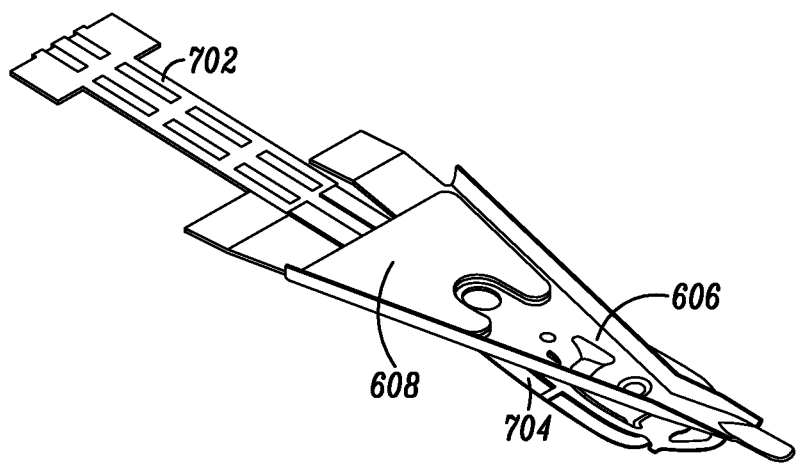
FIG. 7 depicts a top front left perspective view of a micro-milliactuator suspension of the micro-milliactuator of FIG. 5A in accordance with the present embodiment.

FIG. 7 depicts a top front left perspective view 700 of a micro-milliactuator suspension of the micro-milliactuator 404 in accordance with the present embodiment (i.e., the micro-milliactuator suspension which attaches to the piezoelectric actuator mount plate 601 (FIG. 6)). The micro-milliactuator suspension includes the suspension loadbeam 606 and a suspension flexure 702, the suspension flexure 702 having a plurality of conductive traces 704 mounted thereon. The conductive traces 704 are used for providing data signals such as read and write signals to a slider mounted on a bottom side of the suspension loadbeam 606 and actuator signals to the piezoelectric actuators 602, 604.

Figure 8:
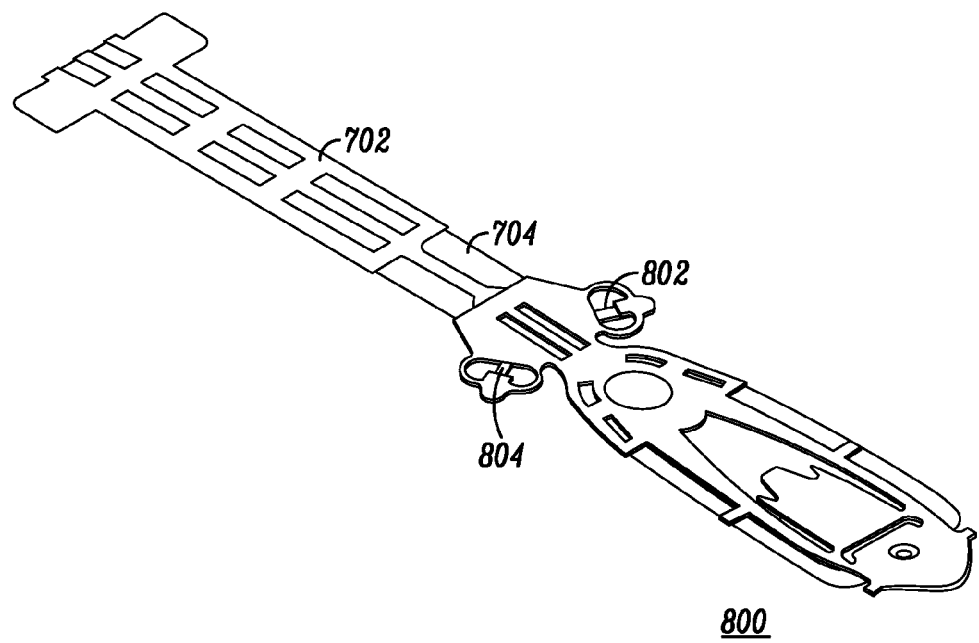
FIG. 8 depicts a top front left perspective view of a micro-milliactuator flexure of the micro-milliactuator of FIG. 5A in accordance with the present embodiment.

Referring to FIG. 8, a top front left perspective view 800 depicts the micro-milliactuator suspension flexure 702 without the suspension loadbeam 606. In accordance with the present embodiment, an inner diameter loadbeam piezoelectric sensor 802 and an outer diameter loadbeam piezoelectric sensor 804 are coupled to the conductive traces 704 to provide sensor signals generated in response to sensed vibrations during operation for micro-milliactuator vibration compensation and suppression.

Figure 9:
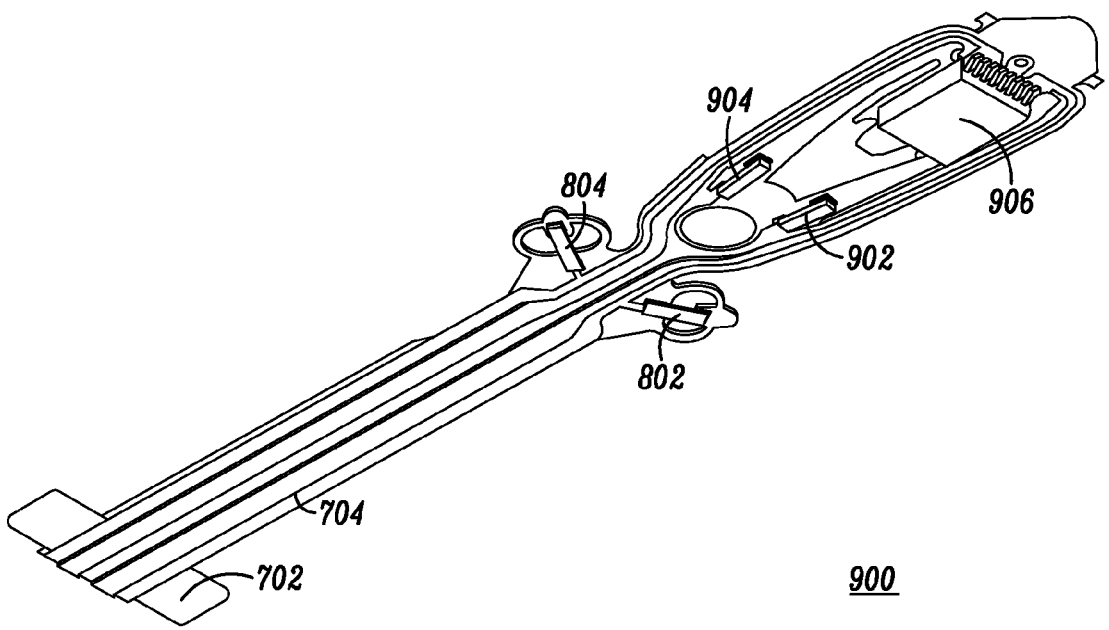
FIG. 9 depicts a bottom front left perspective view of the micro-milliactuator flexure of FIG. 8 showing flexure and loadbeam piezoelectric sensors in accordance with the present embodiment.
Figure 10:
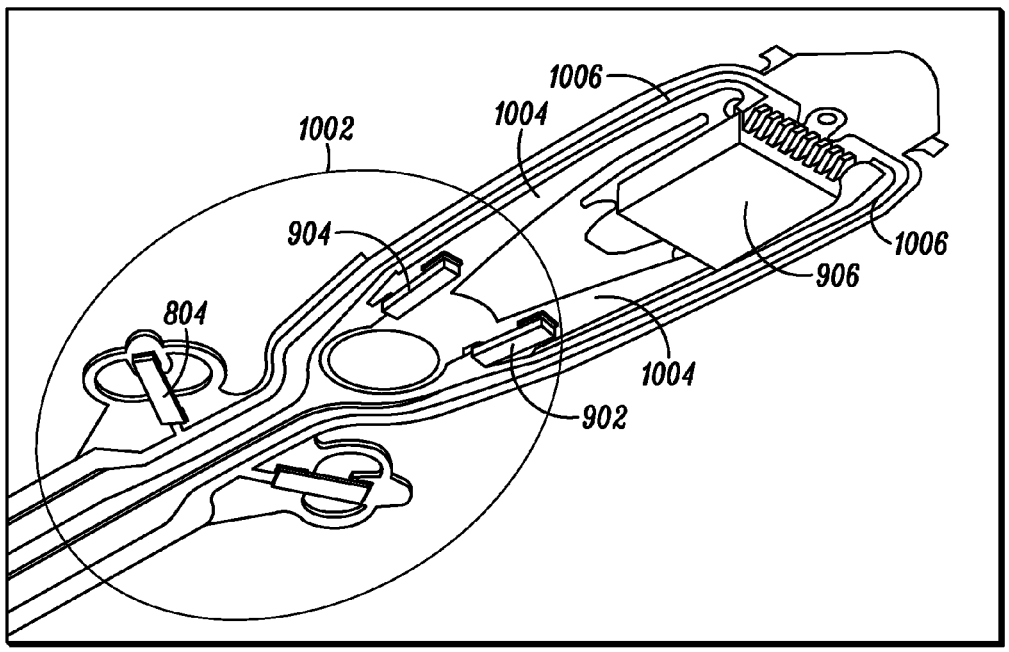
FIG. 10 depicts a bottom front left magnified perspective view of the micro-milliactuator flexure of FIG. 8 in accordance with the present embodiment, highlighting the location of the flexure and loadbeam piezoelectric sensors.

FIG. 9 depicts a bottom front left perspective view 900 of the suspension flexure 702 in accordance with the present embodiment. In addition to the inner and outer diameter loadbeam piezoelectric sensors 802, 804 which sense vibrations and strain in the loadbeam flexure 606 (FIG. 7), an inner diameter flexure piezoelectric sensor 902 and an outer diameter flexure piezoelectric sensor 904 sense strain and vibrations on the flexure 702 and provide sensor signals generated therefrom on the conductive traces 704 for vibration suppression and compensation. Also a recording head 906 for reading and writing data from and to the disk 102 (FIG. 2) is mounted on the bottom side of the suspension flexure 702. Referring to FIG. 10, a bottom front left perspective view 1000 provides a magnified perspective view of the front portion of the suspension flexure 702 including the loadbeam piezoelectric sensors 802, 804 and the flexure piezoelectric sensors 902, 904 in accordance with the present embodiment. A circle 1002 highlights a section of the suspension flexure 702 depicting mounting of the piezoelectric sensors 802, 804, 902, 904 in a manner which is similar for both the micro-milliactuator (FIG. 1000) and the micro-microactuator (discussed hereinbelow). Flexure legs 1006 carry the conductive traces 704 for read/write data signals to the slider 906.

Figure 11:
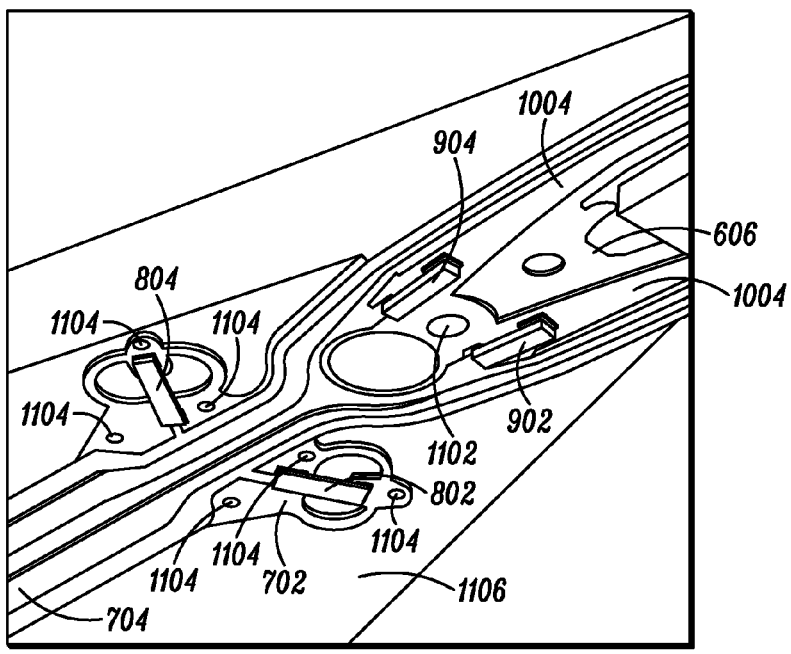
FIG. 11 depicts a bottom front left magnified perspective view of the micro-milliactuator flexure and loadbeam of the micro-milliactuator of FIG. 5 highlighting the loadbeam welds in accordance with the present embodiment.
Figure 12:
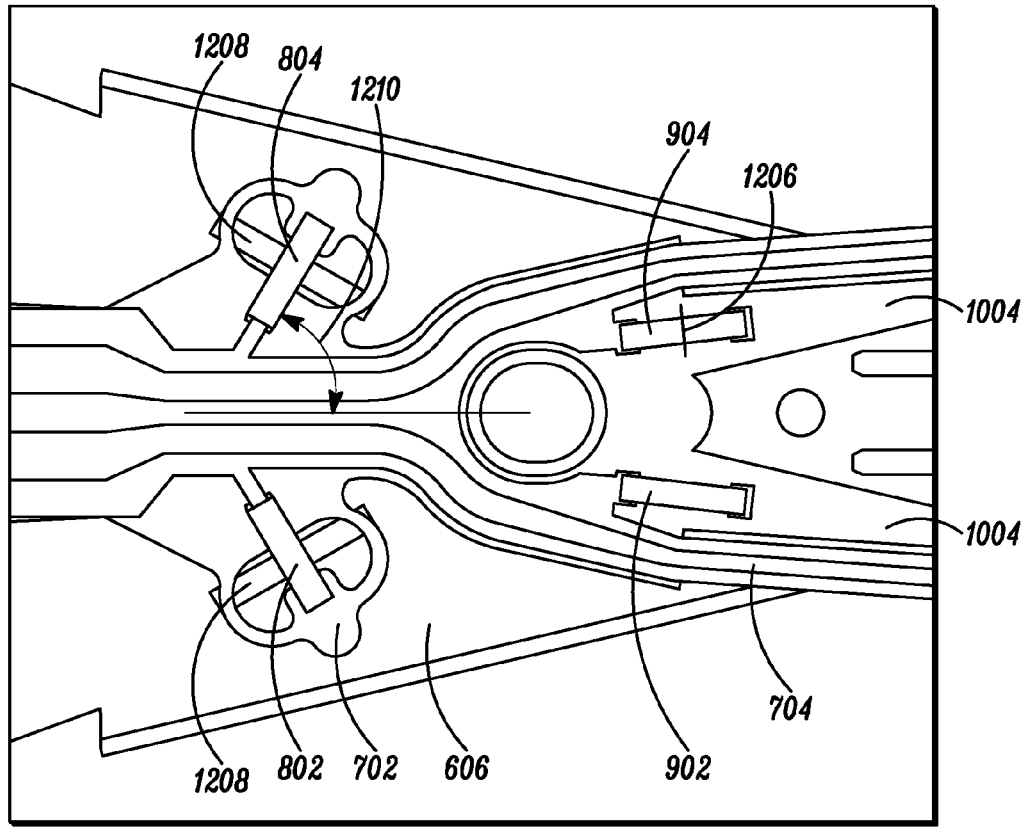
FIG. 12 depicts a magnified bottom planar view of the micro-milliactuator flexure and loadbeam of FIG. 11 highlighting piezoelectric sensor orientation in accordance with an aspect of the present embodiment.

FIG. 11 depicts a bottom front left magnified perspective view of the micro-milliactuator suspension flexure 702 and suspension loadbeam 606 of the micro-milliactuator 402 highlighting flexure/loadbeam welds 1102, 1104 in accordance with the present embodiment. The flexure piezoelectric sensors 902, 904 sense strain in the flexure legs 1004, such as bending of the flexure legs 1004, as the flexure/loadbeam weld 1102 firmly binds the suspension flexure 702 to the suspension loadbeam 606. The flexure/loadbeam welds 1104, however, couple the loadbeam strain of the suspension loadbeam 606 to stretching of the loadbeam piezoelectric sensors 802, 804. FIG. 12 depicts a magnified bottom planar view 1200 of the micro-milliactuator suspension flexure 702 and suspension loadbeam 606 of FIG. 11 highlighting piezoelectric sensor orientation in accordance with an aspect of the present embodiment. The flexure piezoelectric sensors 902, 904 are approximately aligned with centerlines of the flexure legs 1004. In addition, midpoints of the flexure piezoelectric sensors 902, 904 roughly correspond to the roots 1206 of the flexure legs 1004. As to orientation of the loadbeam piezoelectric sensors 802, 804, loadbeam optional slots 1208 in the suspension loadbeam 606 are located above the loadbeam piezoelectric sensors 802, 804 and perpendicular to the angles thereof. In the view 1200, a loadbeam piezoelectric sensor angle 1210 is substantially sixty degrees. The angle 1210 can be adjusted in the design of the micro-milliactuator in order to emphasize and/or de-emphasize particular vibration modes of the micro-milliactuator/arm system.

Figure 13:
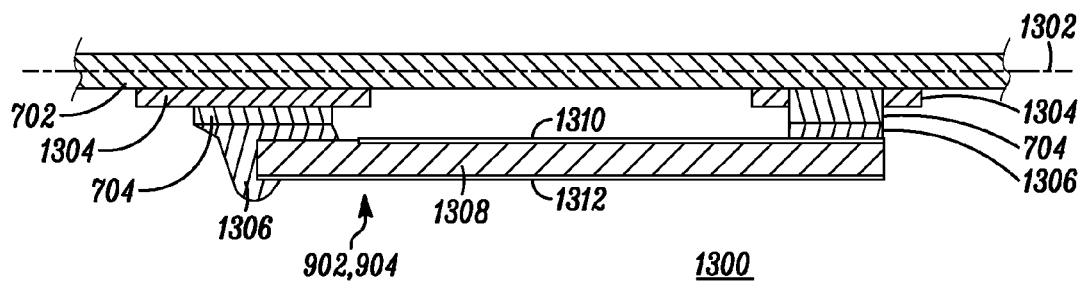
FIG. 13 depicts a cross-section planar view of a flexure piezoelectric sensor attachment in accordance with an aspect of the present embodiment.

FIG. 13 depicts a cross-section planar view 1300 of a construction of the flexure piezoelectric sensors 902, 904 and their attachment to the suspension flexure 702 in accordance with an aspect of the present embodiment. The suspension flexure 702 may comprise stainless steel and has a flexure neutral axis 1302 around which the vibrations and strains are sensed during operation. The conductive traces 704 may be active copper traces for carrying sensor signals generated by the flexure piezoelectric sensors 902, 904 and are separated on one side of the flexure piezoelectric sensors 902, 904 from the stainless steel suspension flexure 702 by a flexure insulator 1304. The conductive traces 704 on the other side of the flexure piezoelectric sensors 902, 904 are grounded to the suspension flexure 702 through the flexure insulator 1304. A conductive adhesive 1306 physically and electrically connects the flexure piezoelectric sensors 902, 904 to associated ones of the conductive traces 704. The flexure piezoelectric sensors 902, 904 may be a single or multiple layer piezoelectric device and are constructed by sandwiching single or multiple layers of piezoelectric material 1308 between a grounded piezoelectric conductor 1310 and an active piezoelectric conductor 1312 such that strain on the piezoelectric material 1308 will create a voltage differential between the grounded piezoelectric conductor 1310 and the active piezoelectric conductor 1312, causing a current to flow in the associated ones of the conductive traces 704.

Figure 14A:
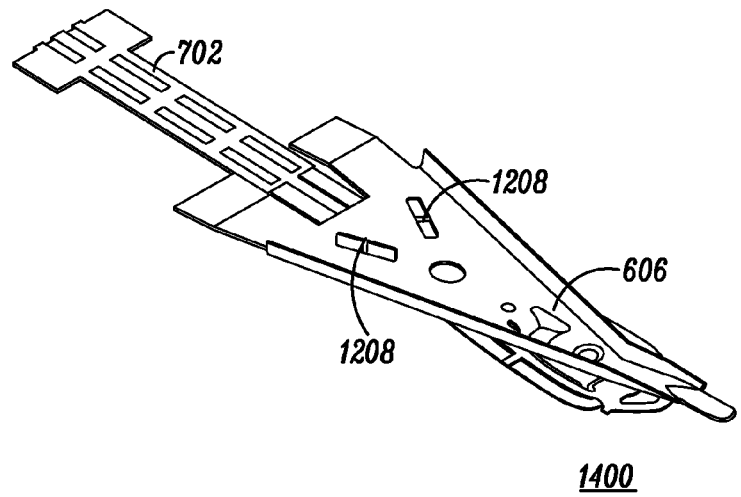
Figure 14B:
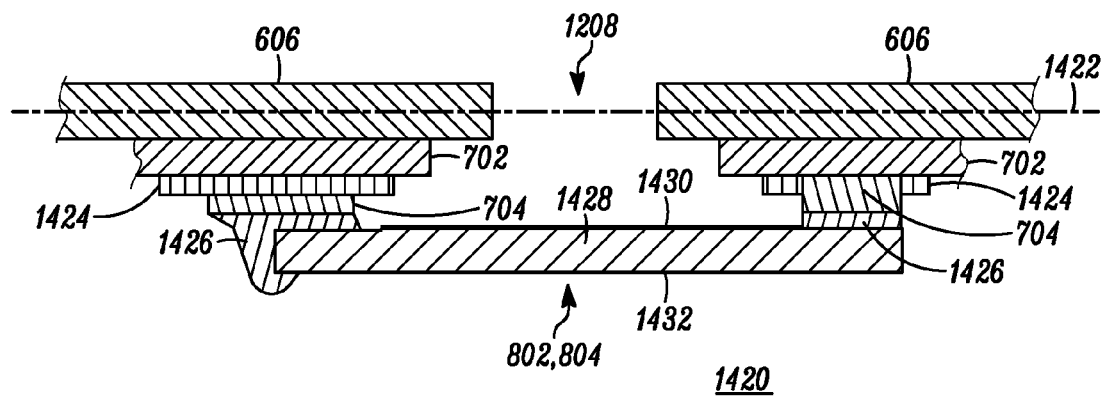

FIG. 14, comprising FIGS. 14A and 14B, illustrate structures of loadbeam piezoelectric sensors 802, 804 in accordance with another aspect of the present embodiment. FIG. 14A depicts a top front left perspective view 1400 of the micro-milliactuator suspension highlighting the optional loadbeam slots 1208 in the suspension loadbeam 606 in accordance with the aspect of the present embodiment. FIG. 14B depicts a cross-section planar view 1420 of the loadbeam piezoelectric sensors 802, 804 in accordance with the aspect of the present embodiment. The suspension loadbeam 606 may comprise stainless steel and has a loadbeam neutral axis 1422 about which the vibrations and strains are sensed during operation. The optional loadbeam slots 1208 are located over and perpendicular to the loadbeam piezoelectric sensors 802, 804 for coupling strain of the suspension loadbeam 606 to stretching of the loadbeam piezoelectric sensors 802, 804. The optional loadbeam slots allow more loadbeam strain to be sensed than without the slots and are small enough not to affect the primary function of the loadbeam. The suspension flexure 702 may also comprise stainless steel and is physically connected (e.g., by the loadbeam welds 1104 (FIG. 11)) and electrically connected to the suspension loadbeam 606. The conductive traces 704 may be active copper traces for carrying sensor signals generated by the flexure piezoelectric sensors 902, 904 and are separated on one side of the loadbeam piezoelectric sensors 802, 804 from the stainless steel suspension flexure 702 by a flexure insulator 1424. The conductive traces 704 on the other side of the loadbeam piezoelectric sensors 802, 804 are grounded to the suspension flexure 702 through the flexure insulator 1424. A conductive adhesive 1426 physically and electrically connects the loadbeam piezoelectric sensors 802, 804 to associated ones of the conductive traces 704. The loadbeam piezoelectric sensors 802, 804 may be a single or multiple layer piezoelectric device and are constructed by sandwiching single or multiple layers of piezoelectric material 1428 between a grounded piezoelectric conductor 1430 and an active piezoelectric conductor 1432 such that stretching of the piezoelectric material 1428 will create a voltage differential between the grounded piezoelectric conductor 1430 and the active piezoelectric conductor 1432, causing a current to flow in the associated ones of the conductive traces 704

Figure 15:
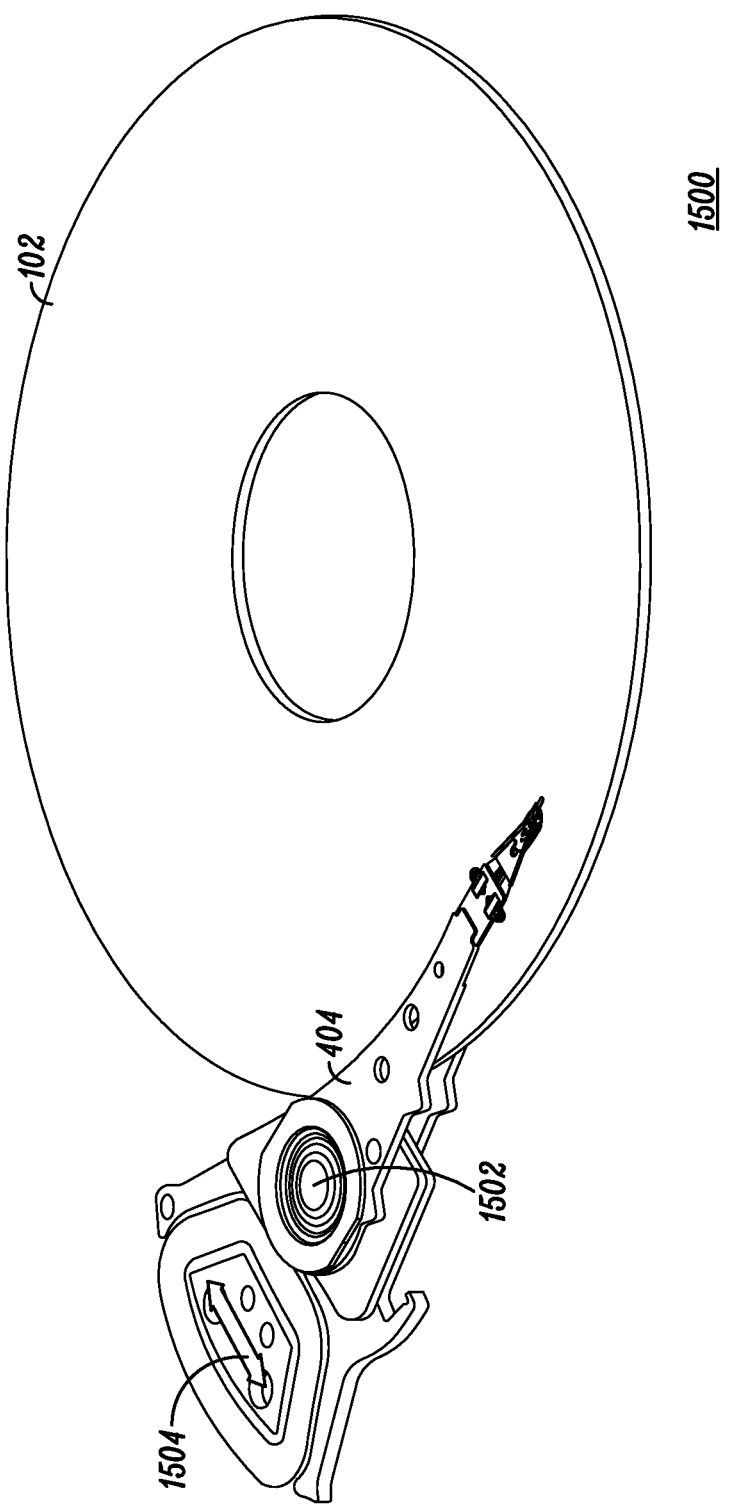
FIG. 15 depicts a top front left perspective view of an actuator assembly and disk, including a micro-milliactuator of FIG. 5A, highlighting the actuator voice coil motor excitation force in accordance with the present embodiment.

Vibration in the hard disk drive system can come from many sources, many of which are compensated by operation in accordance with the present embodiment. A first vibration source is rotation of the actuator arm by activation of the voice motor coil which leads to "swage" excitation vibrations or VCM excitation vibrations. This is the coarse movement of the slider across the surface of the disk medium. FIG. 15 depicts a top front left perspective view 1500 of a hard disk drive including the disk 102 and the actuator arm assembly 404. The actuator arm assembly 404 rotates about a bearing cartridge 1502 when coarse actuator control signals activate the VCM. Activation of the VCM creates the actuator voice coil motor excitation force 1504 referred to also as swage excitation.

Figure 16:
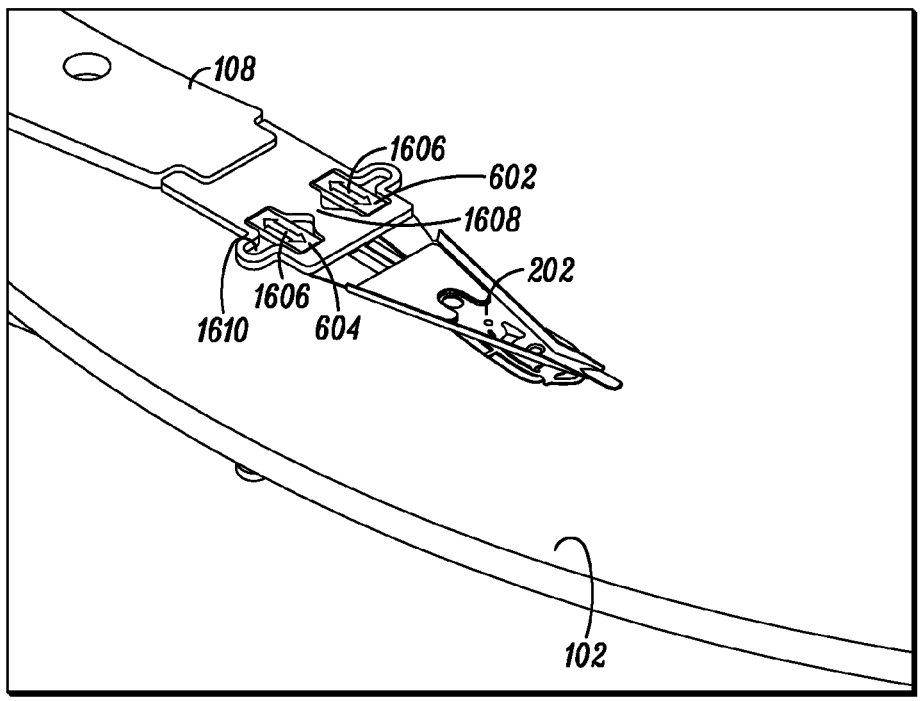
FIG. 16 depicts a top front left magnified perspective view of the actuator assembly and disk of FIG. 15, highlighting the piezoelectric actuator forces acting on the micro-milliactuator in accordance with the present embodiment.

A second vibration source is rotation of the micro-milliactuator suspension loadbeam 606 by activation of the piezoelectric actuators 602, 604, contracting one while expanding the other, which leads to piezoelectric actuator excitation vibrations. This is the fine movement of the slider across the surface of the disk medium (i.e., horizontal shifting of the recording head by the piezoelectric actuators 602,604). FIG. 16 depicts a top front left magnified perspective view 1600 of the hard disk drive highlighting the piezoelectric actuator forces 1606 acting on the micro-milliactuator in accordance with the present embodiment. When the piezoelectric actuators 602, 604 alternately contract and expand, the piezoelectric excitation forces 1606 cause vibrations as the tip of the suspension loadbeam 606 rotates around a hinge point 1608 between the piezoelectric actuators 602, 604.

Figure 17:
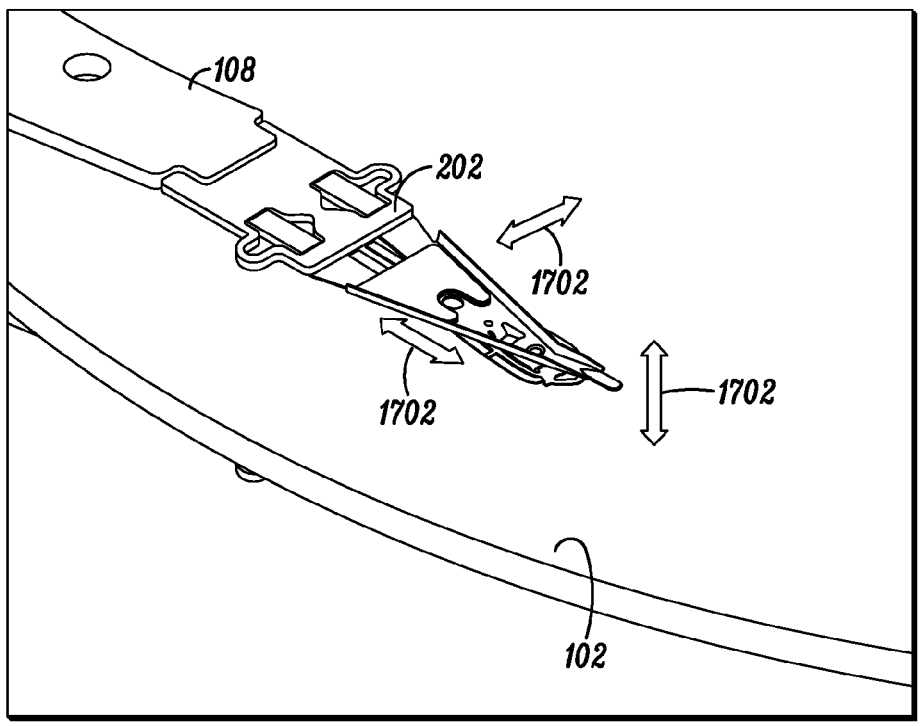
FIG. 17 depicts a top front left magnified perspective view of the HDD of FIG. 15 highlighting the turbulence forces which act on actuator arms and micro-milliactuators in accordance with the present embodiment.

A third vibration source is windage turbulence excitation of the unimount arm 108, the suspension loadbeam 606, the suspension flexure 702 and the disk 102 itself. Rotation of the disk 102 leads to turbulence above the surface of the disk medium as the disks drag air around with them, the air rotating relative to the actuator assembly and impinging on it . . . . This windage driven force is termed turbulence excitation. FIG. 17 depicts a top front left magnified perspective view 1700 of the hard disk drive highlighting the turbulence forces which act on actuator arm assemblies and micro-milliactuators in accordance with the present embodiment. The three orthogonal arrows 1702 indicate direction of turbulence forces acting on the disks, arms and suspensions as high-speed air is dragged around by the rotating disk 102 impinges, thereby exciting many undesired resonances which create off-track displacement.

Figure 18:
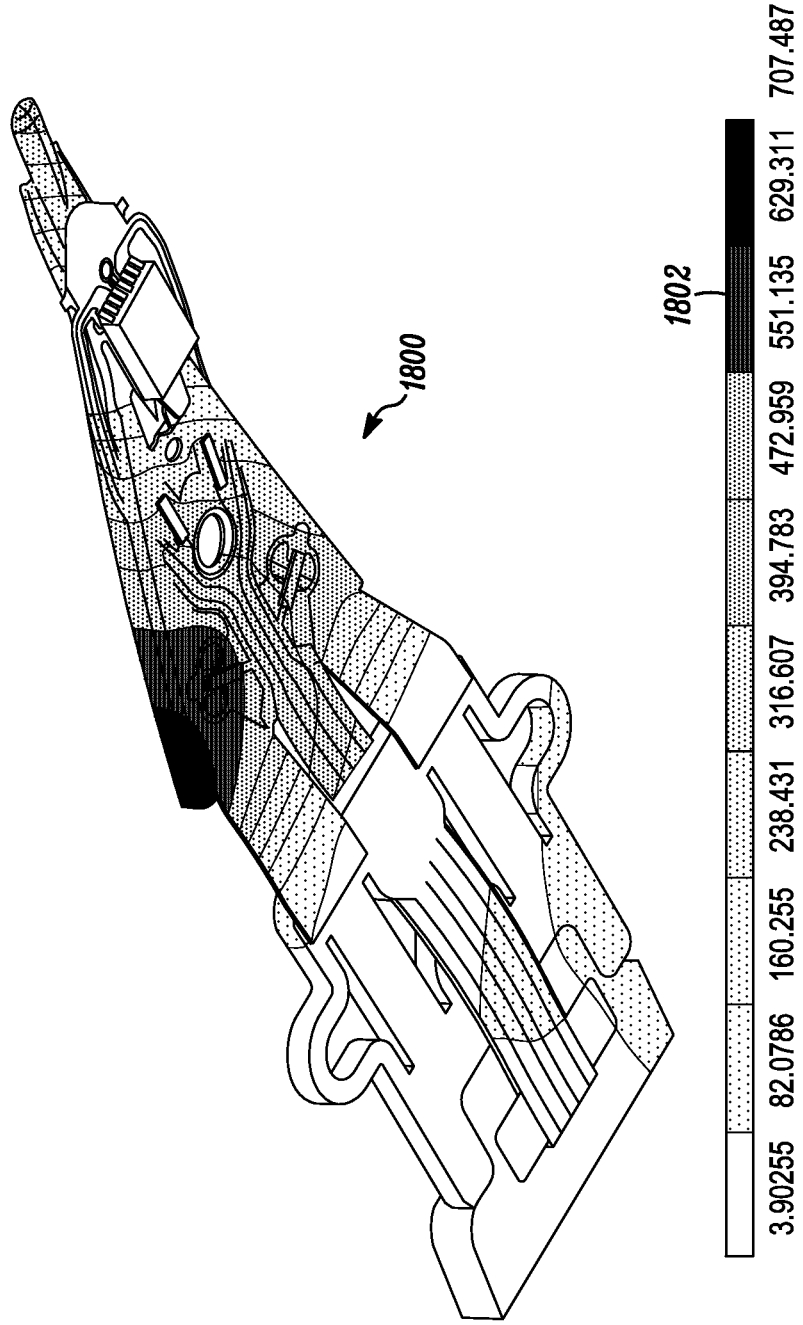
FIG. 18 depicts a highly magnified bottom front left perspective view of a loadbeam first bending mode of the micro-milliactuator of FIG. 5A in accordance with the present embodiment.
Figure 19:
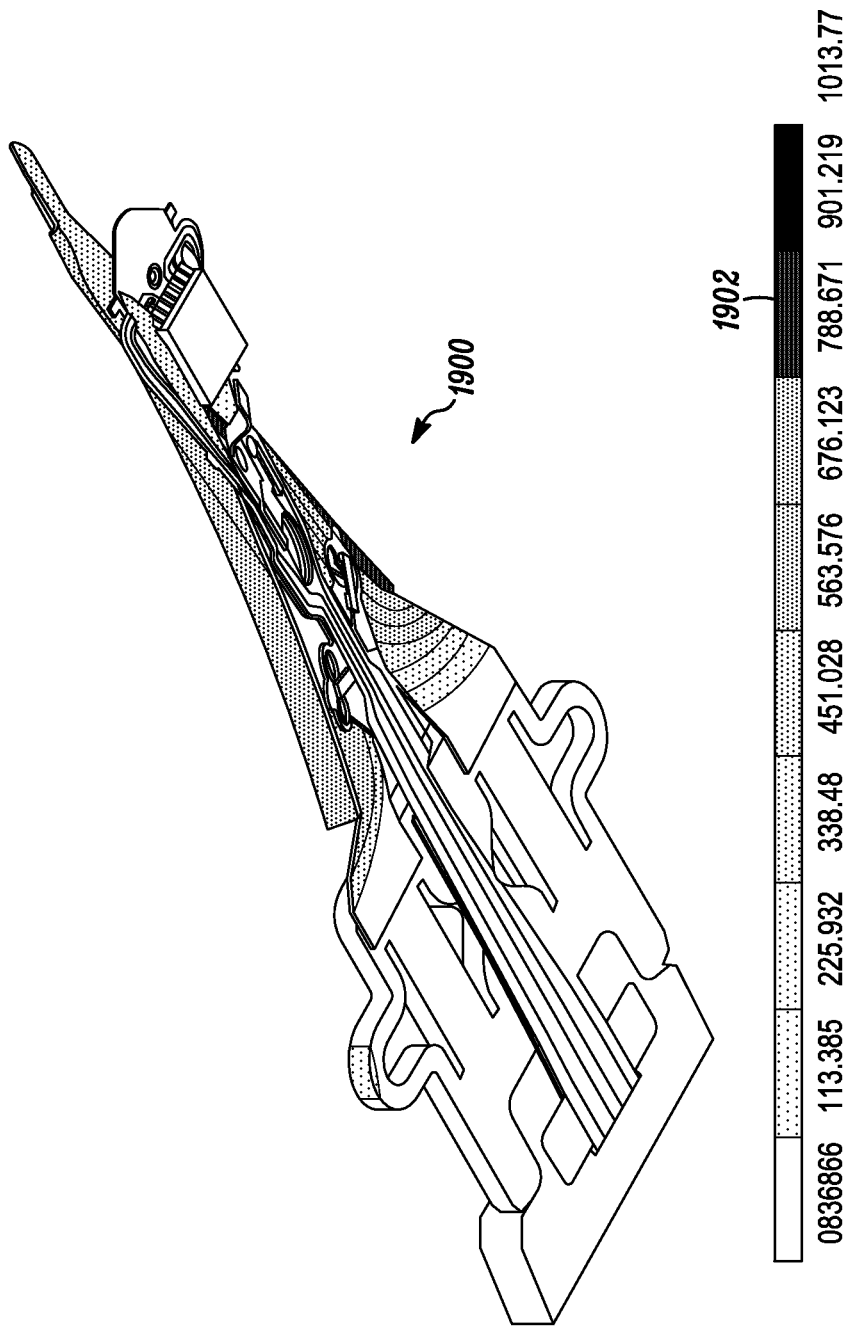
FIG. 19 depicts a highly magnified bottom front left perspective view of a first loadbeam torsion mode of the micro-milliactuator of FIG. 5A in accordance with the present embodiment.
Figure 20:
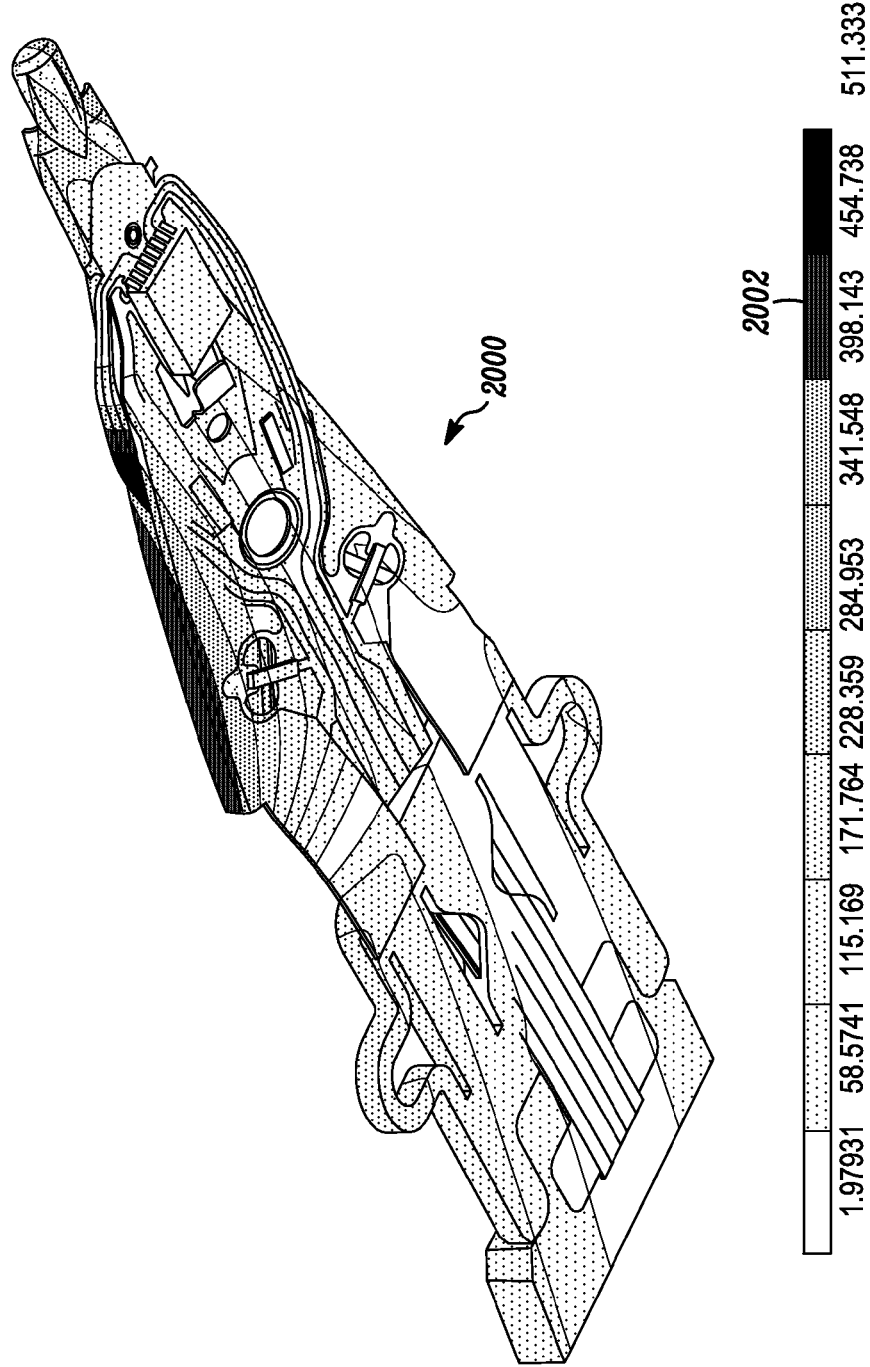
FIG. 20 depicts a highly magnified bottom front left perspective view of a second loadbeam torsion mode of the micro-milliactuator of FIG. 5A in accordance with the present embodiment.
Figure 21:
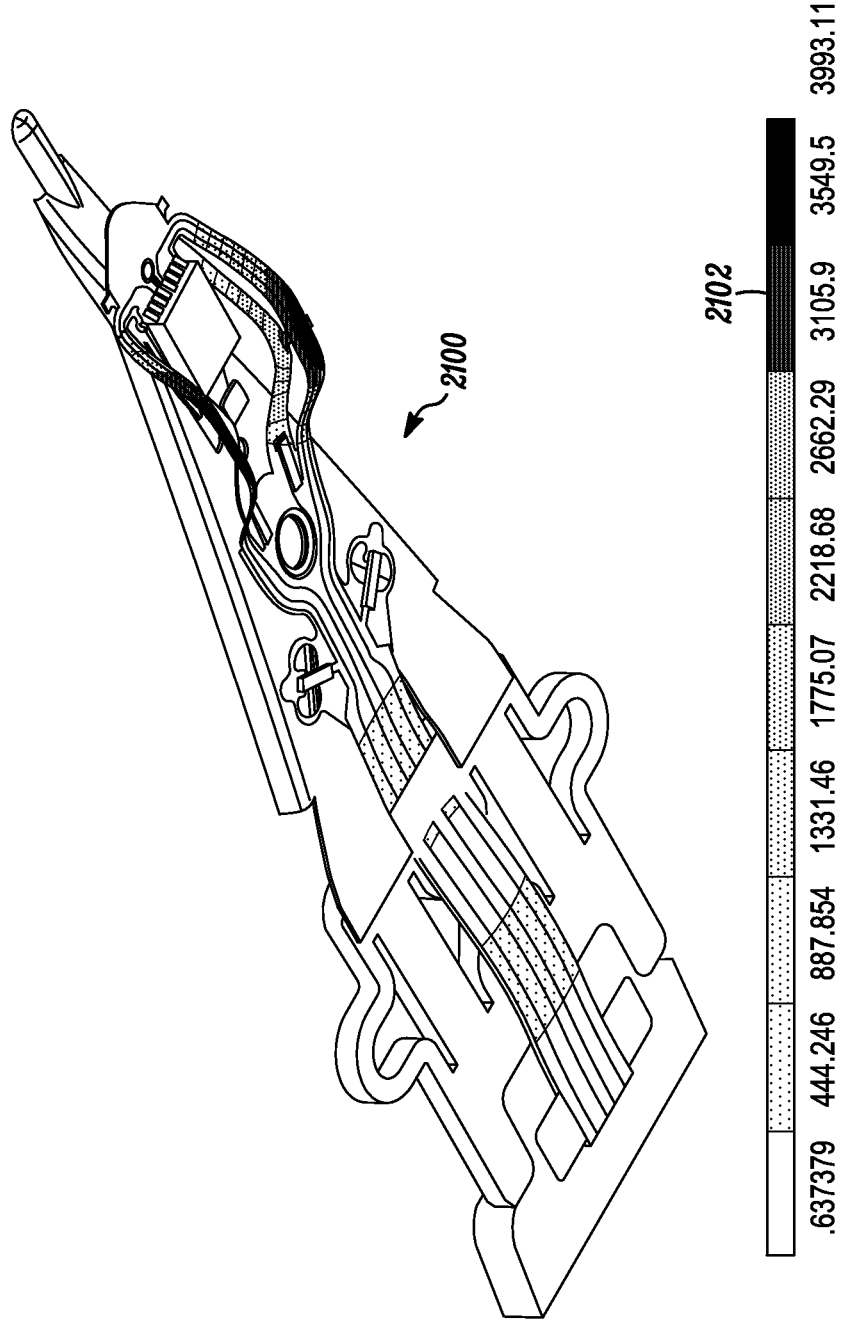
FIG. 21 depicts a highly magnified bottom front left perspective view of a flexure leg bending mode of the micro-milliactuator of FIG. 5A in accordance with the present embodiment.
Figure 22:
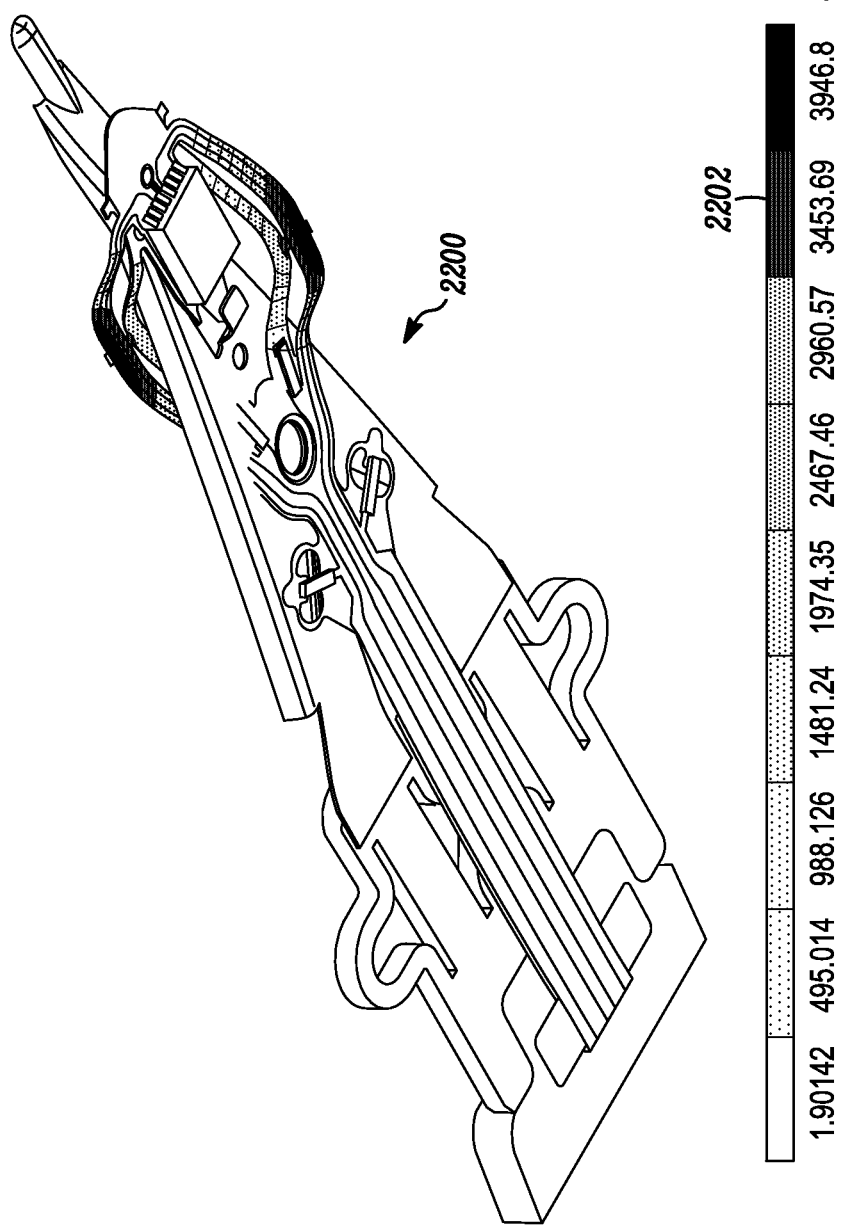
FIG. 22 depicts a highly magnified bottom front left perspective view of a flexure torsion mode of the micro-milliactuator of FIG. 5A in accordance with the present embodiment.

FIGS. 18 to 22 are perspective views of various bending and torsion modes caused by the three vibration sources discussed above. FIG. 18 depicts a bottom front left perspective view 1800 of a loadbeam first bending mode of the micro-milliactuator in accordance with the present embodiment where displacement is indicated by the legend 1802. FIG. 19 depicts a bottom front left perspective view 1900 of a first loadbeam torsion mode of the micro-milliactuator in accordance with the present embodiment where displacement is indicated by the legend 1902. FIG. 20 depicts a bottom front left perspective view 2000 of a second loadbeam torsion mode of the micro-milliactuator in accordance with the present embodiment where displacement is indicated by the legend 2002. FIG. 21 depicts a bottom front left perspective view 2100 of a flexure leg bending mode of the micro-milliactuator in accordance with the present embodiment where displacement is indicated by the legend 2102. FIG. 22 depicts a bottom front left perspective view 2200 of a flexure torsion mode of the micro-milliactuator in accordance with the present embodiment where displacement is indicated by the legend 2202.

Figure 23:
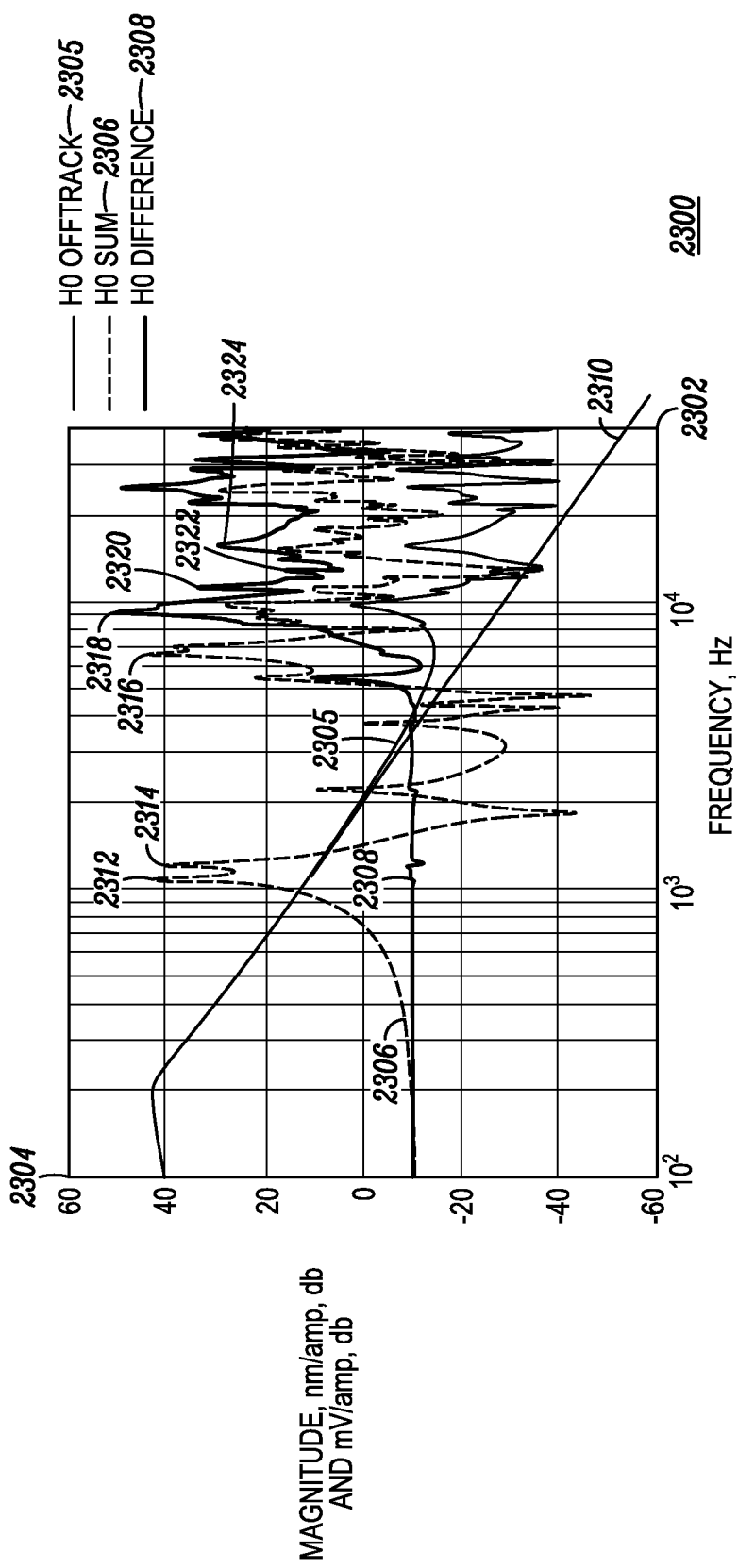
FIG. 23 illustrates a graph of offtrack displacement and loadbeam piezoelectric sensor voltage sum and difference for voice coil excitation in accordance with the present embodiment.

Referring to FIG. 23, a graph 2300 illustrates offtrack displacement and loadbeam piezoelectric sensor voltage sum and difference for voice coil excitation in accordance with the present embodiment where vibrational frequency is plotted along the x-axis 2302 and displacement and sensed voltage is plotted along the y-axis 2304. The offtrack displacement 2305 experienced under the effect of VCM excitation (or swage excitation) is graphed along with the sum 2306 of the voltages of the sensor signals generated by the loadbeam piezoelectric sensors 802, 804 and the difference 2308 of the voltages of the sensor signals generated by the loadbeam piezoelectric sensors 802, 804. The sum 2306 of the voltages of sensor signals from a pair of piezoelectric sensors (e.g., the pair of loadbeam piezoelectric sensors 802, 804 or the pair of flexure piezoelectric sensors 902, 904) is indicative of bending modes of the actuator assembly (e.g., such as the bending mode depicted in FIGS. 18 and 21). Likewise, the difference 2308 of the voltages of sensor signals from a pair of piezoelectric sensors (e.g., the pair of loadbeam piezoelectric sensors 802, 804 or the pair of flexure piezoelectric sensors 902, 904) is indicative of torsion modes of the actuator assembly (e.g., such as the torsion modes depicted in FIGS. 19, 20 and 22)). All offtrack displacement 2305 occurring above a mass line 2310 represents offtrack motion. As can be seen from the graph 2300, the first pitching mode 2312, the disk mode 2314 and the second loadbeam bending mode 2316 can be detected with the sum 2306 of the sensor signals from the loadbeam piezoelectric sensors 802, 804. Similarly, torsion modes 2318, 2322 and system modes 2320, 2324 can be detected with the difference 2308 of the sensor signals from the loadbeam piezoelectric sensors 802, 804. Thus, the sum 2306 and difference 2308 of the sensor signals can be used to compensate for or suppress the pitching, bending and disk excitation modes and the difference 2308 of the sensor signals can be used to compensate for or suppress the torsion and system excitation modes.

Figure 24:
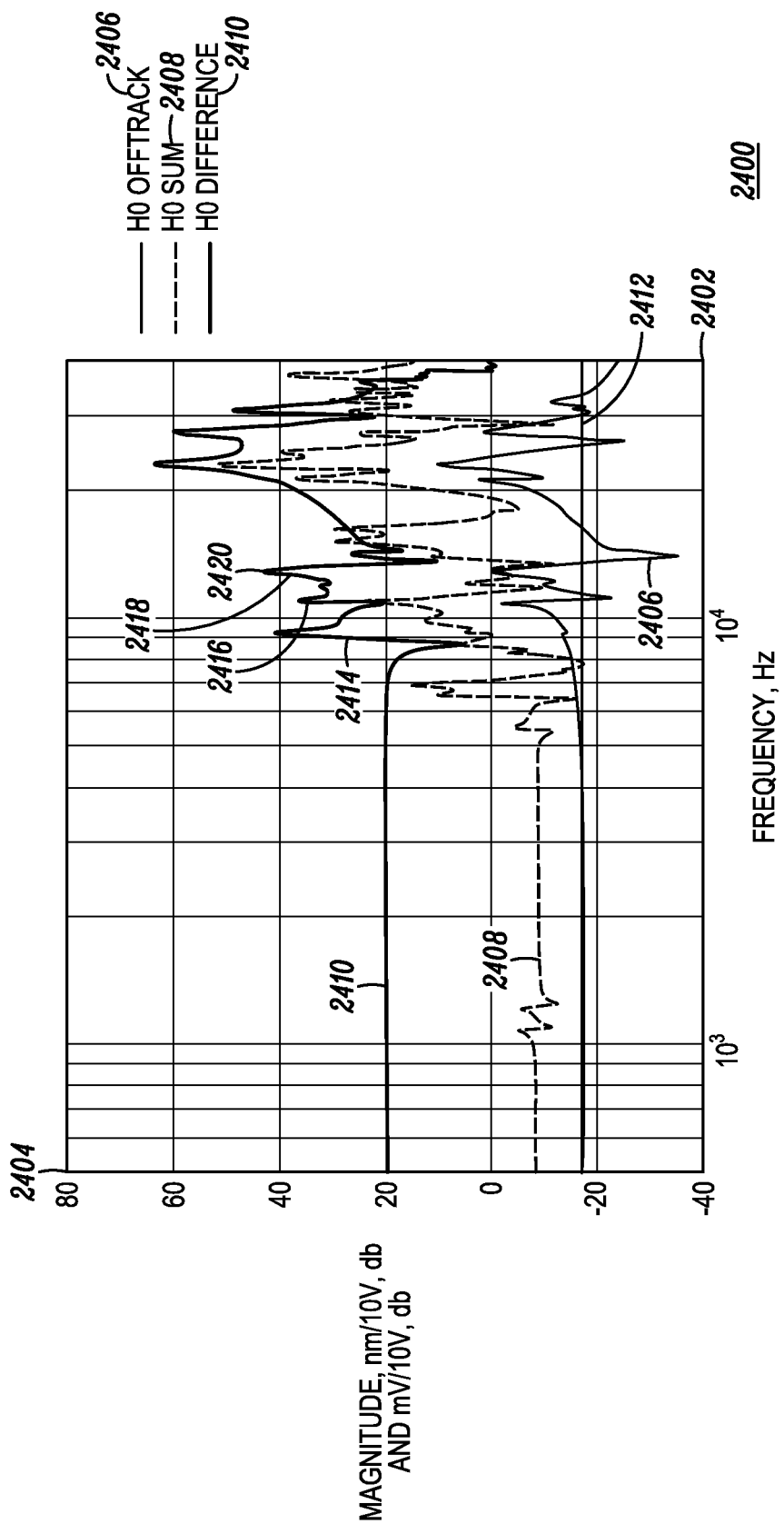
FIG. 24 illustrates a graph of offtrack displacement and loadbeam piezoelectric sensor voltage sum and difference for micro-milliactuator piezoelectric actuator excitation in accordance with the present embodiment.
Figure 25:
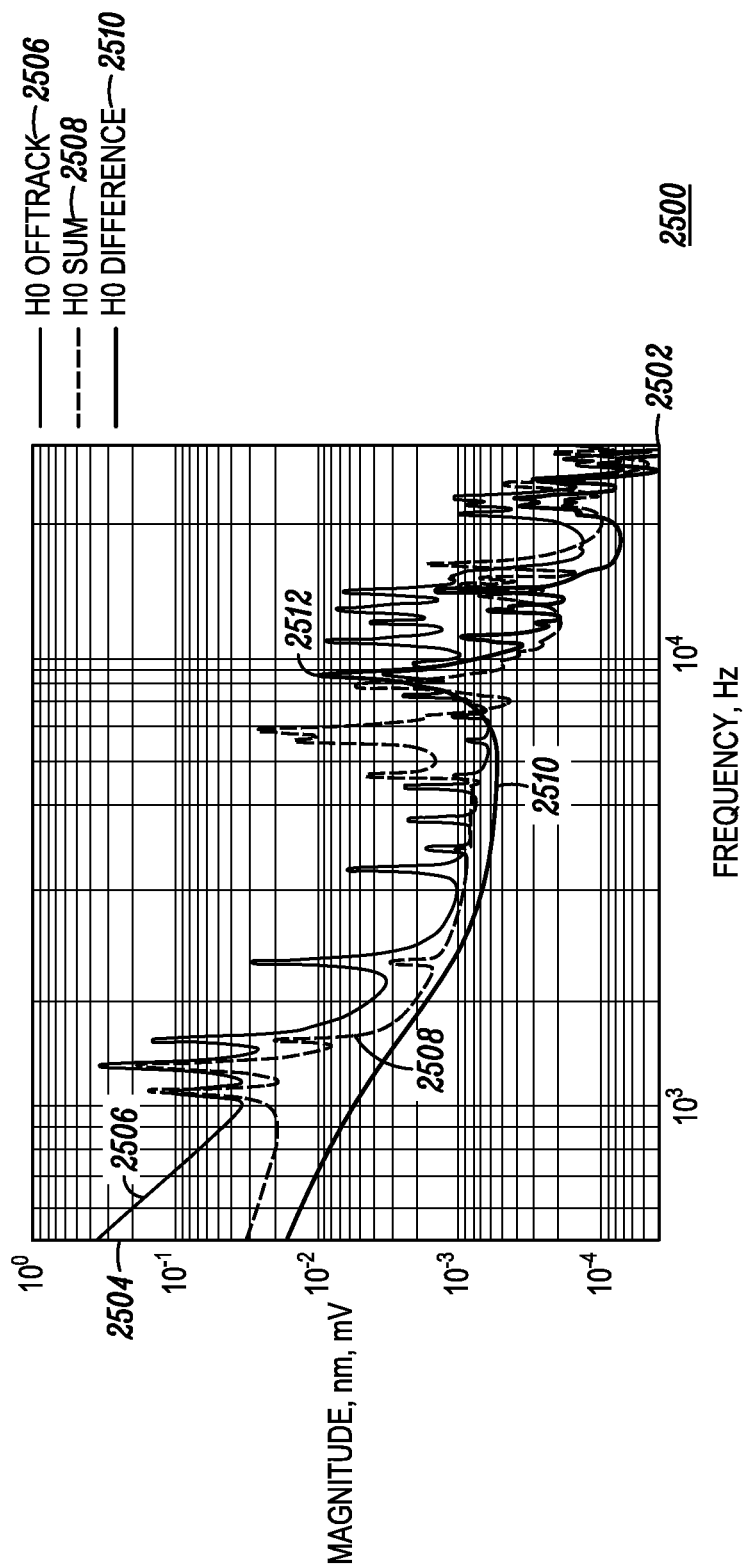
FIG. 25 illustrates a graph of offtrack displacement and loadbeam piezoelectric sensor voltage sum and difference for turbulence excitation in accordance with the present embodiment.

FIG. 24 illustrates a graph 2400 of offtrack displacement and loadbeam sensor voltage sum and difference for micro-milliactuator piezoelectric actuator excitation in accordance with the present embodiment where vibrational frequency is plotted along the x-axis 2402 and displacement and sensed voltage is plotted along the y-axis 2404. The offtrack displacement 2406 experienced under the effect of piezoelectric actuator excitation (i.e., activation of the piezoelectric actuators 602, 604) is graphed along with the sum 2408 of the voltages of the sensor signals generated by the loadbeam piezoelectric sensors 802, 804 (indicative of bending modes (e.g., FIG. 18)) and the difference 2410 of the voltages of the sensor signals generated by the loadbeam piezoelectric sensors 802, 804 (indicative of torsion modes (e.g., FIGS. 19 and 20)). All offtrack displacement 2406 occurring above a mass line 2412 represents offtrack motion The loadbeam piezoelectric sensor difference does not show a first torsion mode because the loadbeam in the model is optimally formed. In a non-optimally formed loadbeam as would occur during normal manufacturing process variations, however, the first torsion mode would be excited and would be sensed by the sensor voltage difference. The arm/loadbeam first torsion mode 2414 and the arm sway/torsion modes 2416, 2418 and, 2420 can be detected with the sum 2408 of the sensor signals from the loadbeam piezoelectric sensors 802, 804 and are indicative of excitation in the offtrack displacement 2406. Thus, the difference 2410 of the loadbeam piezoelectric sensor signals can be used to compensate for or suppress torsion and sway excitation modes. The peaks in the sum 2408 also show that bending modes can also be sensed but the sum voltage output is considerably lower than the difference signal. FIG. 25 illustrates a graph 2500 of offtrack displacement and loadbeam piezoelectric sensor voltage sum and difference for turbulence excitation in accordance with the present embodiment where vibrational frequency is plotted along the x-axis 2502 and displacement and sensed voltage is plotted along the y-axis 2504. The offtrack displacement 2506 experienced under the effect of turbulence excitation is graphed along with the sum 2508 of the voltages of the sensor signals generated by the loadbeam piezoelectric sensors 802, 804 (indicative of bending modes (e.g., FIG. 18)) and the difference 2510 of the voltages of the sensor signals generated by the loadbeam piezoelectric sensors 802, 804 (indicative of torsion modes (e.g., FIGS. 19 and 20)). As can be seen from the graph 2500, other than a first torsion mode 2512, off track displacement can be suppressed or compensated by the sum 2508 or the difference 2510 of the sensor signals from the loadbeam piezoelectric sensors 802, 804. The first torsion mode 2512 doesn't match any offtrack displacement or sensor voltage peaks due to optimization of loadbeam sag and offset; in a non-optimally formed loadbeam as would occur during normal manufacturing process variations, the loadbeam piezoelectric sensor difference would sense the first torsional mode. While not discussed in detail here, but as discussed below in connection with FIGS. 69, 70 and 71 and with FIGS. 36, 38 and 40 (as compared to FIGS. 37, 39 and 41, respectively), the flexure piezoelectric sensors 902, 904 sum and difference can also be used to detect bending and torsion modes, respectively, for vibration compensation and/or suppression. Note that FIGS. 69, 70 and 71 refer to transfer functions for only the unimount and micro-milliactuator assembly, not the complete actuator assembly/disk model.

Figure 26A:
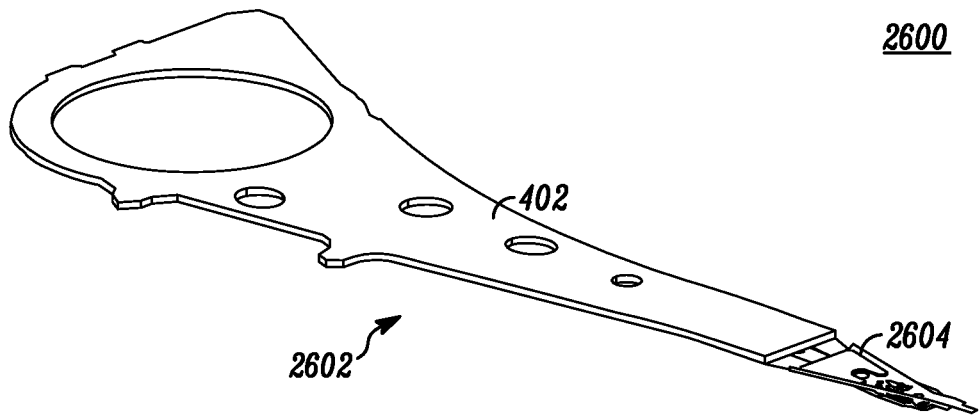
Figure 26B:
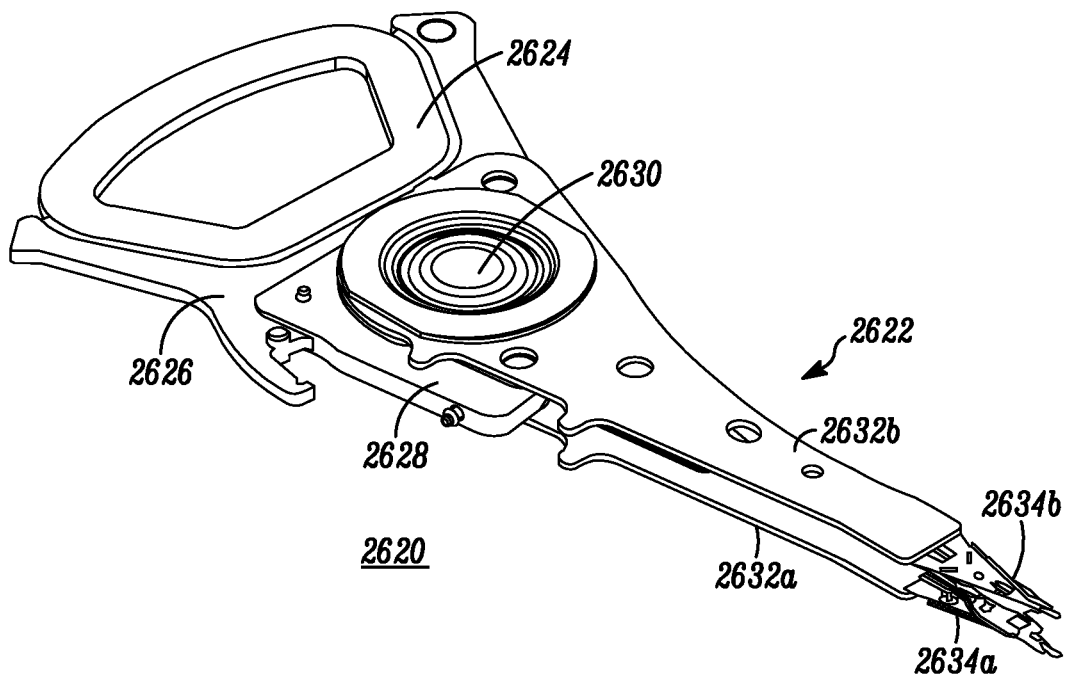
Figure 26C:
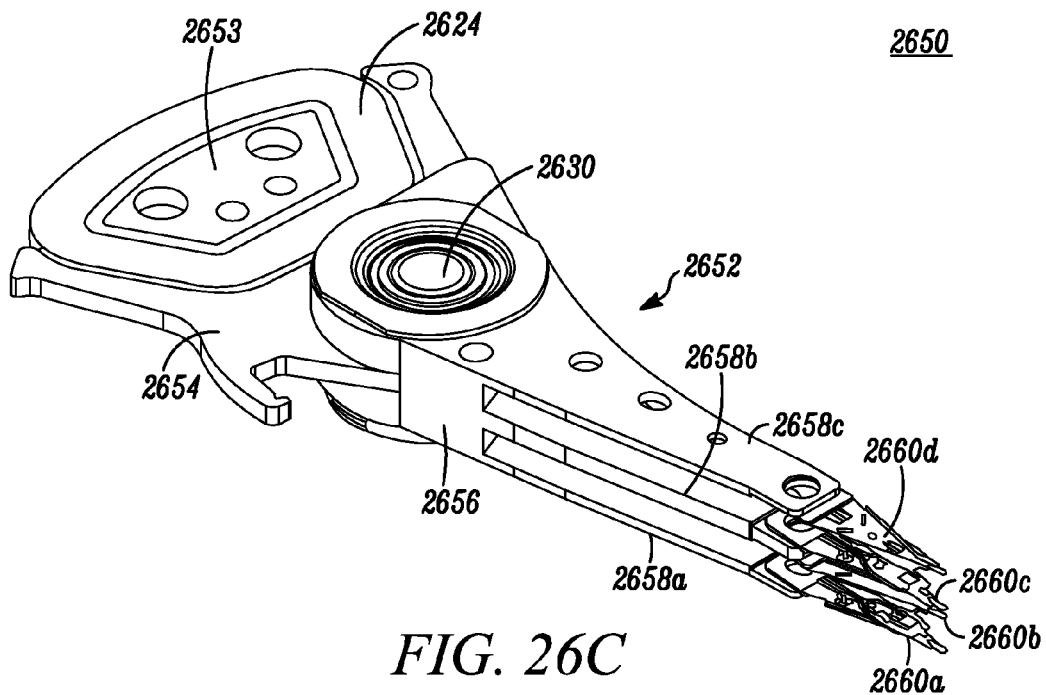

FIG. 26, comprising FIGS. 26A, 26B and 26C, illustrate views of a micro-microactuator in accordance with present embodiments. FIG. 26A depicts a top front left perspective view 2600 of an actuator arm assembly 2602 including a micro-microactuator 2604 mounted on a unimount arm 402. FIG. 26B depicts a top front left perspective view 2620 of an actuator arm assembly 2622 including a micro-microactuator 2634 with unimount arm 2632 for a double-sided disk in accordance with the present embodiment. A coil 2624 for a voice coil motor (VCM) is supported at an end of the actuator arm assembly 2622 opposite the micro-microactuators 2634 by a unimount actuator coil support 2626. In response to actuator control signals, the coil 2624 rotates a unimount actuator 2628 of the actuator arm assembly 2622 around a pivot bearing cartridge 2630 to fly the two micro-microactuators 2634a, 2634b over both sides of a rotating disk by rotating the unimount actuator 2628. Two unimount actuator arms 2632a, 2632b are connected to the unimount actuator 2328 at one end and the micro-microactuators 2634a, 2634b at the other end.

FIG. 26C depicts a top front left perspective view 2650 of micro-microactuators 2660 in accordance with the present embodiment mounted on an E-block arm actuator assembly 2652. The coil 2624 for a VCM surrounds a coil stiffener 2653 and is supported at an end of the E-block arm opposite the micro-microactuators 2660 by an E-block actuator coil support 2654. In response to actuator control signals, the coil 2624 rotates the E-block arm around the pivot bearing cartridge 2630 to fly the four micro-microactuators 2660a, 2660b, 2660c, 2660d over both sides of rotating disks (not shown) by rotating an E-block actuator 2656. Three E-block actuator arms 2658a, 2658b, 2658c are integrally connected to the E-block actuator 2656 to give the E-block arm its distinctive "E-block" shape.

Figure 27:
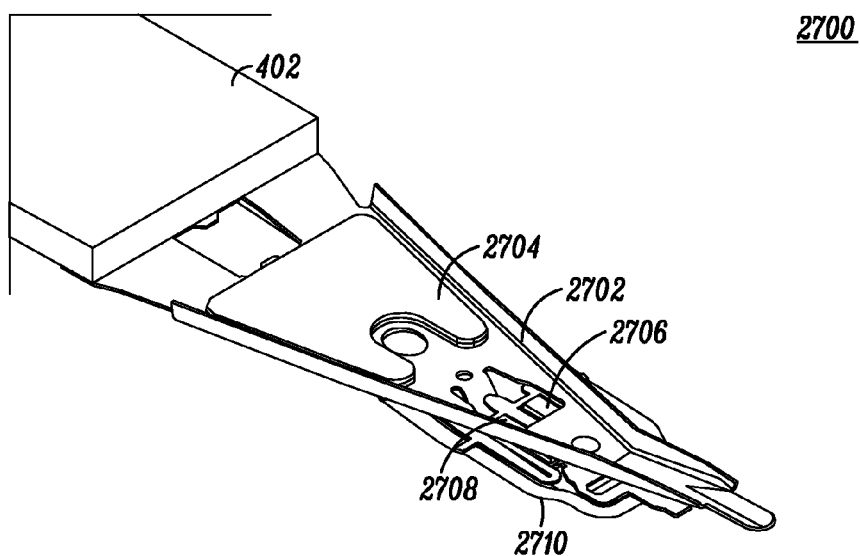
FIG. 27 depicts a top front left magnified perspective view of the micro-microactuator of FIG. 26B showing the unimount arm and loadbeam in accordance with the present embodiment.
Figure 28:
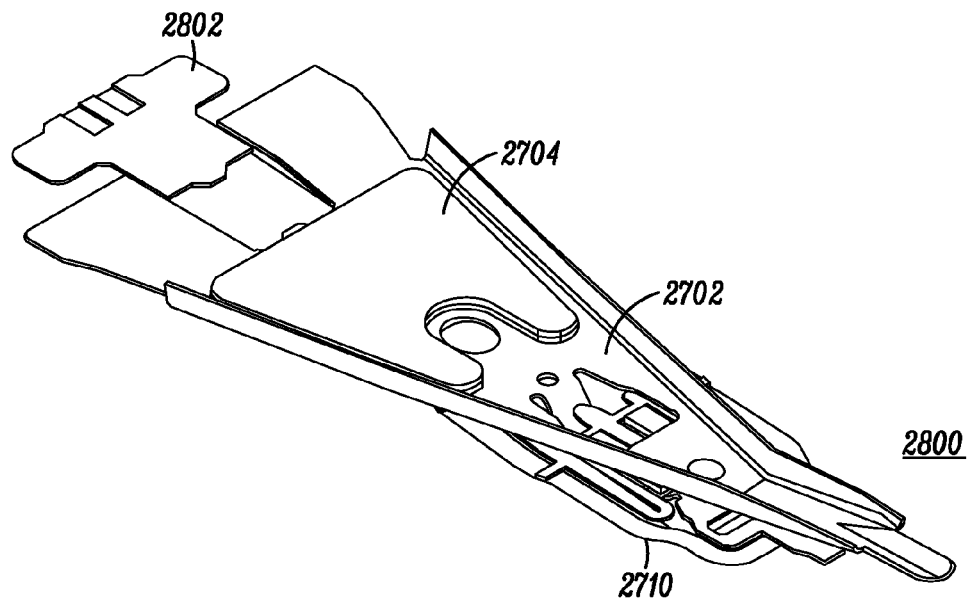
FIG. 28 depicts a top front left perspective view of a micro-microactuator suspension of the micro-microactuator of FIG. 26B in accordance with the present embodiment.

FIG. 27 depicts a top front left magnified perspective view 2700 of the micro-microactuator in accordance with the present embodiment showing the unimount arm 402 and a suspension loadbeam 2702. The suspension loadbeam includes a loadbeam damper 2704 for dampening vibrations. An inner diameter piezoelectric actuator 2706 and an outer diameter piezoelectric actuator 2708 are electrically connected to conductive traces 2710 and mounted on a suspension flexure connected to the loadbeam 2702. FIG. 28 depicts a top front left perspective view 2800 of the micro-microactuator suspension in accordance with the present embodiment where the suspension flexure 2802 can be seen.

Figure 29:
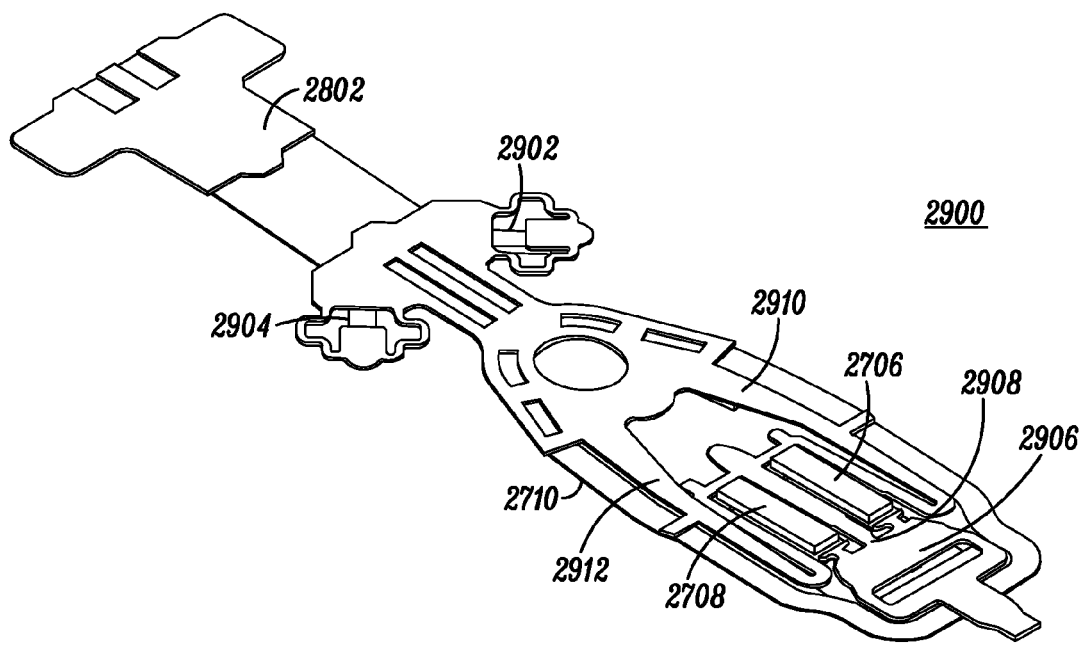
FIG. 29 depicts a top front left perspective view of a micro-microactuator flexure of the micro-microactuator of FIG. 26B in accordance with the present embodiment.

FIG. 29 depicts a top front left perspective view of the suspension flexure 2802 of the micro-microactuator of FIG. 26B in accordance with the present embodiment. The inner diameter piezoelectric actuators 2706 and the outer diameter piezoelectric actuator 2708 are mounted to a microactuator flexure tongue 2906 coupled to flexure legs 2910, 2912 for rotating the microactuator flexure tongue 2906 about a hinge point 2908. In accordance with the present embodiment, an inner diameter loadbeam piezoelectric sensor 2902 and an outer diameter loadbeam piezoelectric sensor 2904 are coupled to the conductive traces 2710 to provide sensor signals generated in response to sensed vibrations during operation for micro-microactuator vibration compensation and suppression.

Figure 30:
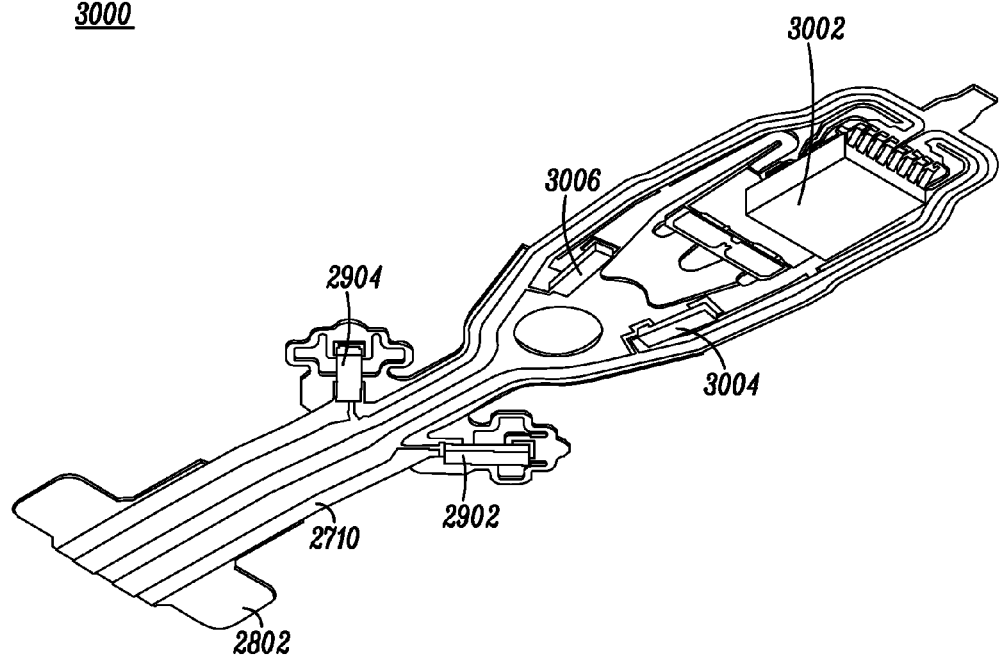
FIG. 30 depicts a bottom front left perspective view of the micro-microactuator flexure of FIG. 29 in accordance with the present embodiment.
Figure 31:
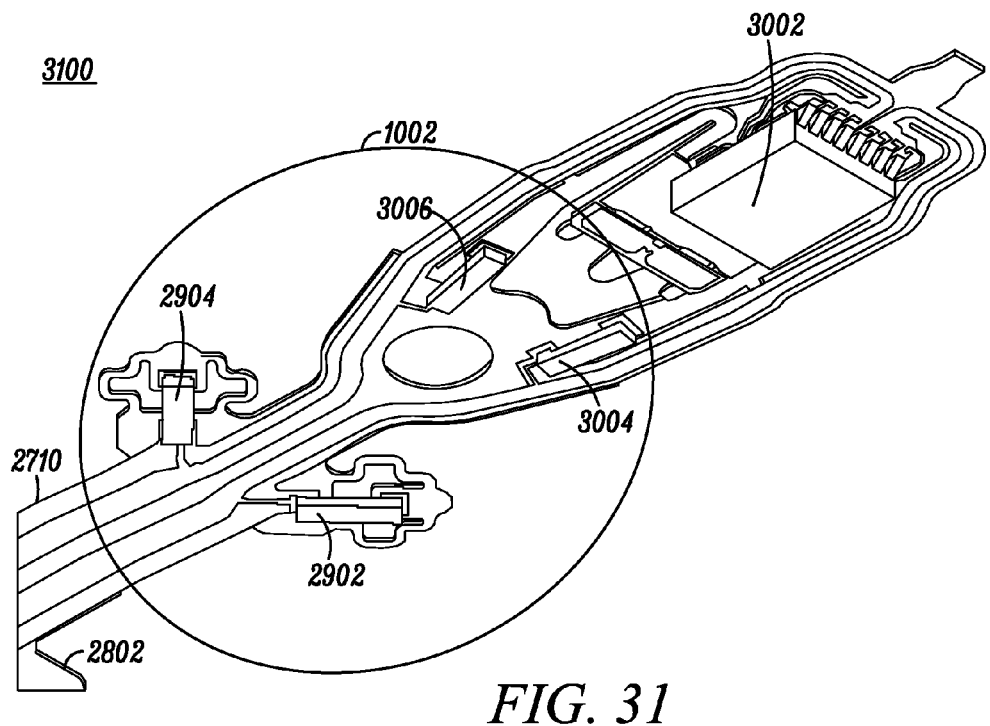
FIG. 31 depicts a bottom front left magnified perspective view of the micro-microactuator flexure of FIG. 29 in accordance with the present embodiment highlighting the similarity of flexure and loadbeam piezoelectric sensor placement in the micro-milliactuator flexure of FIG. 10 and flexure and loadbeam piezoelectric sensor placement in the micro-microactuator flexure of this FIG. 31.

FIG. 30 depicts a bottom front left perspective view 3000 of the micro-microactuator suspension flexure 2802. A recording head 3002 for reading and writing data from and to the disk 102 (FIG. 2) is mounted to the bottom of the flexure tongue 2906. Further, in addition to the inner and outer diameter loadbeam piezoelectric sensors 2902, 2904 which sense vibrations and strain in the suspension loadbeam 2702 (FIG. 27), an inner diameter flexure piezoelectric sensor 3004 and an outer diameter flexure piezoelectric sensor 3006 sense strain and vibrations on the suspension flexure 2802 and provide sensor signals generated therefrom on the conductive traces 2710 for vibration suppression and compensation. Referring to FIG. 31, a bottom front left perspective view 3100 provides a magnified perspective view of the front portion of the suspension flexure 2802 including the loadbeam piezoelectric sensors 2902, 2904 and the flexure piezoelectric sensors 3004, 3006 in accordance with the present embodiment. The circle 1002 highlights the section of the suspension flexure 2802 depicting mounting of the piezoelectric sensors 2902, 2904, 3004, 3006 in a manner which is similar for both the micro-microactuator (this FIG. 31) and the micro-milliactuator (FIG. 10) and the micro-microactuator (discussed hereinbelow).

Figure 32:
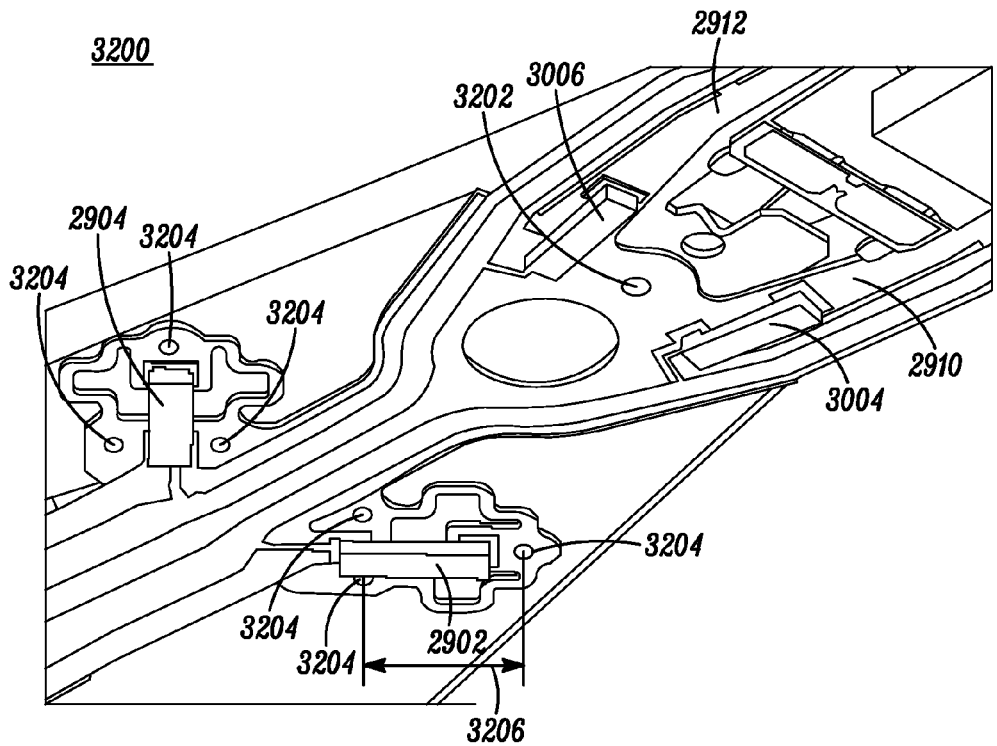
FIG. 32 depicts a bottom front left magnified perspective view of the micro-microactuator flexure and loadbeam of the micro-microactuator of FIG. 26B highlighting the loadbeam/flexure welds in accordance with the present embodiment.
Figure 33:
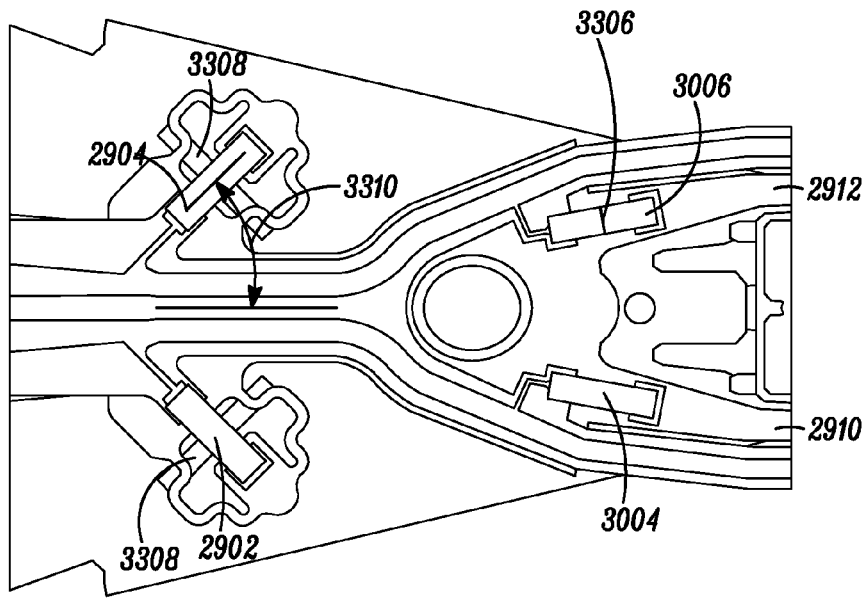
FIG. 33 depicts a magnified bottom planar view of the micro-microactuator flexure and loadbeam of FIG. 32 highlighting piezoelectric sensor orientation in accordance with an aspect of the present embodiment.

FIG. 32 depicts a bottom front left magnified perspective view 3200 of the micro-microactuator suspension flexure 2802 and the micro-microactuator suspension loadbeam 2702 in accordance with the present embodiment. The flexure piezoelectric sensors 3004, 3006 sense strain on the flexure legs 2910, 2912, such as bending of the flexure legs 2910, 2912, as the flexure/loadbeam weld 3202 firmly binds the suspension flexure 2802 to the suspension loadbeam 2702. The flexure/loadbeam welds 3204, however, couple the loadbeam strain 3206 of the suspension loadbeam 2702 to stretching of the loadbeam piezoelectric sensors 2902, 2904. FIG. 33 depicts a magnified bottom planar view 3300 of the micro-microactuator suspension flexure 2802 and suspension loadbeam 2702 of FIG. 32 highlighting piezoelectric sensor orientation in accordance with an aspect of the present embodiment. The flexure piezoelectric sensors 3004, 3006 are approximately aligned with centerlines of the flexure legs 2910, 2912. In addition, midpoints 3306 of the flexure piezoelectric sensors 3004, 3006 roughly correspond to the roots of the flexure legs 2910, 2912. As to orientation of the loadbeam piezoelectric sensors 2902, 2904, optional loadbeam slots 3308 in the suspension loadbeam 2702 are located above the loadbeam piezoelectric sensors 2902, 2904 and perpendicular to the angles thereof. In the view 3300, a loadbeam piezoelectric sensor angle 3310 is substantially forty-five degrees. The angle 3310 can be adjusted in order to emphasize and/or de-emphasize particular vibration modes of the micro-microactuator.

Figure 34:
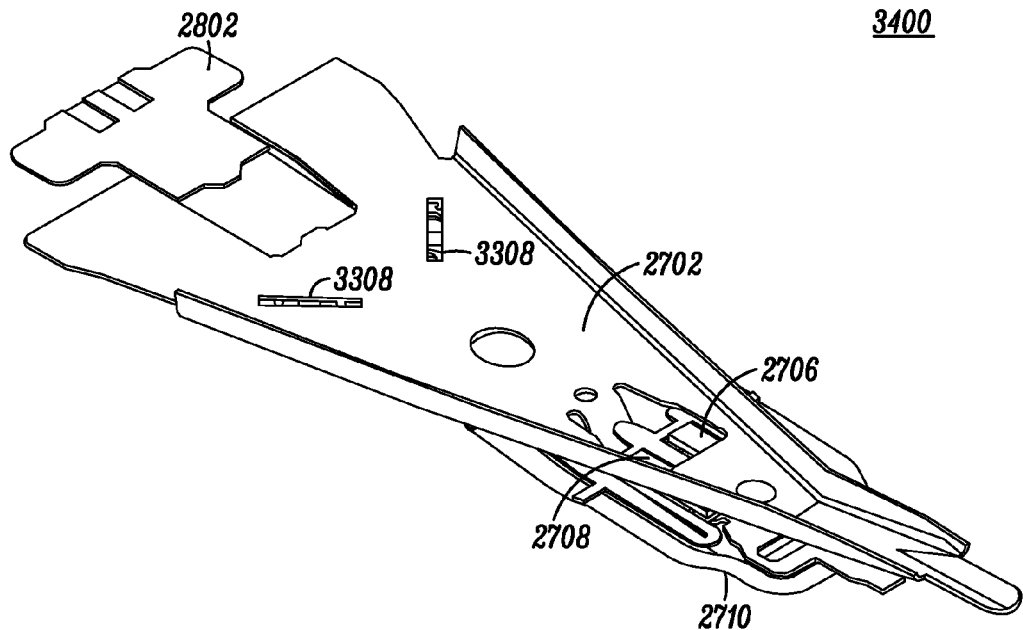
FIG. 34 depicts a top front left perspective view of the micro-microactuator suspension of FIG. 28 highlighting loadbeam slots in accordance with an aspect of the present embodiment.
Figure 35:
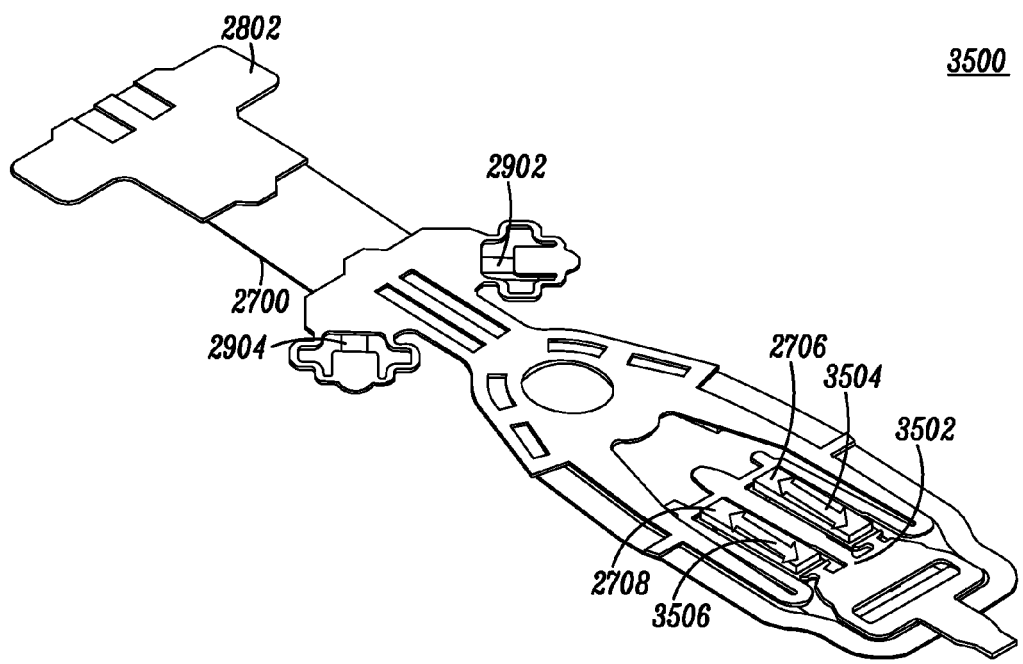
FIG. 35 depicts a top front left magnified perspective view of the micro-microactuator flexure of FIG. 29 highlighting the piezoelectric actuator forces acting on the micro-microactuator in accordance with the present embodiment.

FIG. 34 depicts a top front left perspective view 3400 of the micro-microactuator suspension highlighting the loadbeam slots 3308 formed in the suspension loadbeam 2702 in accordance with an aspect of the present embodiment. The optional loadbeam slots allow more loadbeam strain to be sensed than without the slots and are small enough not to affect the primary function of the loadbeam. And FIG. 35 depicts a top front left magnified perspective view of the micro-microactuator flexure highlighting piezoelectric actuator forces 3504, 3506 acting on the micro-microactuator in accordance with the present embodiment. Vibration is introduced to the system during piezoelectric actuator excitation when the portion of the flexure tongue attached to the slider 2906 and the slider 3002 rotate around a hinge point 3502 by activation of the piezoelectric actuators 2706, 2708, contracting one while expanding the other. This is the fine movement of the slider across the surface of the disk medium (i.e., horizontal shifting of the trailing edge and recording element of the slider by the piezoelectric actuators 2706, 2708).

Figure 36:
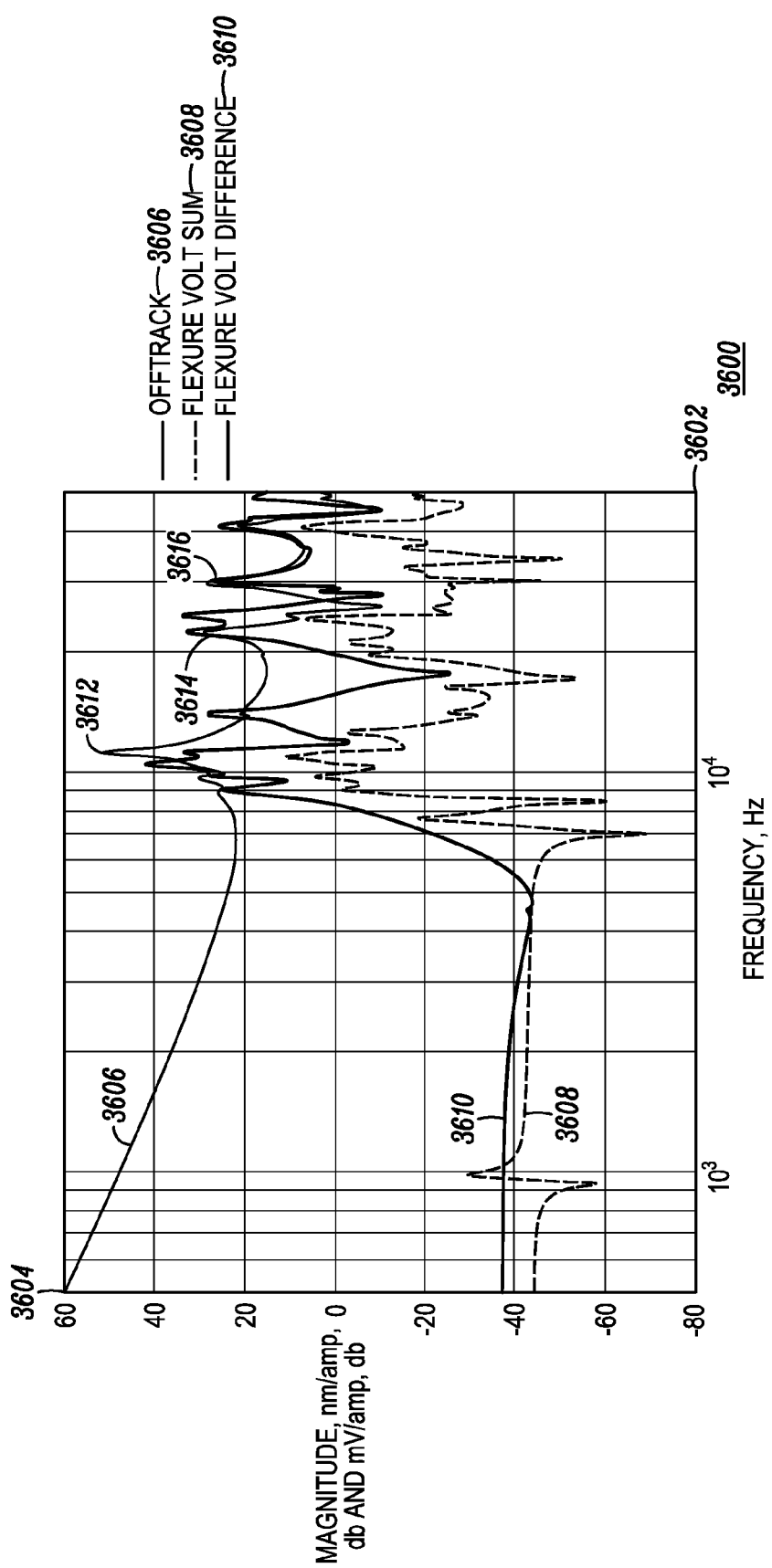
FIG. 36 illustrates a graph of offtrack displacement and flexure piezoelectric sensor voltage sum and difference for voice coil excitation in accordance with the present embodiment.

Referring to FIG. 36, a graph 3600 illustrates offtrack displacement and flexure piezoelectric sensor voltage sum and difference for voice coil excitation in accordance with the present embodiment where vibrational frequency is plotted along the x-axis 3602 and displacement and sensed voltage is plotted along the y-axis 3604. The offtrack displacement 3606 experienced under the effect of VCM excitation (or swage excitation) is graphed along with the sum 3608 of the voltages of the sensor signals generated by the flexure piezoelectric sensors 3004, 3006 and the difference 3610 of the voltages of the sensor signals generated by the flexure piezoelectric sensors 3004, 3006. As can be seen from the graph 3600, an arm sway mode 3612, a third torsion mode 3614 and a suspension sway mode 3616 can be detected with the difference 3610 of the sensor signals from the flexure piezoelectric sensors 3002, 3004. Thus, the difference 3610 of the sensor signals can be used to compensate for or suppress the sway and torsion excitation modes.

Figure 37:
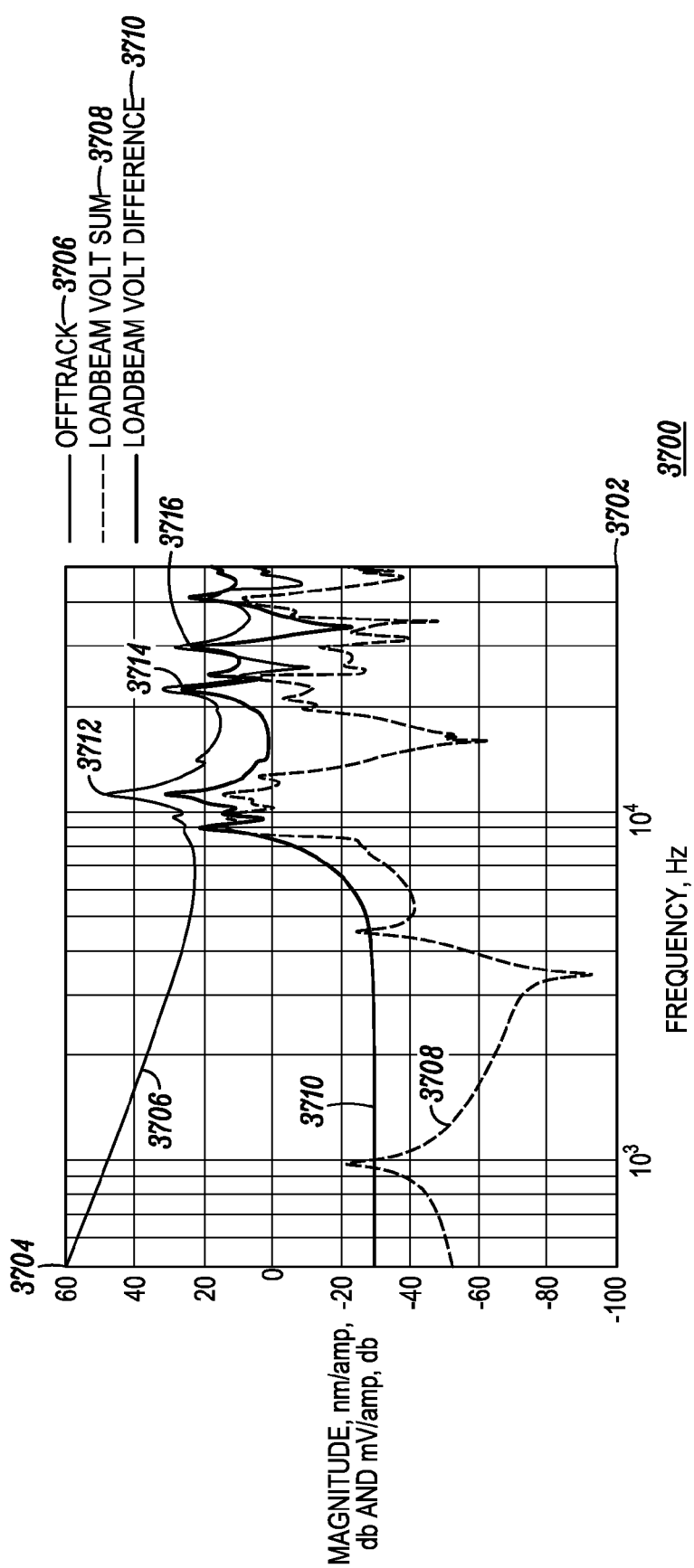
FIG. 37 illustrates a graph of offtrack displacement and loadbeam piezoelectric sensor voltage sum and difference for voice coil excitation in accordance with the present embodiment.

Referring to FIG. 37, a graph 3700 illustrates offtrack displacement and loadbeam piezoelectric sensor voltage sum and difference for voice coil excitation in accordance with the present embodiment where vibrational frequency is plotted along the x-axis 3702 and displacement and sensed voltage is plotted along the y-axis 3704. The offtrack displacement 3706 experienced under the effect of VCM excitation (or swage excitation) is graphed along with the sum 3708 of the voltages of the sensor signals generated by the loadbeam piezoelectric sensors 2902, 2904 and the difference 3710 of the voltages of the sensor signals generated by the loadbeam piezoelectric sensors 2902, 2904. As can be seen from the graph 3700, the arm sway mode 3712, the third torsion mode 3714 and the suspension sway mode 3716 can be detected with the difference 3710 of the sensor signals from the loadbeam piezoelectric sensors 2902, 2904. Thus, the difference 3710 of the sensor signals can be used to compensate for or suppress the sway and torsion excitation modes.

Figure 38:
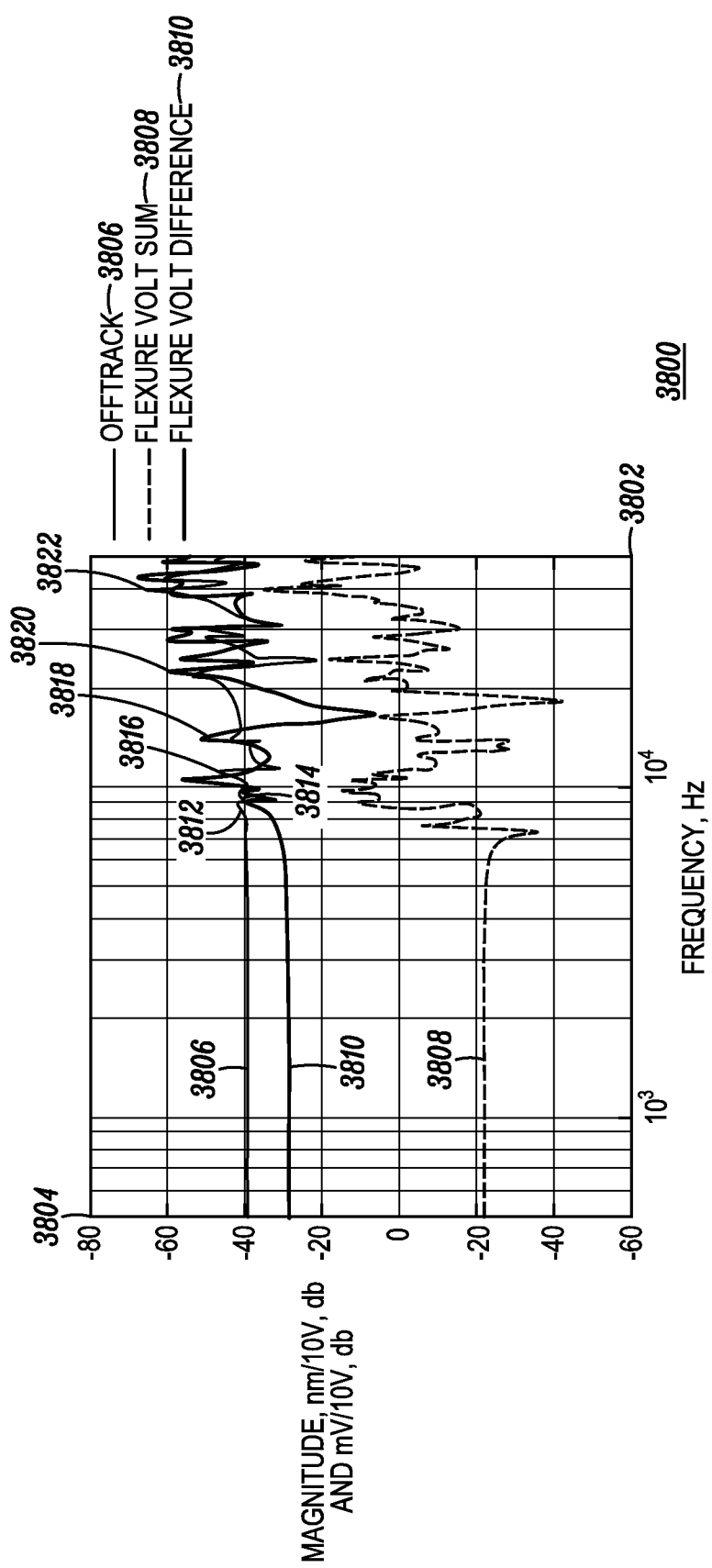
FIG. 38 illustrates a graph of offtrack displacement and flexure piezoelectric sensor voltage sum and difference for micro-microactuator piezoelectric actuator excitation in accordance with the present embodiment.
Figure 39:
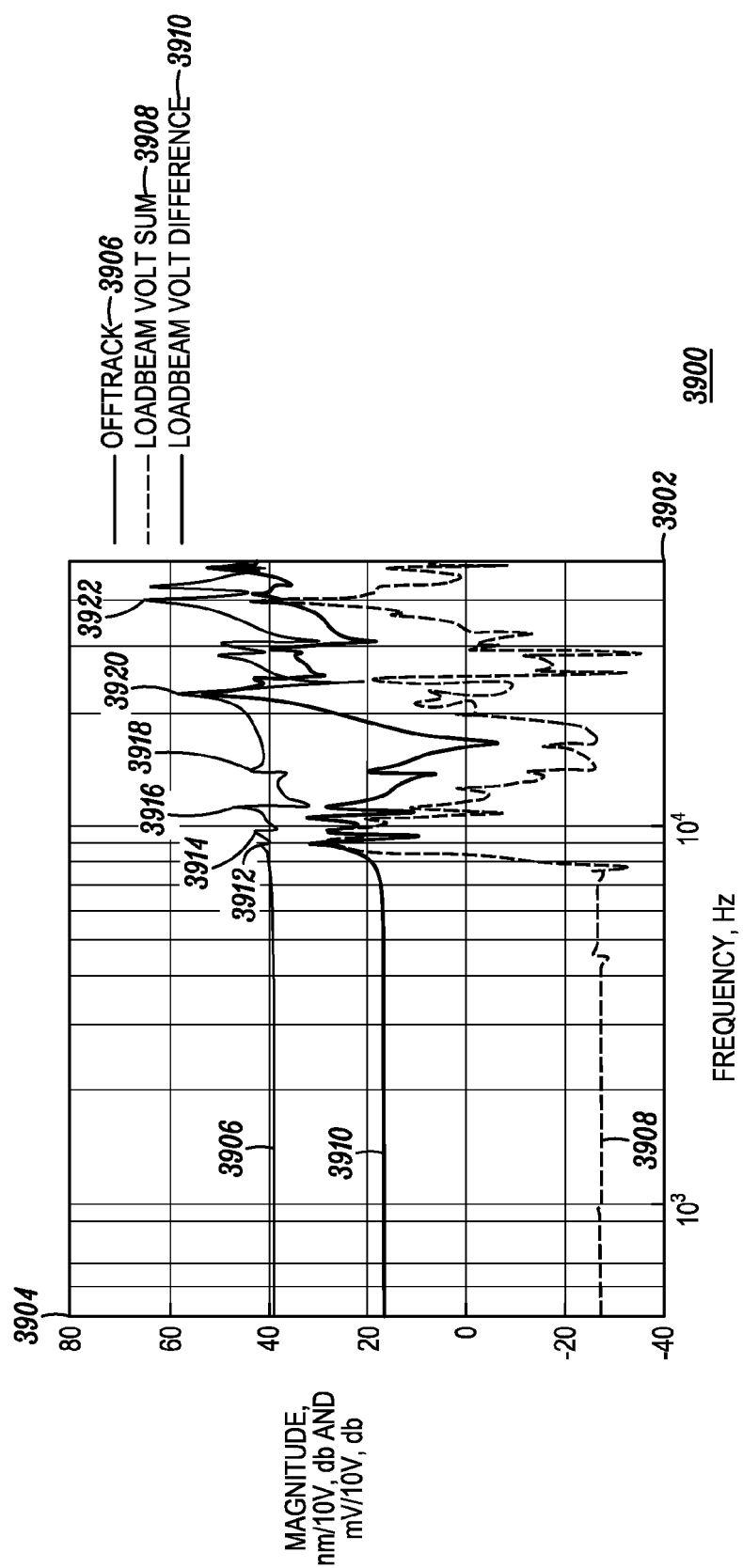
FIG. 39 illustrates a graph of offtrack displacement and loadbeam piezoelectric sensor voltage sum and difference for micro-microactuator piezoelectric actuator excitation in accordance with the present embodiment.

Referring to FIG. 38 and FIG. 39, graphs 3800, 3900 of offtrack displacement and flexure piezoelectric sensor voltage sum and difference for micro-microactuator piezoelectric actuator excitation in accordance with the present embodiment is provided, where vibrational frequency is plotted along the x-axis 3802, 3902 and displacement and sensed voltage is plotted along the y-axis 3804, 3904. In the graph 3800, the sum 3808 of the voltages of the sensor signals generated by the flexure piezoelectric sensors 3004, 3006 and the difference 3810 of the voltages of the sensor signals generated by the flexure piezoelectric sensors 3004, 3006 are plotted. In the graph 3900, the sum 3908 of the voltages of the sensor signals generated by the loadbeam piezoelectric sensors 2902, 2904 and the difference 3910 of the voltages of the sensor signals generated by the loadbeam piezoelectric sensors 2902, 2904 are also plotted. As can be seen from the graphs 3800, 3900, a first torsion mode 3812, 3912, a second torsion mode 3814, 3914, and an arm sway mode 3816, 3916 can be detected with the difference 3810, 3910 of the sensor signals from either the flexure piezoelectric sensors 3004, 3006 or the loadbeam piezoelectric sensors 2902, 2904. Further, a leg torsion mode 3818, 3918, a $3^{rd}$ torsion mode 3820, 3920 and a micro-microactuator sway mode 3822, 3922 can be detected with the difference 3810, 3910 of the sensor signals from either the flexure piezoelectric sensors 3004, 3006 or the loadbeam piezoelectric sensors 2902, 2904. Thus, the difference 3810, 3910 of the sensor signals can be used to compensate for or suppress the sway and torsion excitation modes.

Figure 40:
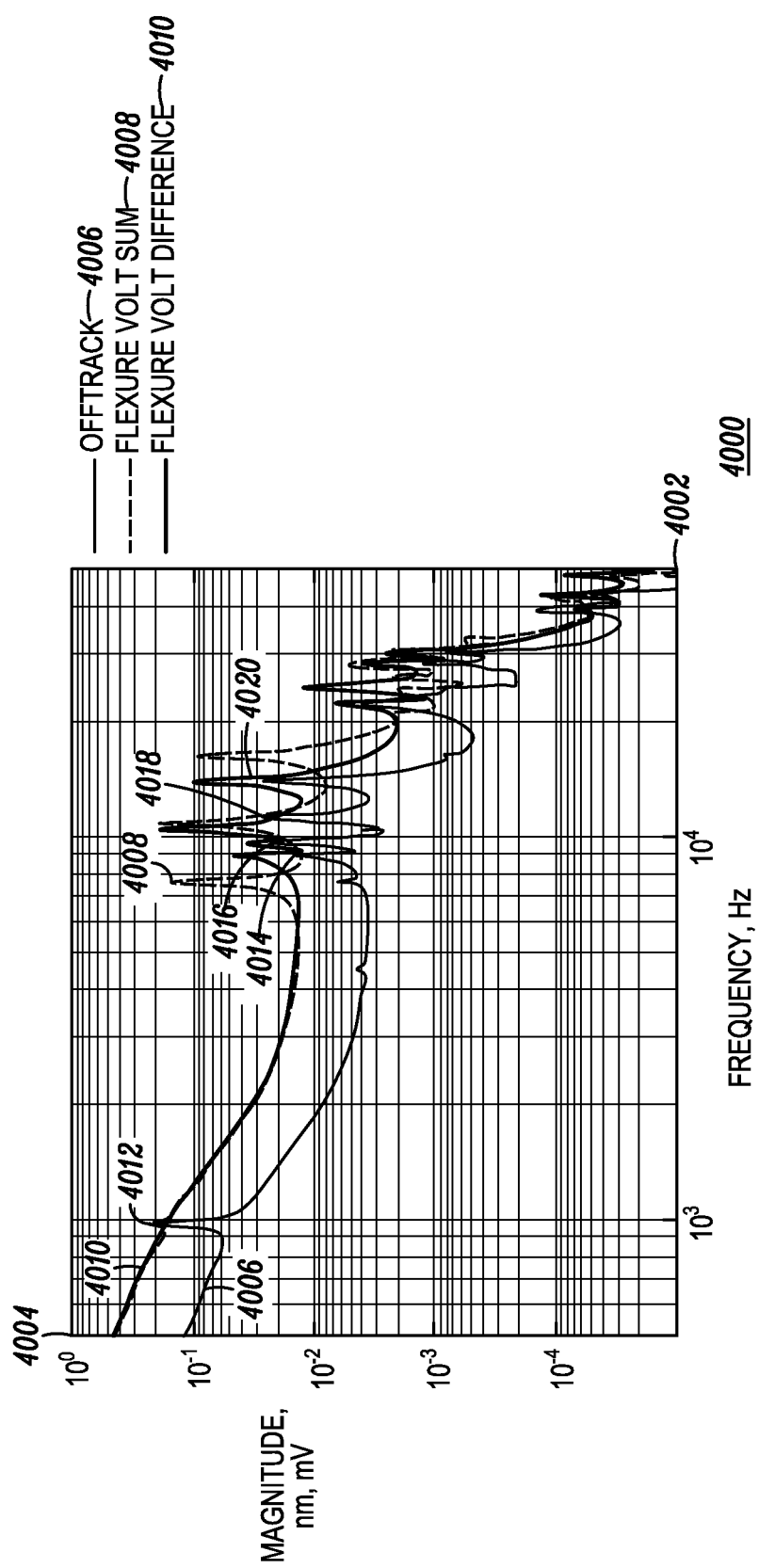
FIG. 40 illustrates a graph of offtrack displacement and flexure piezoelectric sensor voltage sum and difference for turbulence excitation in accordance with the present embodiment.
Figure 41:
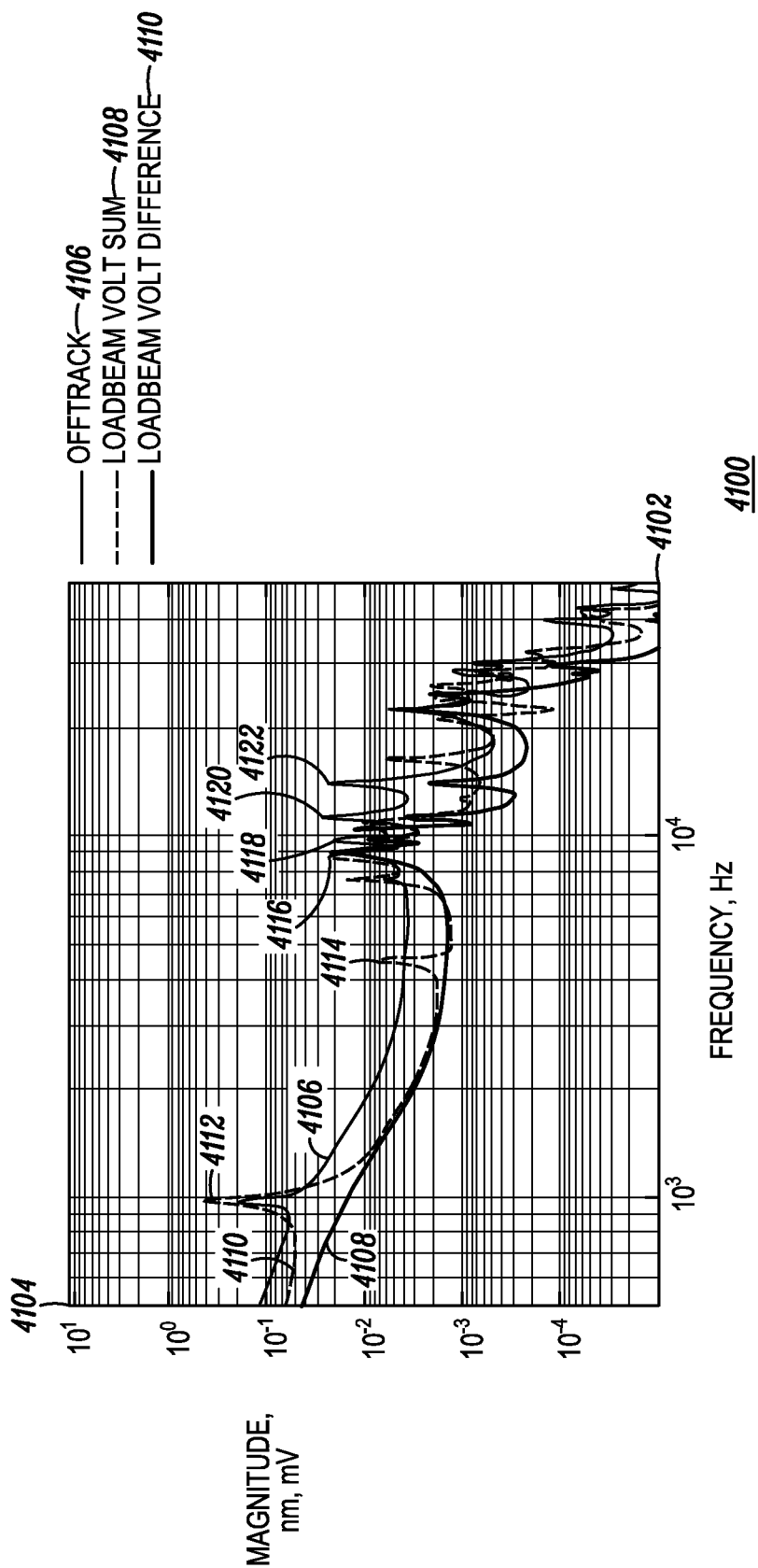
FIG. 41 illustrates a graph of offtrack displacement and loadbeam piezoelectric sensor voltage sum and difference for turbulence excitation in accordance with the present embodiment.

Referring also to FIG. 40 and FIG. 41, graphs 4000, 4100 of offtrack displacement and flexure piezoelectric sensor voltage sum and difference for turbulence excitation in accordance with the present embodiment is provided, where vibrational frequency is plotted along the x-axis 4002, 4102 and displacement and sensed voltage is plotted along the y-axis 4004, 4104. The offtrack displacements 4006, 4106 are experienced under the effect of turbulence excitation. In the graph 4000, the sum 4008 of the voltages of the sensor signals generated by the flexure piezoelectric sensors 3004, 3006 and the difference 4010 of the voltages of the sensor signals generated by the flexure piezoelectric sensors 3004, 3006 are plotted. In the graph 4100, the sum 4108 of the voltages of the sensor signals generated by the loadbeam piezoelectric sensors 2902, 2904 and the difference 4110 of the voltages of the sensor signals generated by the loadbeam piezoelectric sensors 2902, 2904 are also plotted. As can be seen from the graphs 4000, an arm mode 4012, a first torsion mode 4014, a second torsion mode 4016, an arm sway mode 4018, and a flexure leg torsion mode 4020 can be detected with the sum 4008 or the difference 4010 of the sensor signals from either the flexure piezoelectric sensors 3004, 3006. Referring to the graph 4100, an arm mode 4112, a second arm bending mode 4114, a first torsion mode 4114, a second torsion mode 4116, an arm sway mode 4118, and a flexure leg torsion mode 4120 can be detected with the sum 4108 or the difference 4110 of the sensor signals from either of the loadbeam piezoelectric sensors 2902, 2904. Thus, the sums 4008, 4108 or the difference 4010, 4110 of the sensor signals can be used to compensate for or suppress the bending, sway and torsion modes of the actuator assembly. Thus, it has been seen that most of the offtrack displacement peaks for all excitations, voice coil, piezoelectric actuator and turbulence actuation are able to be sensed either by the sum or difference of the flexure or loadbeam sensors. Since they can be sensed, sensor signals from the flexure or loadbeam sensors can be used by the servo system to reduce offtrack displacement and/or improve servo characteristics.

Figure 42:
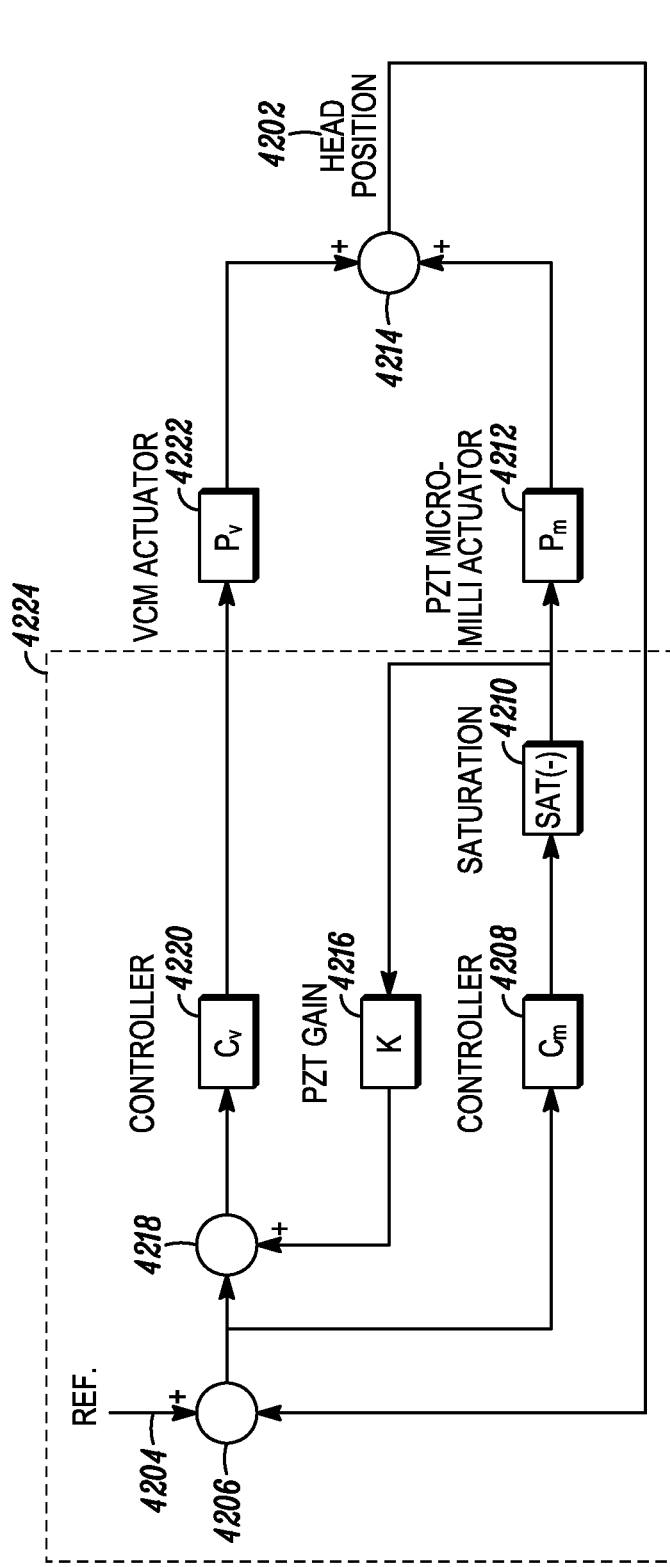
FIG. 42 depicts a block diagram of a conventional actuator arm control system.

FIG. 42 depicts a block diagram 4200 of a conventional micro-milliactuator arm control system. A head position 4202 is compared with a reference voltage 4204 at comparator 4206 to determine how much actuator arm assembly movement is needed to place the arm over the appropriate disk track location in response to received location information. Once the actuator arm assembly movement is determined, a voice coil motor actuator signal (i.e., a coarse actuator signal) and a piezoelectric actuator signal (i.e., a fine actuator control signal) are generated to move the head position over a location indicated by the location information. The piezoelectric actuator signal is generated by processing the combined signal from the comparator 4206 through a controller 4208 and saturation block 4210 to specify an appropriate voltage level for the piezoelectric actuator signal to be provided to piezoelectric actuators 4212 and redefining the head position 4202 as a combination of the piezoelectric actuator 4212 movement and movement from a voice coil motor actuator 4222.

The voice coil motor actuator 4222 is controlled by a VCM actuator signal defined by combining at mixer 4218 the piezoelectric actuator signal multiplied by factor K at voltage gain block 4216 and the combined signal from the comparator 4206. A controller 4220 processes the resultant signal to generate the VCM actuator signal, providing the VCM actuator signal to the voice coil motor actuator 4222 for movement of the head position. The components 4204, 4206, 4208, 4210, 4216, 4218 and 4220 thus serve as a controller 4224 for generating the actuator control signals in response to the location information.

Figure 43:
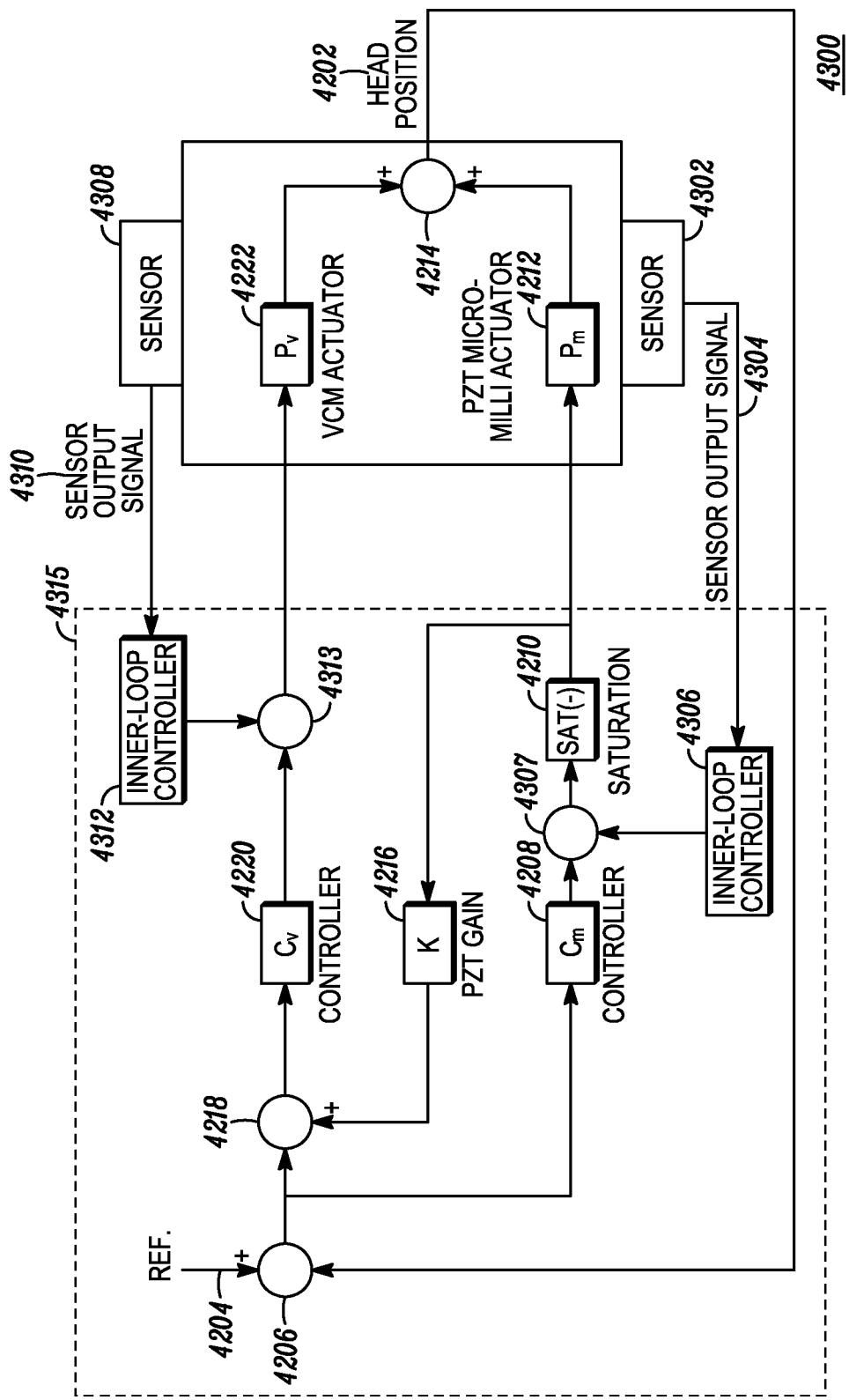
FIG. 43 depicts a block diagram of a sensor feedback actuator arm control system for reducing swage and piezoelectric actuator excitation resonance in accordance with the present embodiment.

FIG. 43 depicts a block diagram 4300 of a sensor feedback actuator arm control system for reducing swage and piezoelectric actuator excitation resonance in accordance with the present embodiment. The block diagram 4300 utilizes the output of the piezoelectric sensors 4302, 4308 for attenuation of the swage excitation and the piezoelectric actuator excitation. The piezoelectric sensors 4302, 4308 can be one or more of inner or outer diameter loadbeam piezoelectric sensors or inner or outer diameter flexure piezoelectric sensors. As seen from the discussion above, the head position 4202 (i.e., the position of the slider which incorporates the read/write head) is controlled by the actuator arm movement (VCM actuator 4222 $P_v$) and the milliactuator movement (PZT micro-milliactuator 4212 $P_m$). In accordance with the present embodiment, sensor signals 4304, 4310 are provided to respective inner-loop controllers 4306, 4312 to modify the coarse and fine actuator signals during operation by being summed with the signals provided to the VCM actuator (for swage excitation compensation) at mixer 4313 and with the piezoelectric micro-milliactuator control signals (for piezoelectric actuator excitation compensation) at mixer 4307, thereby suppressing and/or compensating for effects of undesired swage and piezoelectric actuator excitation vibrations. In this manner, the components 4204, 4206, 4208, 4210, 4216, 4218, 4220, 4306, 4307, 4312 and 4313 operate as a controller 4315 for generating the coarse and fine actuator control signals (i.e., the VCM actuator signal and the piezoelectric actuator signal) in response to the location information and the sensor signals.

Figure 44:
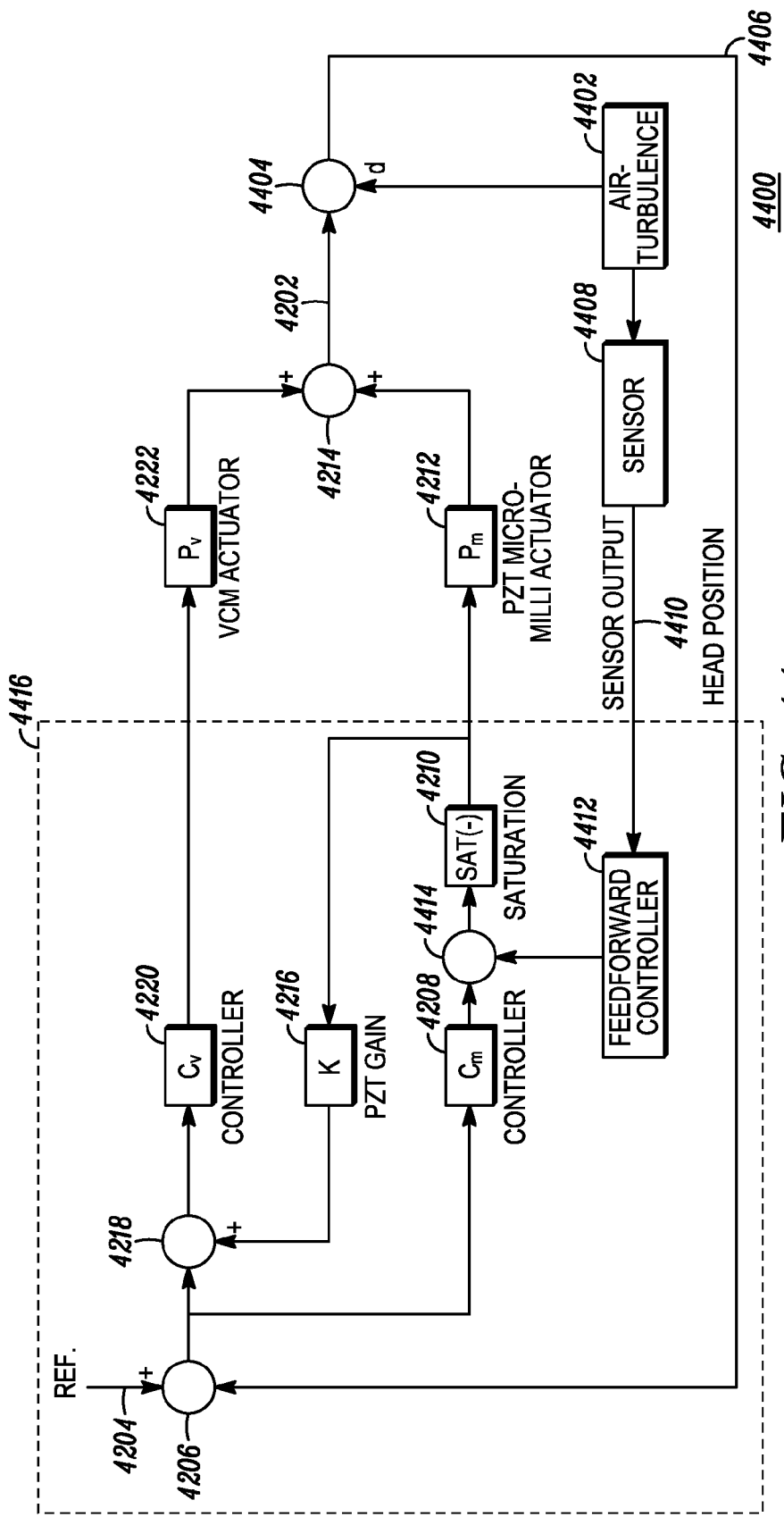
FIG. 44 depicts a block diagram of a sensor feedforward actuator arm control system for reducing turbulence excitation resonance in accordance with the present embodiment.

FIG. 44 depicts a block diagram 4400 of a sensor feedforward actuator arm control system for reducing turbulence excitation resonance in accordance with the present embodiment. The head location 4202 in space above the disk medium is controlled not only by the desired actuator arm movement (VCM actuator 4222 $P_v$) and the desired micro-milliactuator movement (PZT micro-milliactuator 4212 $P_m$) but is also affected by unwanted resonances excited by both actuator and milliactuator excitations (as seen and compensated for in FIG. 43) and turbulence excitation of the arm, loadbeam, flexure and the disk itself. The air turbulence 4402 affects the head position 4202 by displacing the head a distance d as represented by the mixer 4404 to a position 4406. One or more of the sensors 4408 can also sense the air turbulence, the sensor signal representing turbulence excitation 4410 being provided to a feedforward controller 4412 such that the coarse and fine actuator control signals fed to the VCM actuator 4222 and the PZT micro-milliactuator 4212 are generated in response to location information and the sensor signal 4410 by being modified during operation by the output of the feedforward controller 4412. In this manner, the components 4204, 4206, 4208, 4210, 4216, 4218, 4220, 4412 and 4414 operate as a controller 4416 for generating the actuator control signals (i.e., the VCM actuator signal and the piezoelectric actuator signal) in response to the location information and the sensor signals.

Since the piezoelectric sensors can sense many modes of vibration excited by the sources mentioned above, the sensor signals can be sent to the controller 4315, 4416 to assist in controlling undesired movement of the head by the controller 4315, 4416 generating the actuator control signals for the VCM actuator 4222 and the PZT micro-milliactuator 4212 in response to location information (e.g., desired head location corresponding to an identified track and sector on the disk 102 and present head position 4202) and the sensor signals 4304, 4310, 4410 received from one or more sensors physically coupled to the actuator arm assembly for vibration compensation and suppression, the sensor signals generated 4304, 4310, 4410 in response to vibrations sensed by the one or more sensors 4302, 4308, 4408 during operation of the actuator arm assembly.

Figure 45:
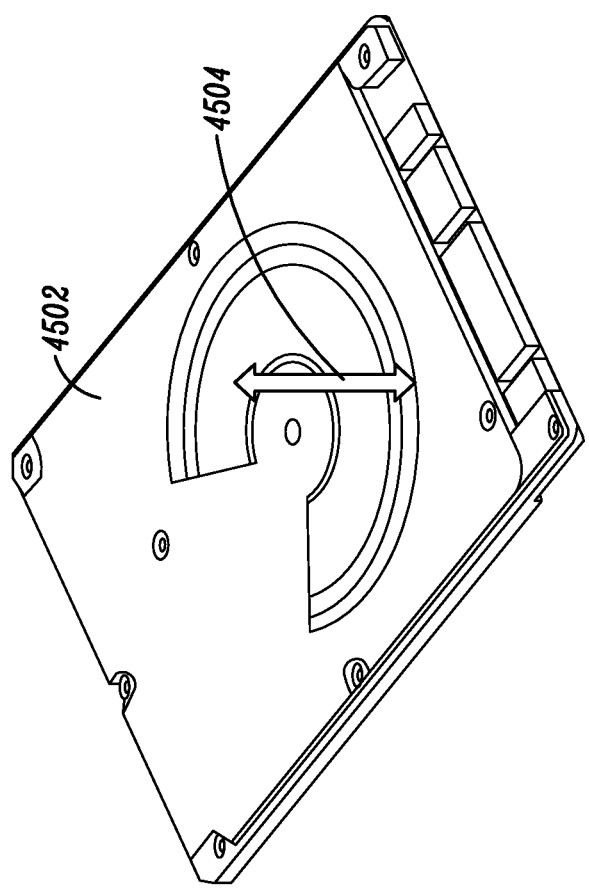
FIG. 45 depicts a top front left perspective view of a hard disk drive housing highlighting the z-axis shock force to which the housing may be subjected in accordance with the present embodiment.
Figure 46:
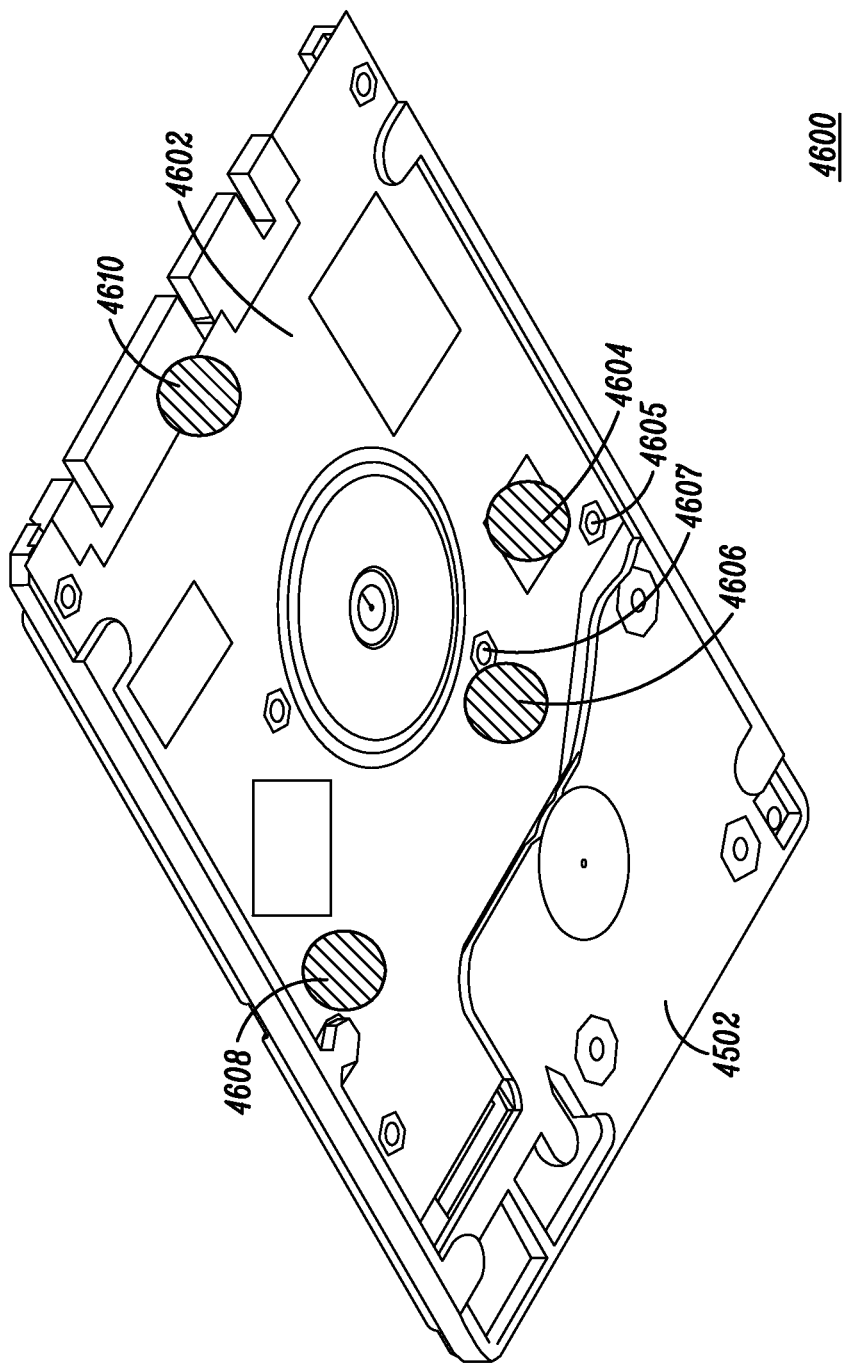
FIG. 46 depicts a bottom front left perspective view of the hard disk drive housing of FIG. 45 highlighting four locations where z-axis shock displacements and accelerations will be measured in accordance with the present embodiment.

Thus it has been shown that, in accordance with the present embodiment, undesired vibrations due to VCM (swage) excitation, piezoelectric actuator excitation and turbulence excitation can be compensated or suppressed. The present embodiment can also be used to sense z-axis shock. Referring to FIG. 45, a top front left perspective view 4500 of a hard disk drive housing 4502 depicts the nature of a z-axis shock force (represented by arrow 4504) to which the housing 4502 may be subjected. The z-axis shock force could result from dropping the hard disk drive or hitting the housing 4502 with a certain force (e.g., from an object striking the housing 4502). Referring to FIG. 46, a bottom front left perspective view 4600 of the hard disk drive housing 4502 depicts conventional z-axis shock force sensing. A printed circuit board (PCB) 4602 enclosed within the housing 4502 typically has one or more shock sensors mounted on the PCB for sensing vibrations resulting from z-axis shock force. The shock sensors measure z-axis shock force and generate from those measurements shock sensor outputs. The shock sensor outputs from these PCB shock sensors could be used, for example, to "park" the actuator arm assembly to prevent further damage or to stop reading or writing data to the disk until the shock has passed. For purposes of analysis, four possible shock sensor locations are showed, a first PCB shock sensor 4604 located near a PCB mounting screw 4605, a second PCB shock sensor 4606 mounted near another PCB mounting screw 4607 and a third PCB shock sensor 4608 and a fourth PCB shock sensor 4610, both of which are not near any PCB mounting screws.

Figure 47:
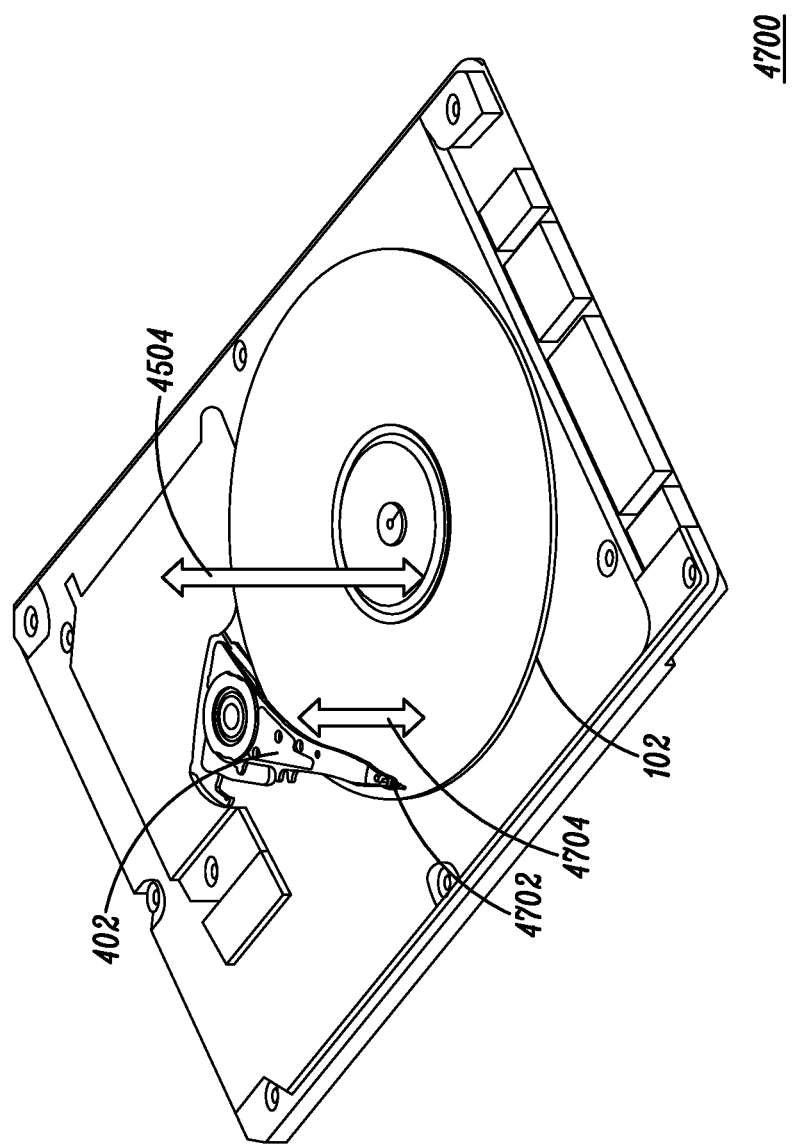
FIG. 47 depicts a top front left perspective view of the interior of the hard disk drive housing of FIG. 45 highlighting parameters of simulation of the z-axis shock force in accordance with the present embodiment.

While conventionally the PCB shock sensors 4604, 4606, 4608, 4610 can be used for z-axis shock force detection, the loadbeam and/or flexure piezoelectric sensors in accordance with the present embodiment can also be used for z-axis shock detection. FIG. 47 depicts a top front left perspective view 4700 of the interior of the hard disk drive housing highlighting parameters of simulation of the z-axis shock force for operation in accordance with the present embodiment. As the loadbeam sensors and flexure sensors are on the actuator arm assembly 404 and there is a preload 4702 (approximately two grams) on the head of the actuator arm assembly 402 to keep the slider flying over the disk, measuring the force 4704 attempting to unload the slider would use the sensor signals to sense the disk drive to the z-axis shock 4504.

Figure 48:
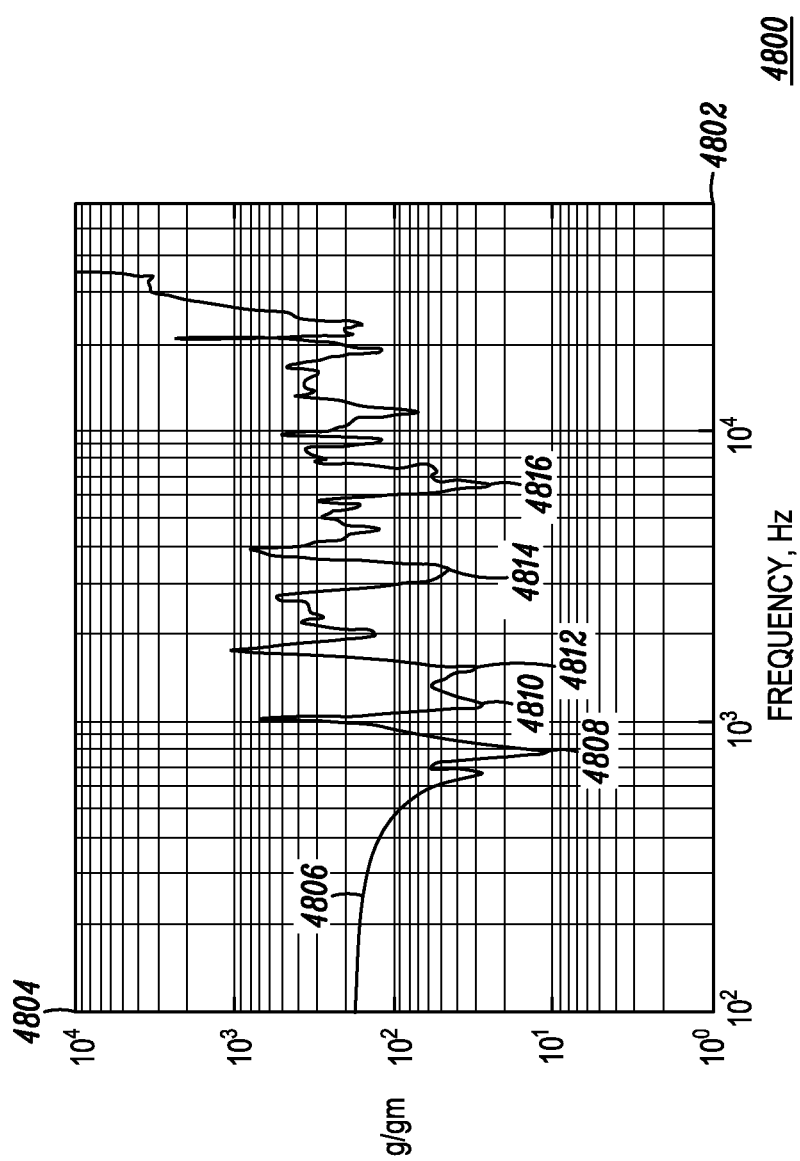
FIG. 48 illustrates a graph of the acceleration in g's per gram of slider preload force required to unload the slider in response to 1 g steady-state sinusoidal z-axis acceleration accordance with the present embodiment.

FIG. 48 illustrates a graph 4800 of the steady-state sinusoidal acceleration in g's per gram of slider preload required to unload the slider from the disk as a function of frequency of excitation. The graph 4800 plots frequency along the x-axis 4802 and the acceleration along the y-axis. The force 4806 required to unload the slider in response to a steady-state sinusoidal z-axis acceleration is dominated by five modes: an actuator pitching/arm bending mode 4808, an axial mode 4810, an actuator axial mode 4812, an actuator pitching mode 4814 and an axial disk mode 4816.

Figure 49:
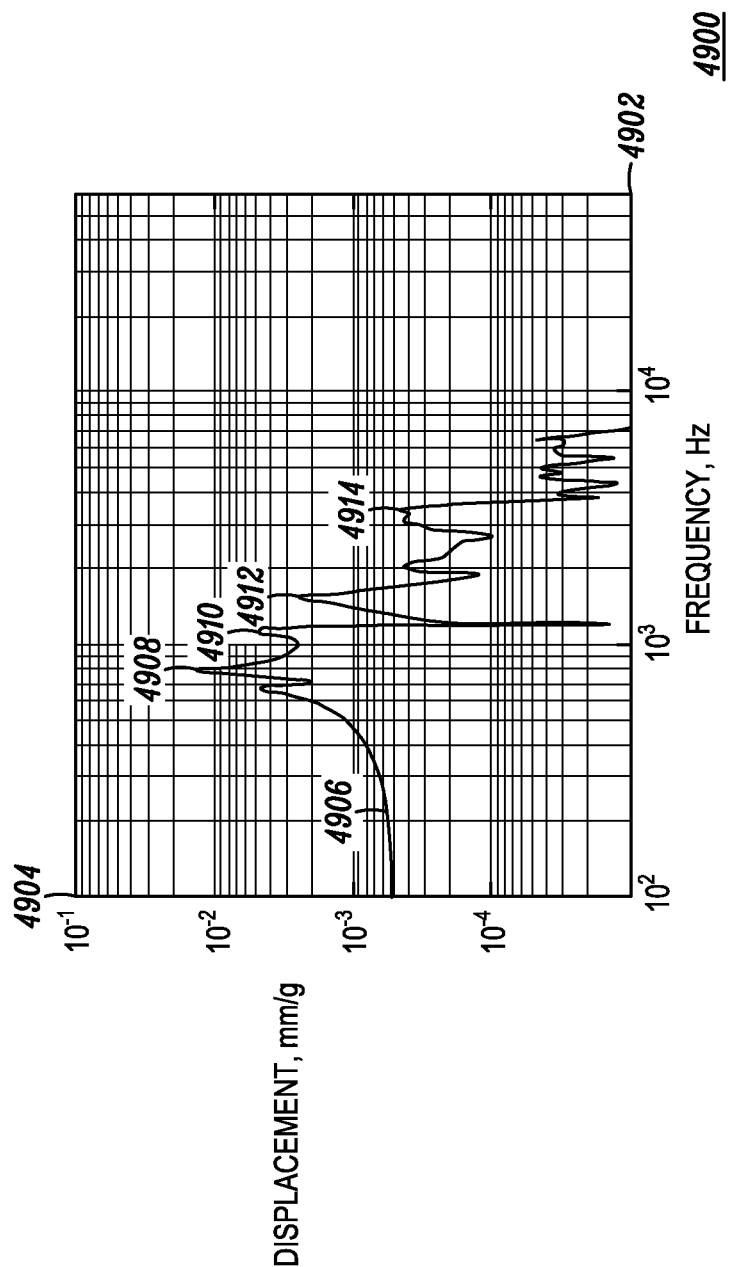
FIG. 49 illustrates a graph of displacement between the top arm and the disk in response to 1 g steady-state sinusoidal z-axis acceleration in accordance with the present embodiment.

Referring to FIG. 49, a graph 4900 plotting frequency on the x-axis 4902 and displacement on the y-axis 4904 depicts displacement 4906 between the top arm and the disk in response to a steady-state one g sinusoidal z-axis acceleration in accordance with the present embodiment. As can be seen from the graph 4900, the displacement is dominated by four modes: an actuator pitching/arm bending mode 4908, an axial mode 4910, an actuator axial mode 4912 and an actuator pitching mode 4914, four of the five modes dominating the force 4806 (FIG. 48) required to unload the slider in response to a sinusoidal z-axis shock force excitation.

Figure 50:
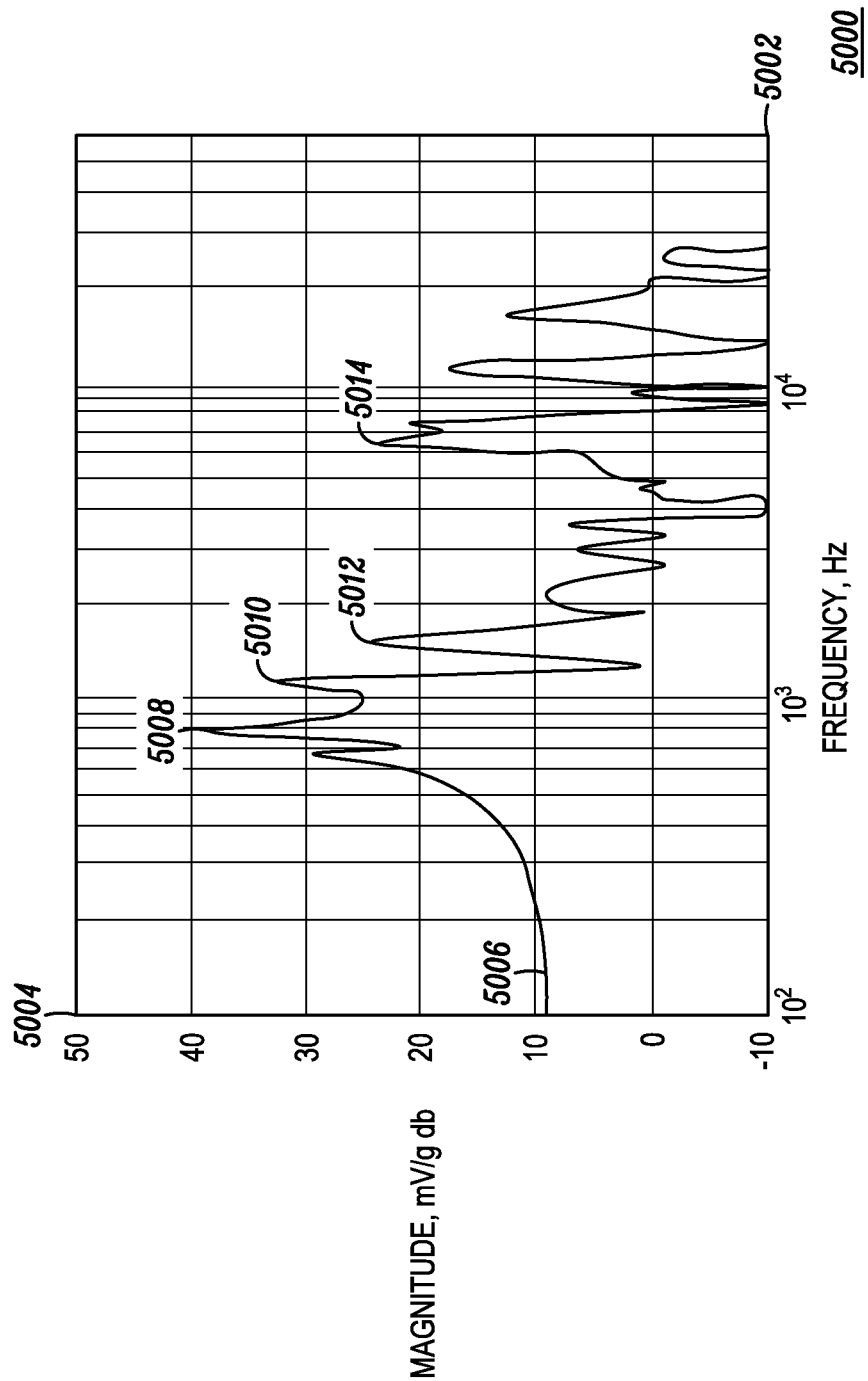
FIG. 50 illustrates a graph of flexure piezoelectric sensor voltage sum in response to 1 g steady-state sinusoidal z-axis acceleration in accordance with the present embodiment.
Figure 51:
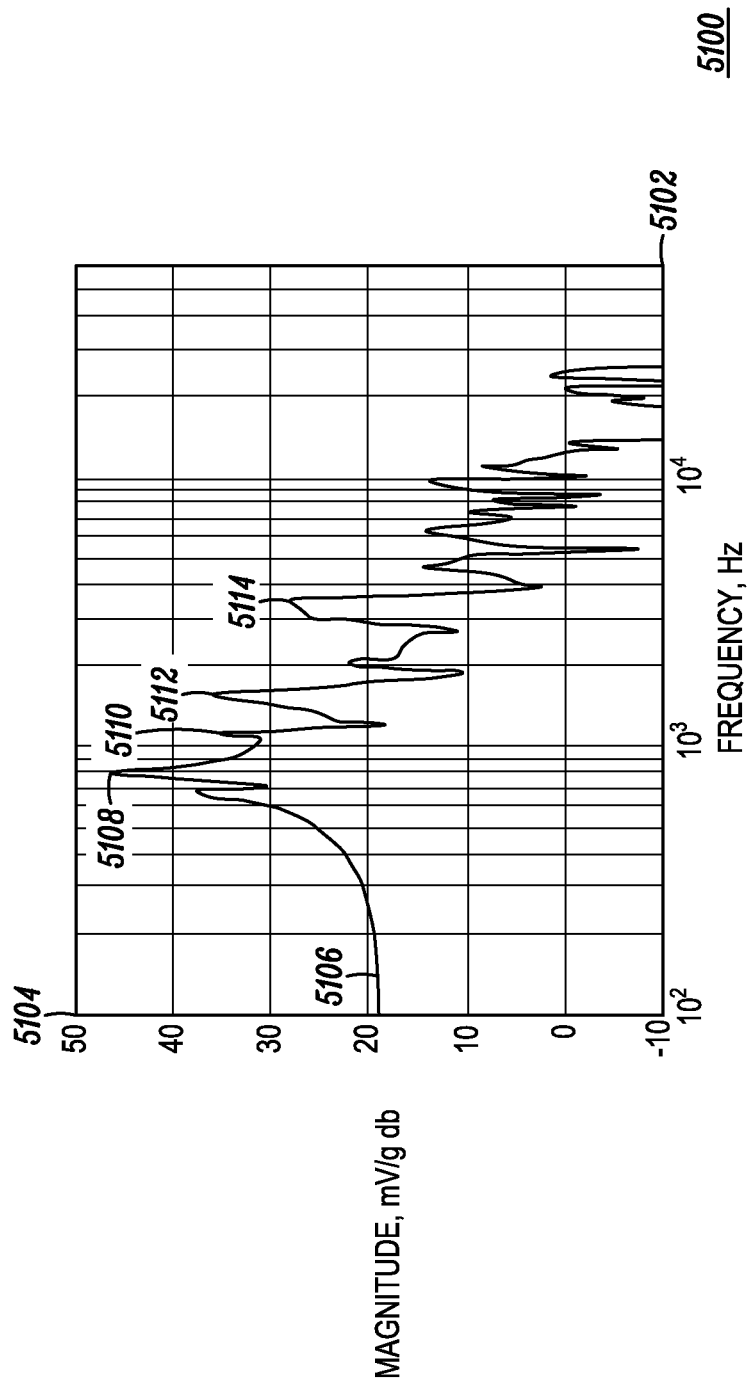
FIG. 51 illustrates a graph of loadbeam piezoelectric sensor voltage sum in response to 1 g steady-state sinusoidal z-axis acceleration in accordance with the present embodiment.

Referring to FIGS. 50 and 51, graphs 5000, 5100 illustrate voltage sums of flexure piezoelectric sensor voltages and loadbeam piezoelectric sensor voltages in response to the one g sinusoidal z-axis acceleration, with frequency plotted on the x-axis 5002, 5102 and voltage plotted on the y-axis 5004, 5104. It can be seen that the flexure sensor voltage sum 5006 and the loadbeam sensor voltage sum 5106 are both dominated by the same four modes as seen in the graphs 4800, 4900 (an actuator pitching/arm bending mode 5008, 5108, an axial mode 5010, 5110, an actuator axial mode 5012, 5112 and an actuator pitching mode 5014, 5114). This correlation indicates that the sensor signals from one or more of the flexure piezoelectric sensors and/or the loadbeam piezoelectric sensors can be used for z-axis shock force detection.

Figure 52:
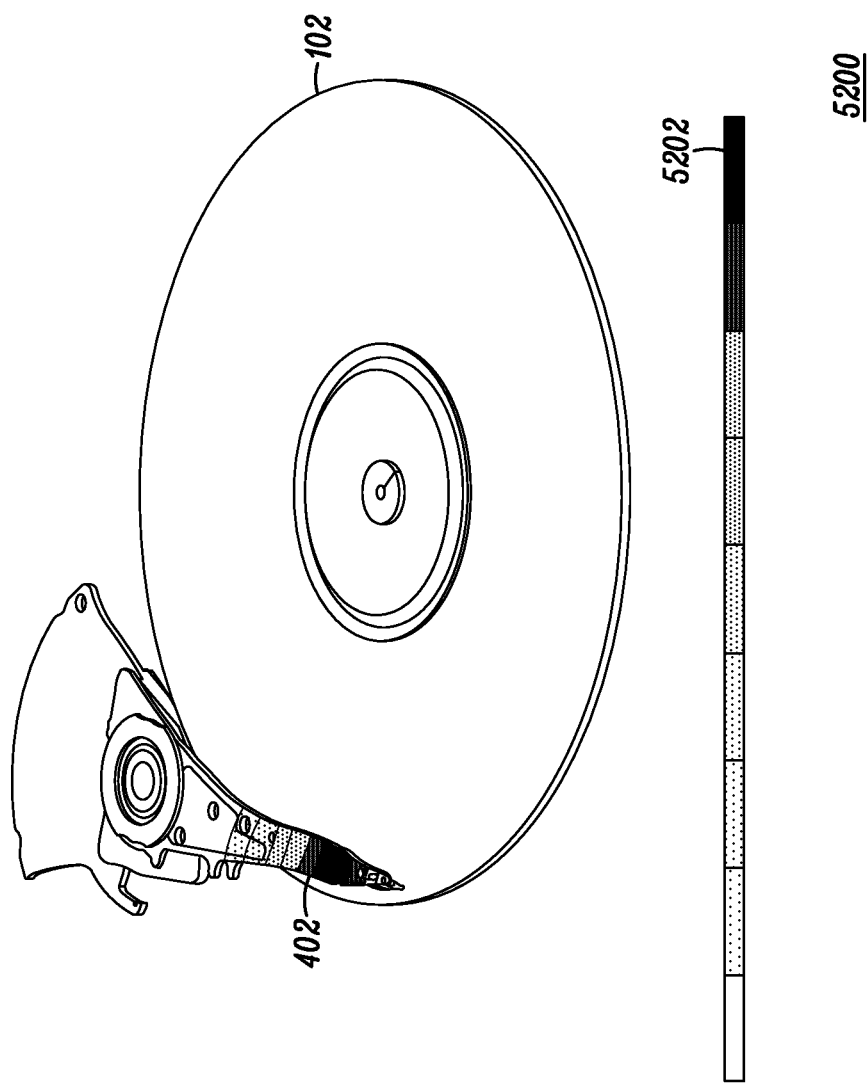
FIG. 52 depicts a top front right perspective view of an actuator with unimount arm flying over a disk and highlighting an actuator pitching, first arm bending mode which can be excited by z-axis acceleration in accordance with the present embodiment.
Figure 53:
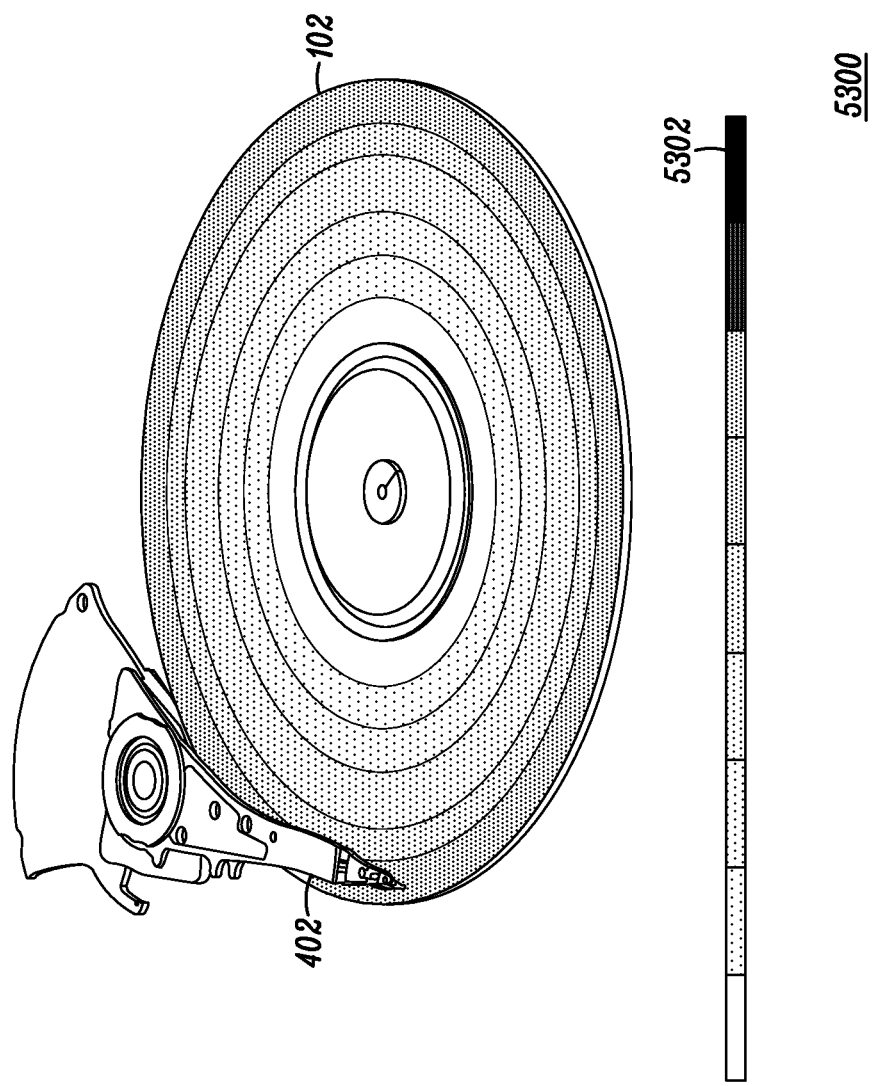
FIG. 53 depicts a top front right perspective view of an actuator with unimount arm flying over a disk and highlighting a first axial disk mode which can be excited by z-axis acceleration in accordance with the present embodiment.
Figure 54:
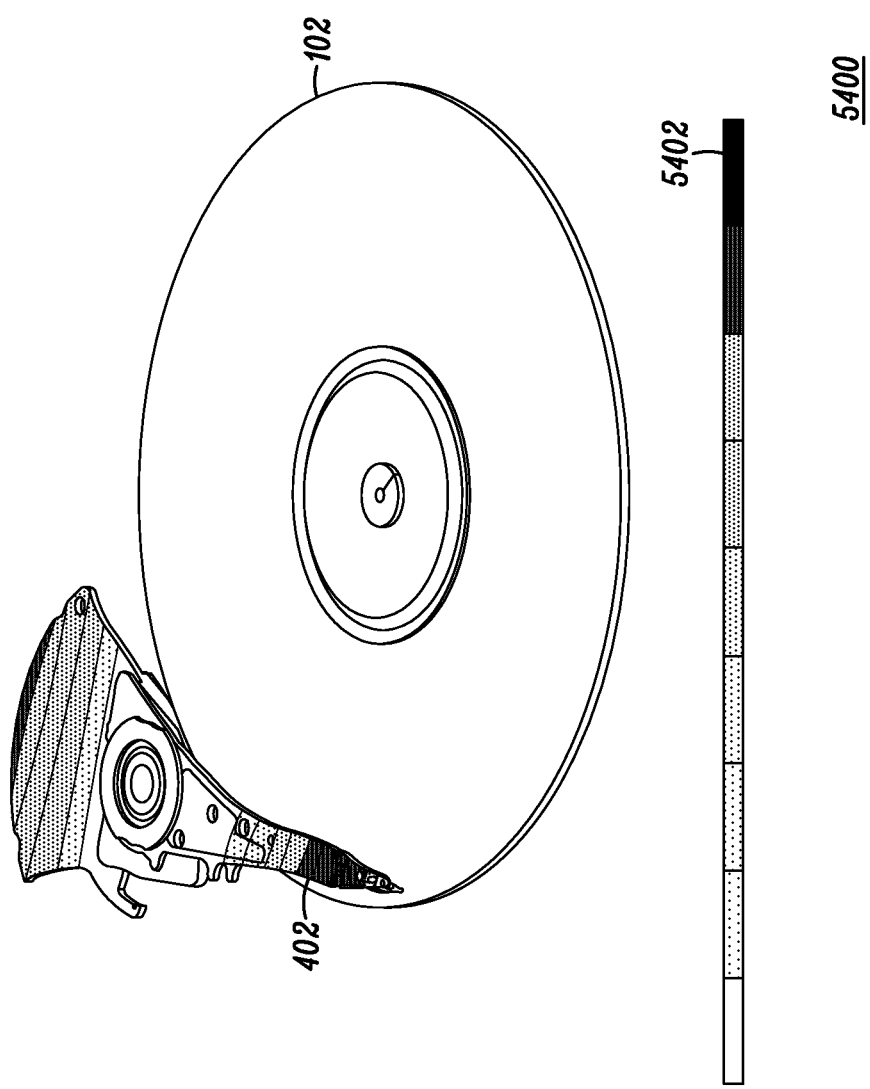
FIG. 54 depicts a top front right perspective view of an actuator with unimount arm flying over a disk and highlighting a second actuator axial mode which can be excited by z-axis acceleration in accordance with the present embodiment.
Figure 55:
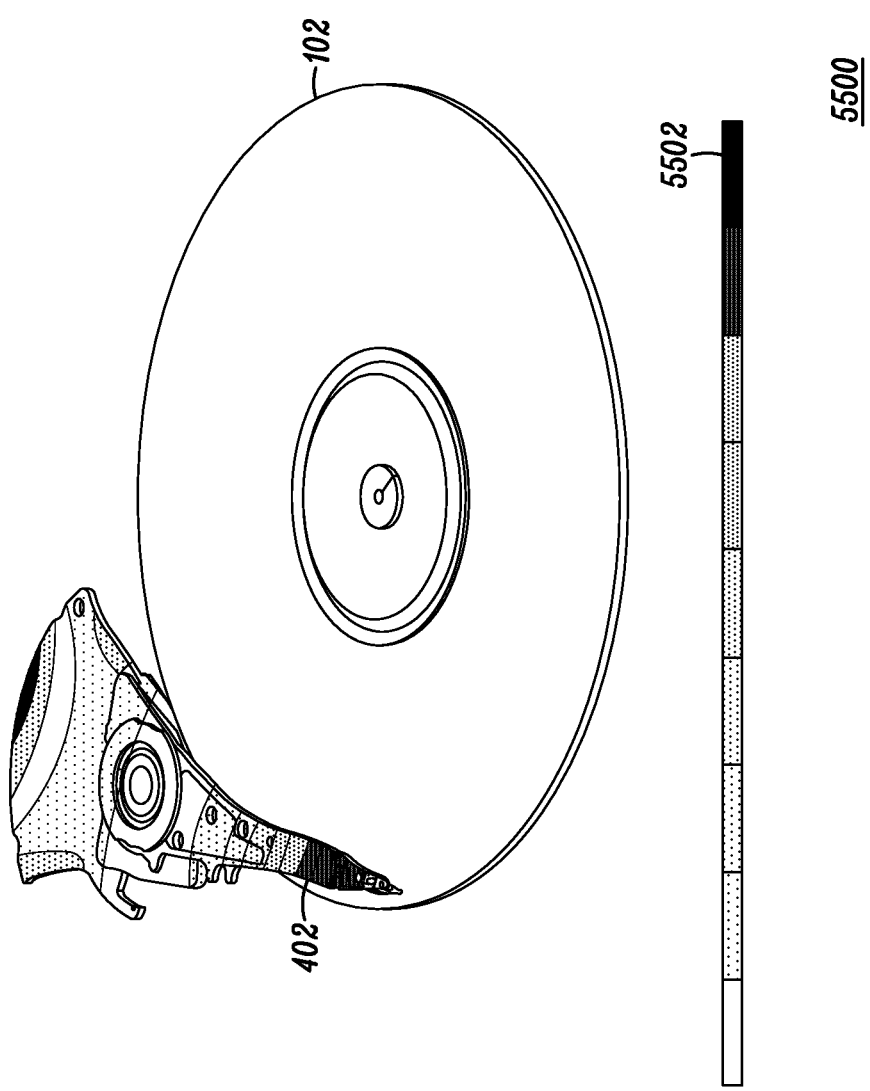
FIG. 55 depicts a top front right perspective view of an actuator with unimount arm flying over a disk and highlighting a second actuator pitching mode which can be excited by z-axis acceleration in accordance with the present embodiment.
Figure 56:
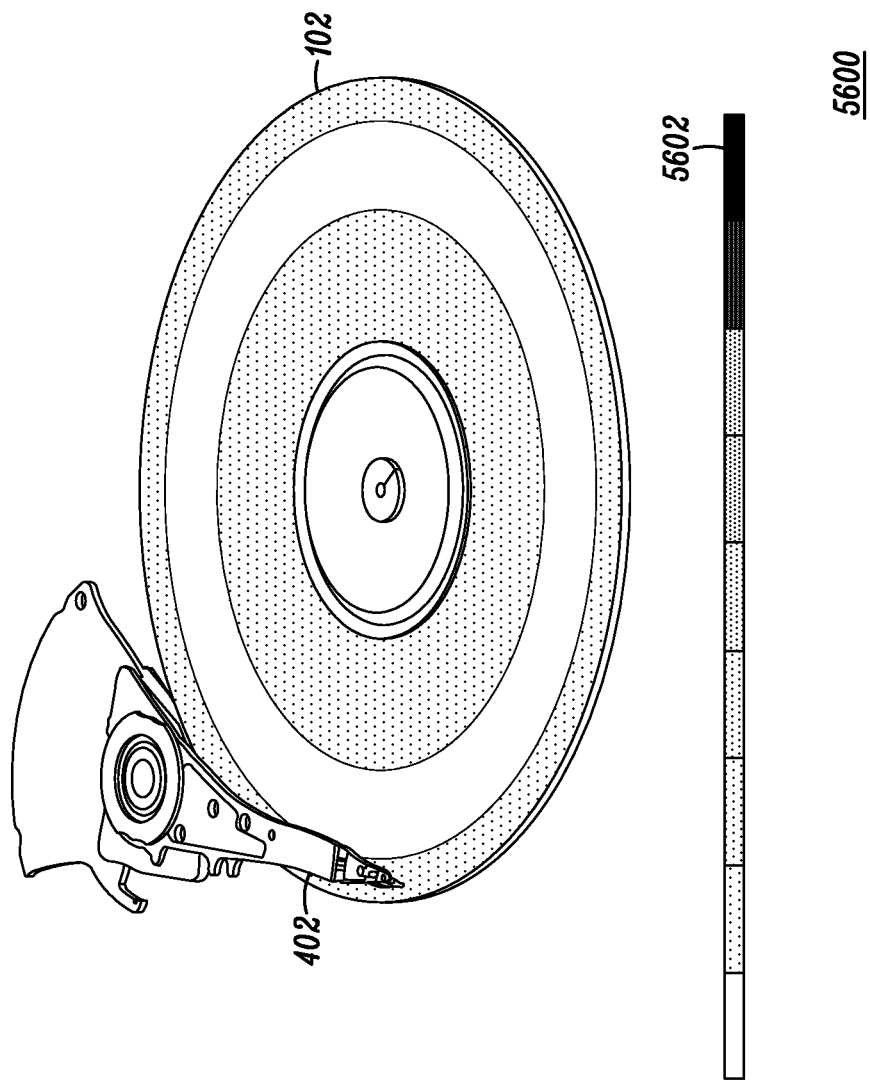
FIG. 56 depicts a top front right perspective view of an actuator with unimount arm flying over a disk and highlighting a second axial disk mode which can be excited by z-axis acceleration in accordance with the present embodiment.

FIGS. 52 to 56 are perspective views of various pitching, bending, axial and axial disk modes able to be excited by z-axis shock force. FIG. 52 depicts a top front right perspective displacement contour view 5200 of the actuator arm assembly 402 with a unimount arm flying over the disk 102. An actuator pitching first arm bending mode which can be excited by z-axis acceleration displaces portions of the actuator arm assembly 402 as indicated by the shading and as compared to a bar legend 5202. FIG. 53 depicts a top front right perspective displacement contour view 5300 of the actuator arm assembly 402 with a unimount arm flying over the disk 102. A first axial disk mode which can be excited by z-axis acceleration displaces portions of the head of the actuator arm assembly 402 and the disk 102 as indicated by the shading and as compared to a bar legend 5302. FIG. 54 depicts a top front right perspective displacement contour view 5400 of the actuator arm assembly 402 with unimount arm flying over the disk 102. A second actuator axial mode which can be excited by z-axis acceleration displaces portions of the actuator arm assembly 402 as indicated by the shading and as compared to a bar legend 5402. FIG. 55 depicts a top front right perspective displacement contour view 5500 of the actuator arm assembly 402 with unimount arm flying over the disk 102. A second actuator pitching mode which can be excited by z-axis acceleration displaces portions of the actuator arm assembly 402 as indicated by the shading and as compared to a bar legend 5502. And FIG. 56 depicts a top front right perspective displacement contour view 5600 of the actuator arm assembly 402 with unimount arm flying over the disk 102. A second axial disk mode which can be excited by z-axis acceleration displaces portions of the head of the actuator arm assembly 402 and the disk 102 as indicated by the shading and as compared to a bar legend 5602.

Figure 57:
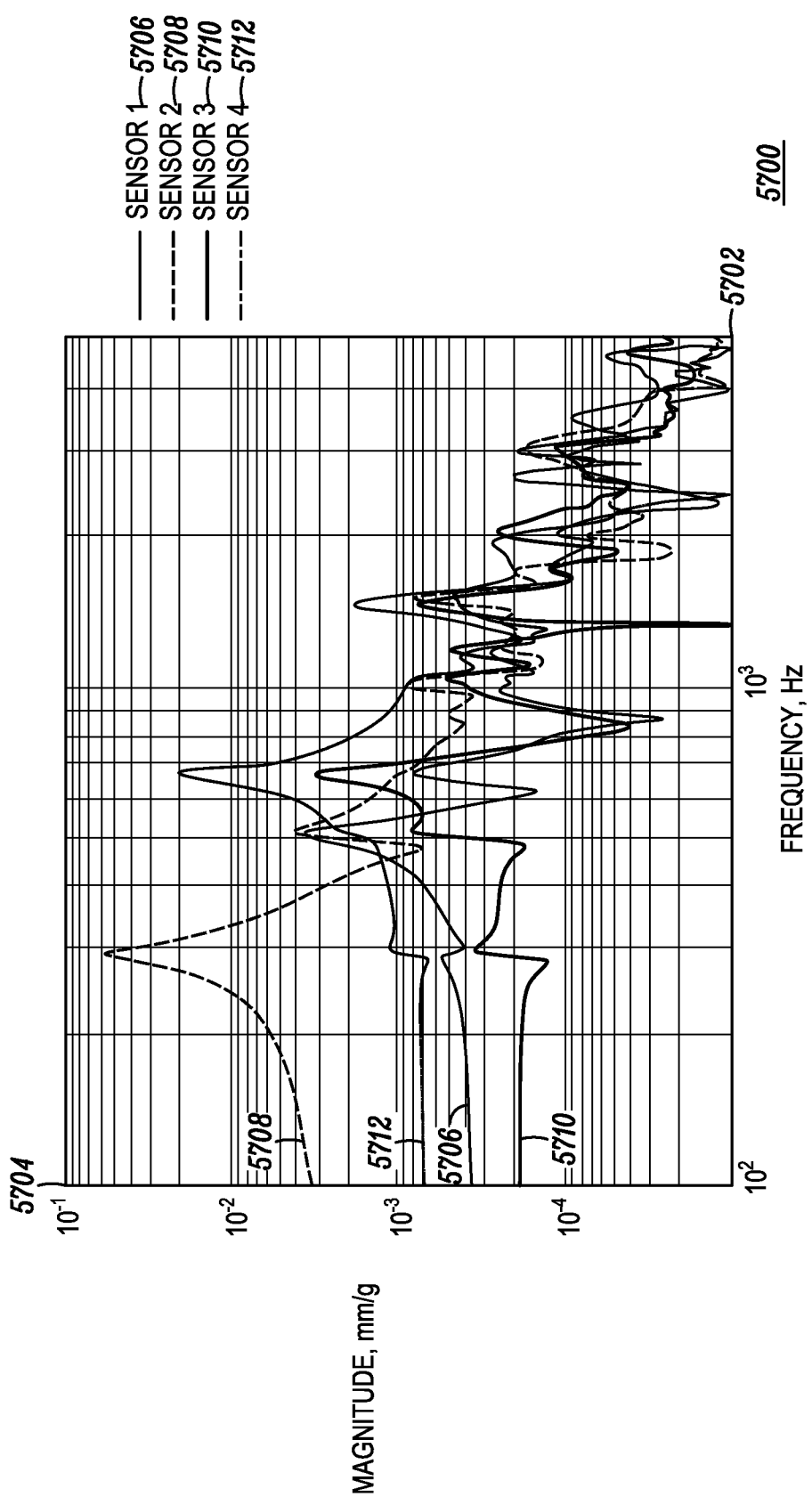
FIG. 57 illustrates a graph of four shock sensor displacement versus frequency values measured at the four locations depicted in FIG. 46 when excited by steady-state 1 g sinusoidal z-axis acceleration in accordance with the present embodiment.

FIG. 57 illustrates a graph 5700 of frequency (on x-axis 5702) versus displacement (on y-axis 5704) of the four PCB shock sensors 4604, 4606, 4608, 4610 (FIG. 46) when excited by a steady-state sinusoidal z-axis acceleration in accordance with the present embodiment. The four shock sensors 4604, 4610, 4606, 4608 have different transfer functions 5706, 5708, 5710, 5712 caused by the shape of the PCB 4602 and the location of the PCB shock sensors 4604, 4610, 4606, 4608 relative to the PCB screw 4605, 4607 locations.

Figure 58:
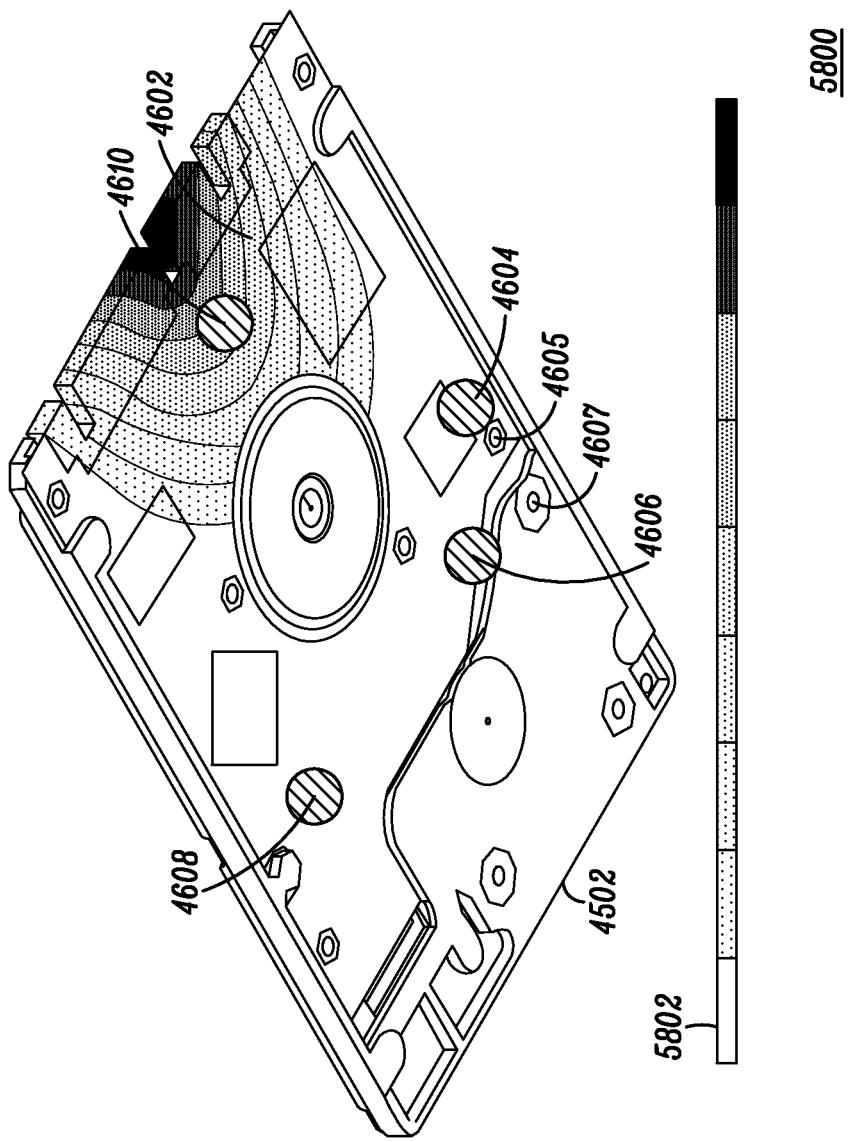
FIG. 58 depicts a bottom front left perspective view of the hard disk drive housing of FIG. 46 highlighting the four shock sensor locations and displacement contours for a mode at 291 Hz in accordance with the present embodiment.
Figure 59:
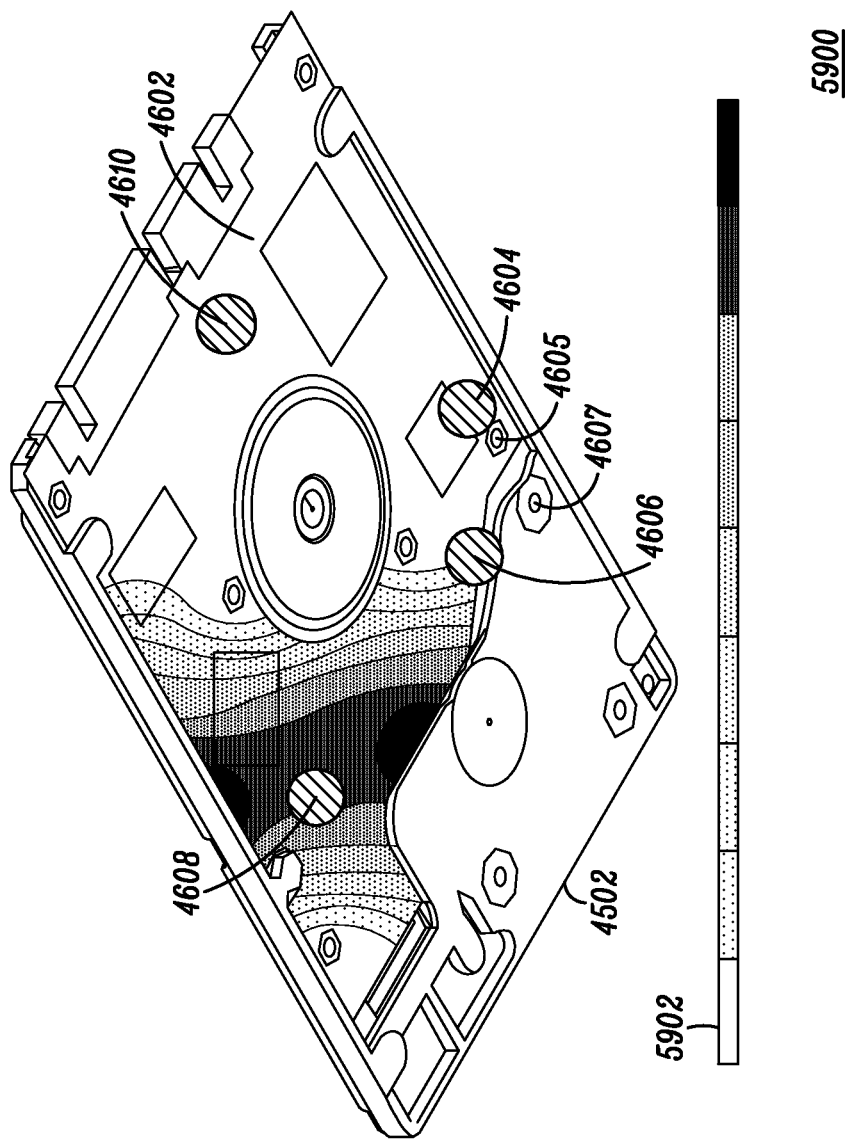
FIG. 59 depicts a bottom front left perspective view of the hard disk drive housing of FIG. 46 highlighting the four shock sensor locations and displacement contours for a mode at 670 Hz in accordance with the present embodiment in accordance with the present embodiment.

FIG. 58 depicts a bottom front left perspective displacement contour view 5800 of the hard disk drive housing 4502, the PCB 4602 and the four shock sensors 4604, 4606, 4608, 4610 for a mode at 291 Hz in accordance with the present embodiment. As seen in the displacement contour view 5800, when the z-axis shock force is applied to the hard disk drive, the PCB shock sensor 4610 will have a greater sensor signal output than the other three PCB shock sensors 4604, 4606, 4608 at 291 HZ as significant displacement motion occurs only at the PCB shock sensor 4610 as indicated by the shading when compared with a displacement legend bar 5802. Referring to FIG. 59 a bottom front left perspective displacement contour view 5900 depicts the hard disk drive housing 4502, the PCB 4602 and the four shock sensors 4604, 4606, 4608, 4610 for a mode at 670 Hz in accordance with the present embodiment. As seen in the displacement contour view 5900, when the z-axis shock force is applied to the hard disk drive, the PCB shock sensor 4608 will have a greater sensor signal output than the other three PCB shock sensors 4604, 4606, 4610 at 670 HZ as significant displacement motion only occurs at the PCB shock sensor 4608 as indicated by the shading when compared with a displacement legend bar 5902. Those skilled in the art will realize the PCB shock sensors 4608, 4610 will exhibit greater displacement motion when subjected to z-axis shock force as the PCB shock sensors 4608, 4610 are not located near any PCB mounting screws (e.g., the PCB mounting screws 4605, 4607).

Figure 60:
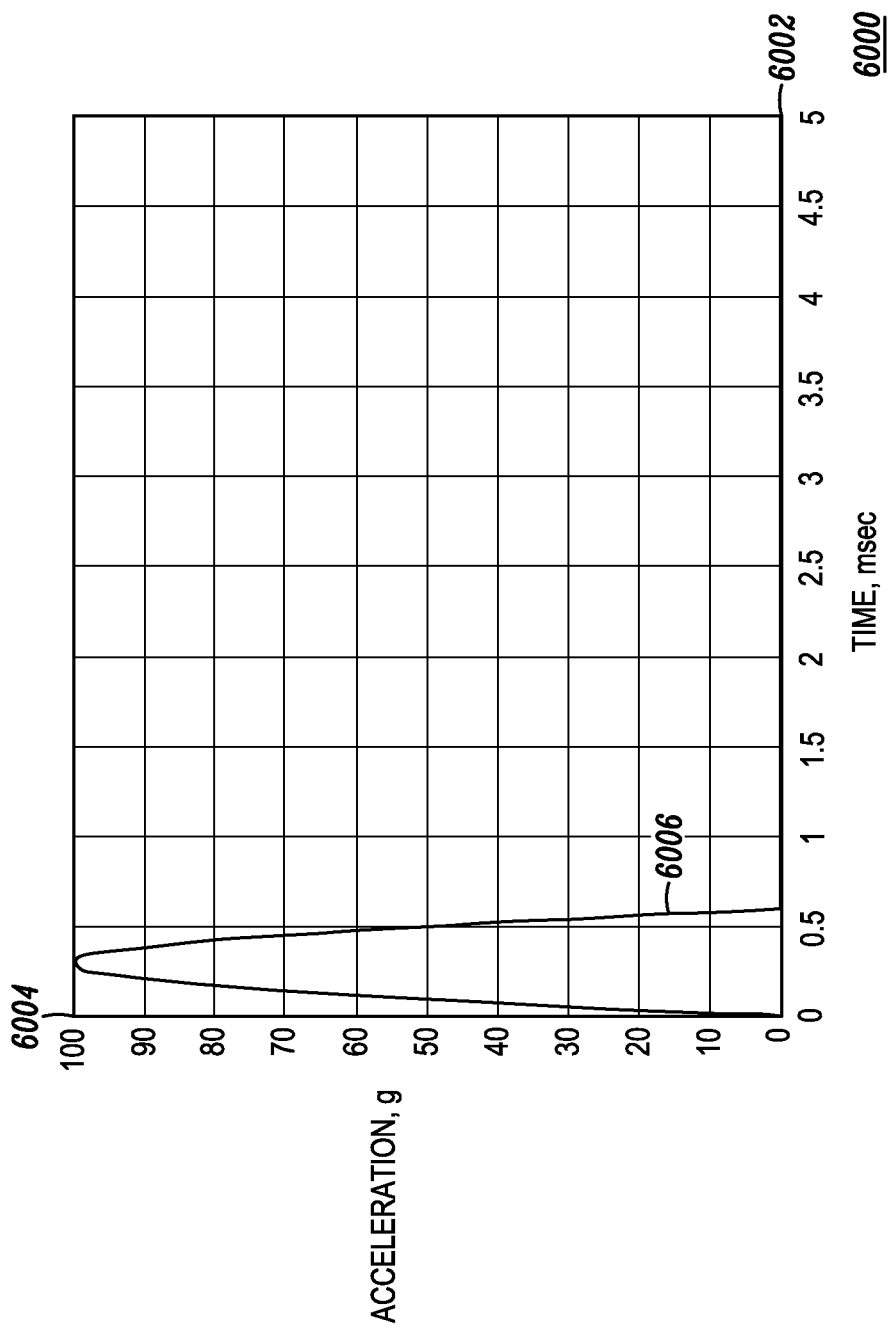
FIG. 60 illustrates a graph of a 0.6 millisecond, one hundred g half-sine z-axis shock pulse versus time which is applied to the HDA shown in FIG. 45 in accordance with the present embodiment.
Figure 61:
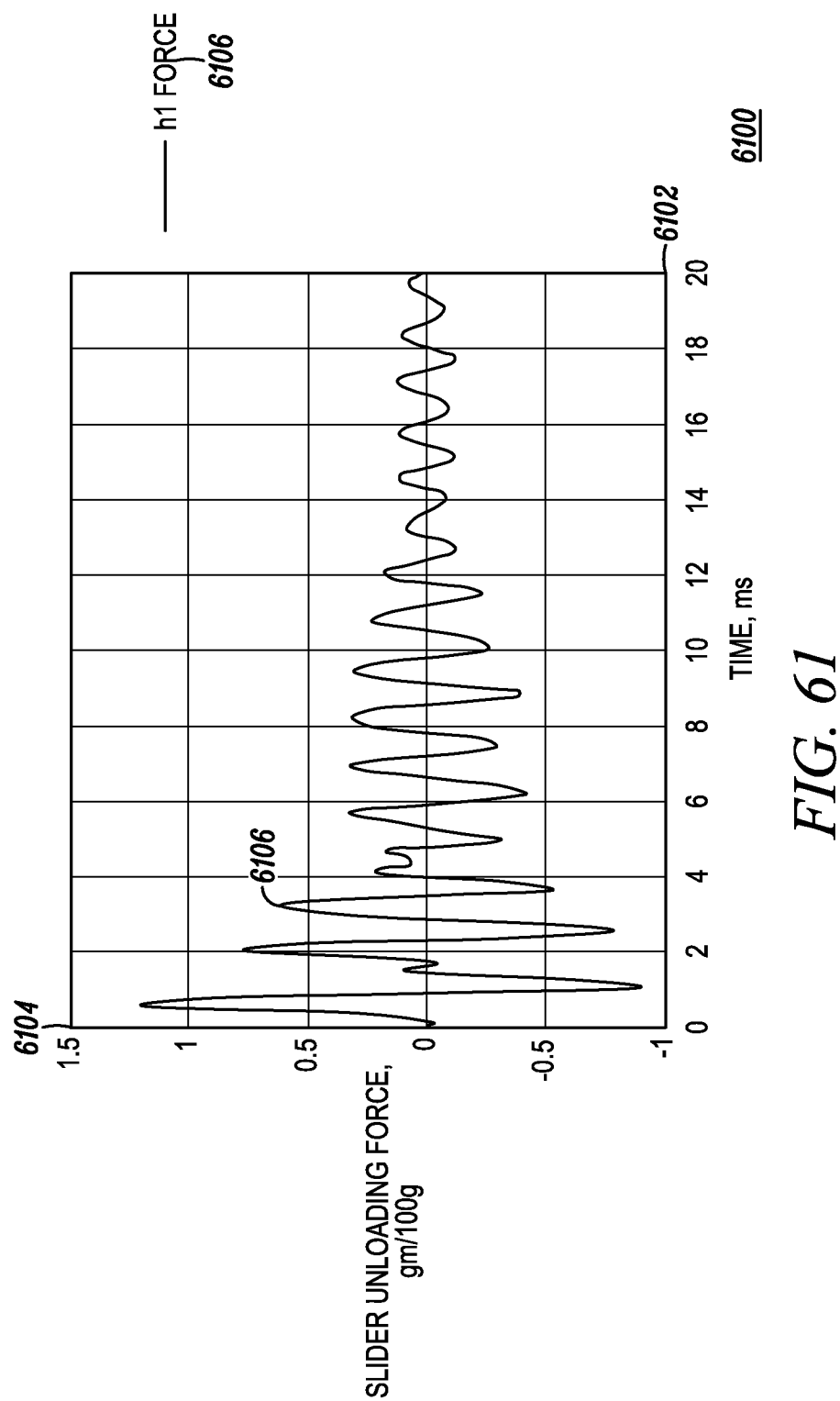
FIG. 61 illustrates a graph of slider unloading force versus time after subjection of the HDA to the 0.6 millisecond, one hundred g half-sine z-axis shock pulse of FIG. 60 in accordance with the present embodiment.

FIG. 60 illustrates a graph 6000 plotting time along an x-axis 6002 and acceleration along a y-axis 6004 of a 0.6 millisecond, one hundred g half-sine z-axis shock pulse 6006 in accordance with the present embodiment. Referring to FIG. 61, a graph 6100 of slider unloading force 6106 versus time after subjection to the 0.6 millisecond, one hundred g half-sine z-axis shock pulse 6006 (FIG. 60) in accordance with the present embodiment. Time is plotted on the x-axis 6102 and the force magnitude of the slider unloading force plotted on the y-axis 6104.

Figure 62:
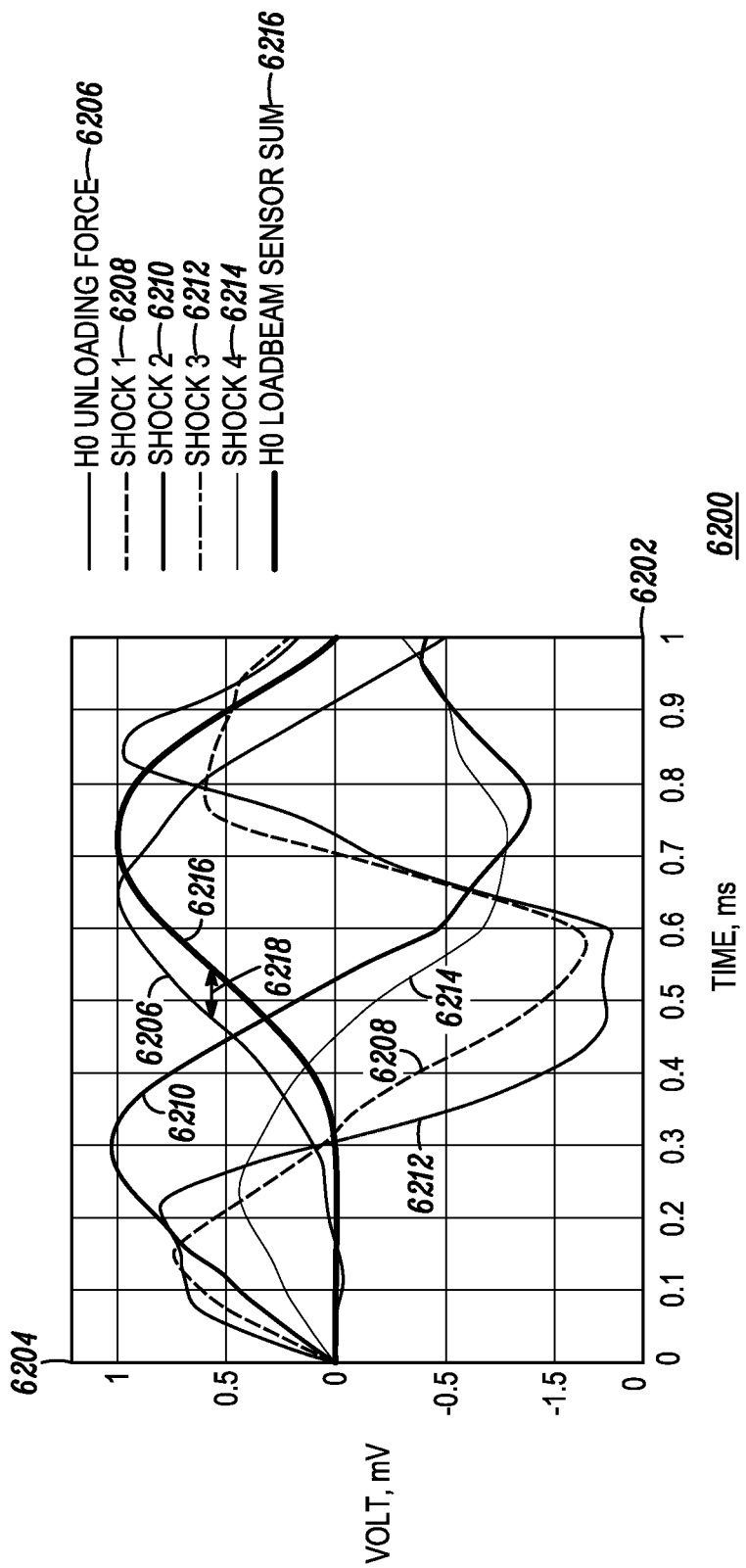
FIG. 62 illustrates a graph of unloading force, PCB shock sensor acceleration and loadbeam piezoelectric sensor voltage sum versus time after subjection to the 0.6 millisecond, one hundred g half-sine z-axis shock pulse of FIG. 60 in accordance with the present embodiment.

FIG. 62 illustrates a graph 6202 of slider unloading force, the four PCB shock sensor accelerations and loadbeam piezoelectric sensor voltage sum (all signals normalized and plotted on the y-axis 6204) versus time (plotted on the x-axis 6202) after subjection to the 0.6 millisecond, one hundred g half-sine z-axis shock pulse 6006 in accordance with the present embodiment. The four PCB shock sensor accelerations 6208, 6210, 6212, 6214 provide earlier detection of z-axis shock as evidenced by slider unloading force 6206. However, the loadbeam piezoelectric sensor signal sum 6216 more closely tracks the slider unloading force 6206, lagging by seventy-five microseconds 6218 behind the slider unloading force 6206. Thus, the loadbeam piezoelectric sensor signals can be used to detect z-axis shock force in place of or in association with one or more of the PCB shock sensors 4604, 4606, 4608, 4610.

Figure 63:
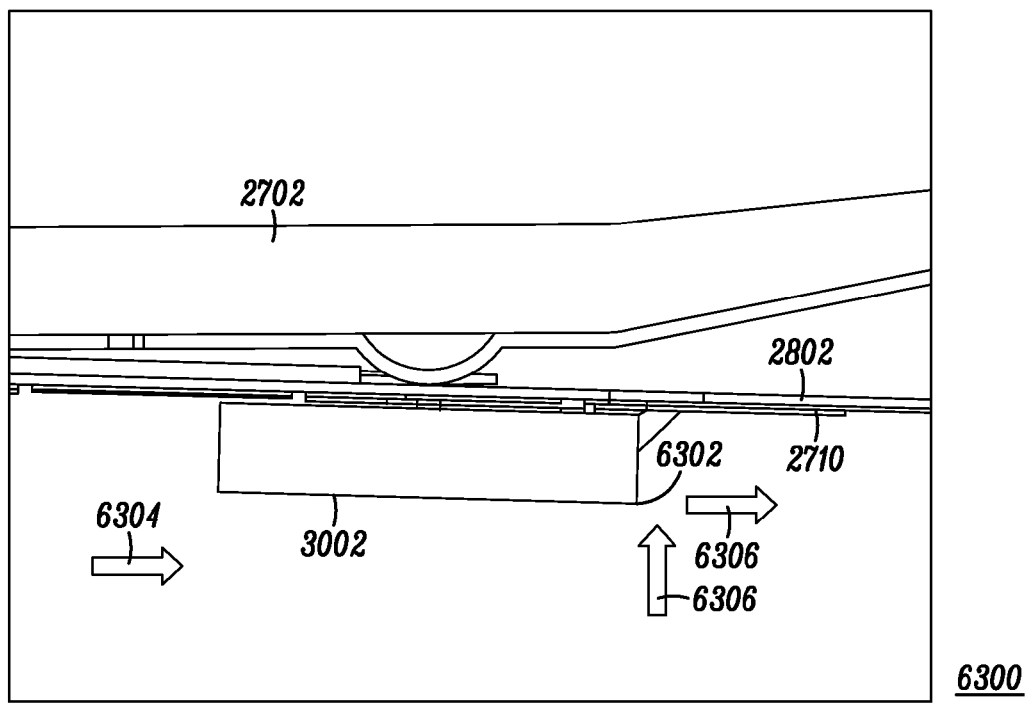
FIG. 63 depicts a side planar cross-sectional view of section of the slider and suspension highlighting disk asperity contact forces on a trailing edge of the slider in accordance with the present embodiment.

In a similar manner, one or more of the loadbeam and/or flexure piezoelectric sensors can be used for compensation or suppression of head-disk interference (HDI) such as disk asperity contact forces. FIG. 63 depicts a side planar cross-sectional view 6300 of section of the suspension 2702 and the slider 3002 highlighting disk asperity contact forces 6306 on a trailing edge 6302 of the slider 3002, the trailing edge 6302 of the slider 3002 determined in response to disk velocity 6304. Those skilled in the art will realize that disk asperities include physical imperfections in the surface of the disk media and particulate contamination that can result in a combination of vertical and horizontal disk asperity contact forces 6306 acting on the trailing edge 6302 of the slider 3002, the portion of the actuator arm assembly closest to the surface of the disk 102 when the slider 3002 is "flying" over the disk 102. Head-disk contacts that occur in the vicinity of the read-write gap, in the center of the slider trailing edge, can be sensed by temperature sensing in the gap area, however head-disk contacts occurring away from the gap area may deleteriously affect performance without being detected by the temperature sensor.

Figure 64:
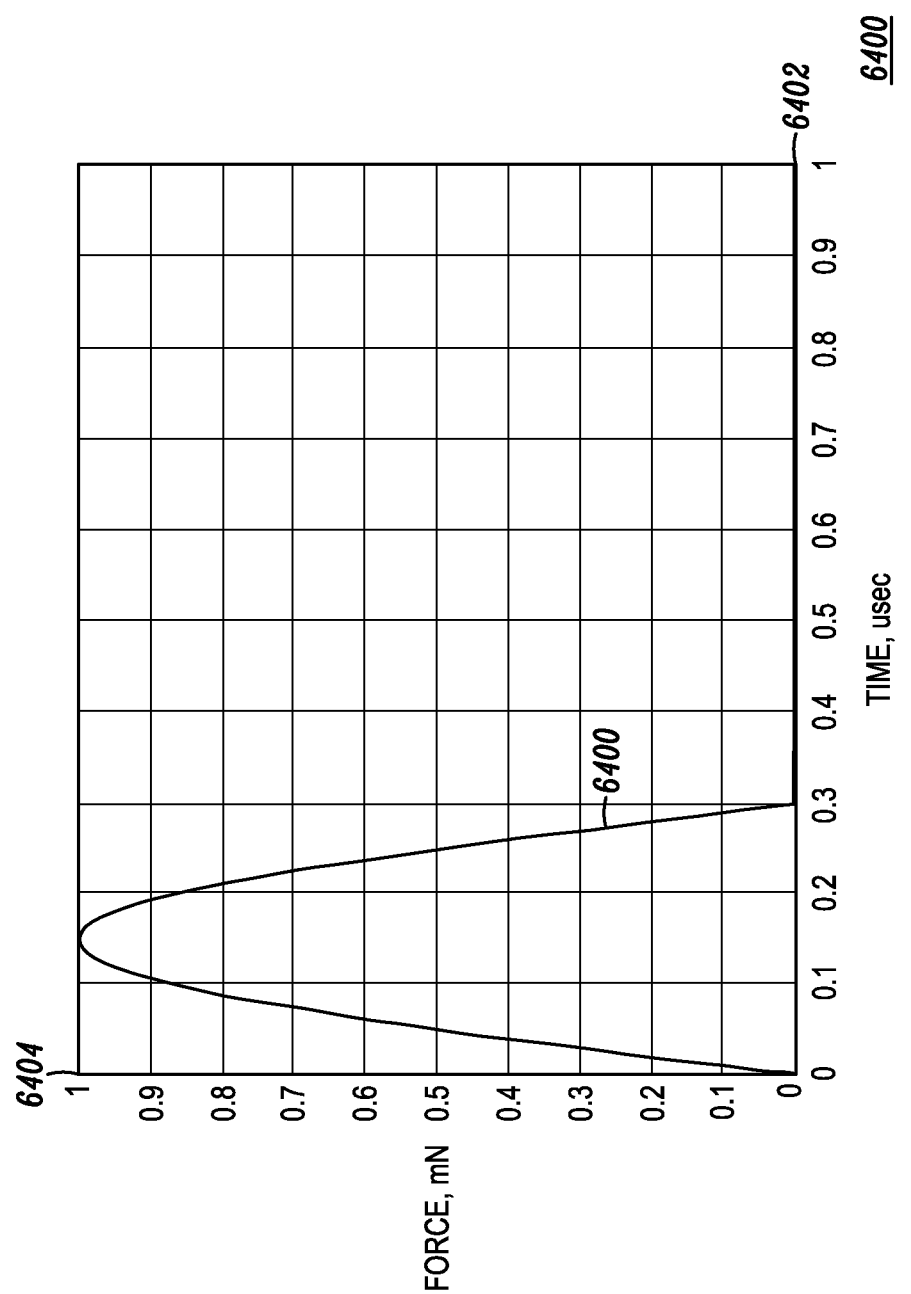
FIG. 64 illustrates a graph of a normalized disk asperity contact force versus time in accordance with the present embodiment.
Figure 65:
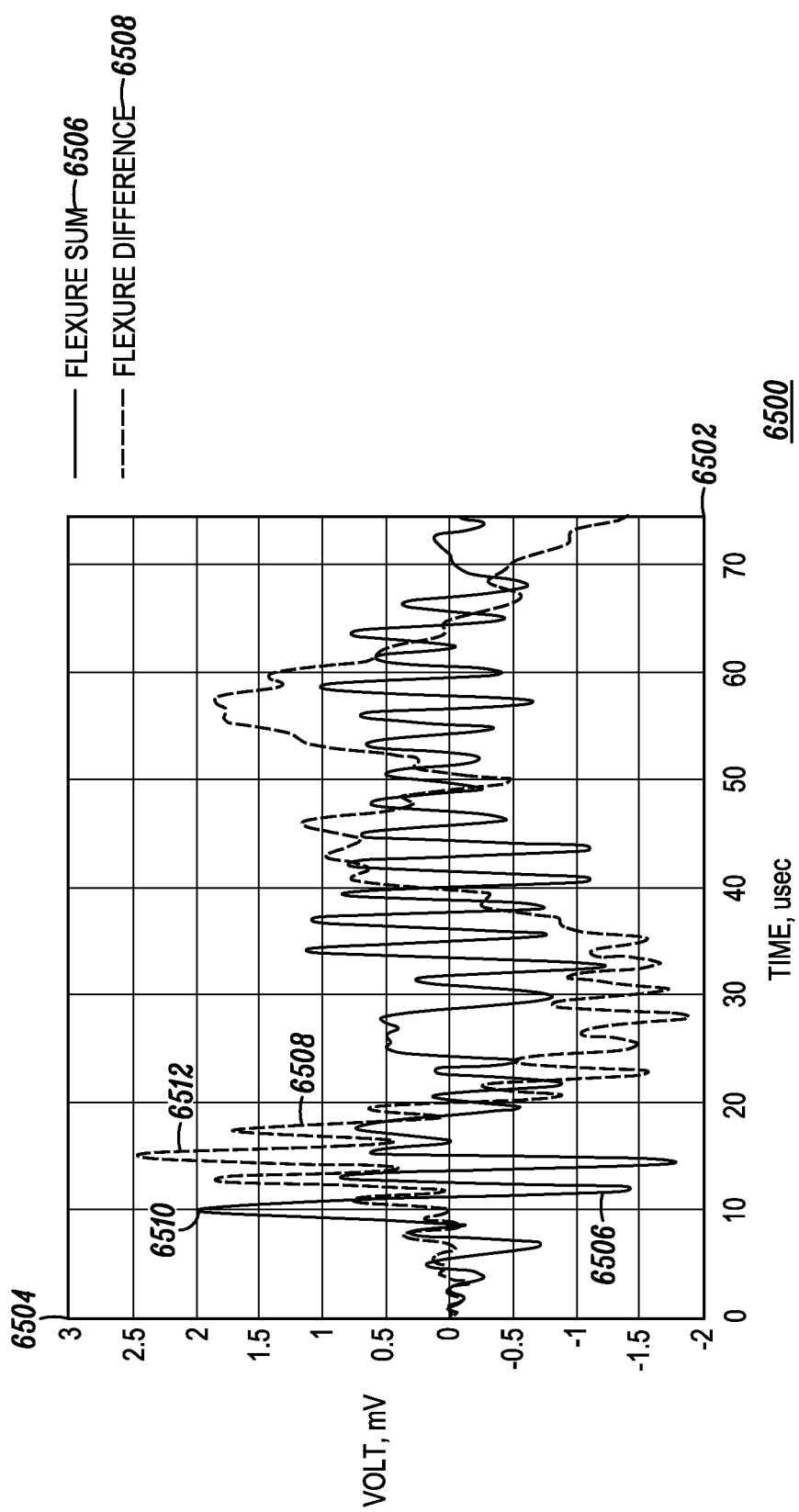
FIG. 65 illustrates a graph of sum and difference of flexure piezoelectric sensor voltages versus time for disk asperity contact in accordance with the present embodiment.
Figure 66:
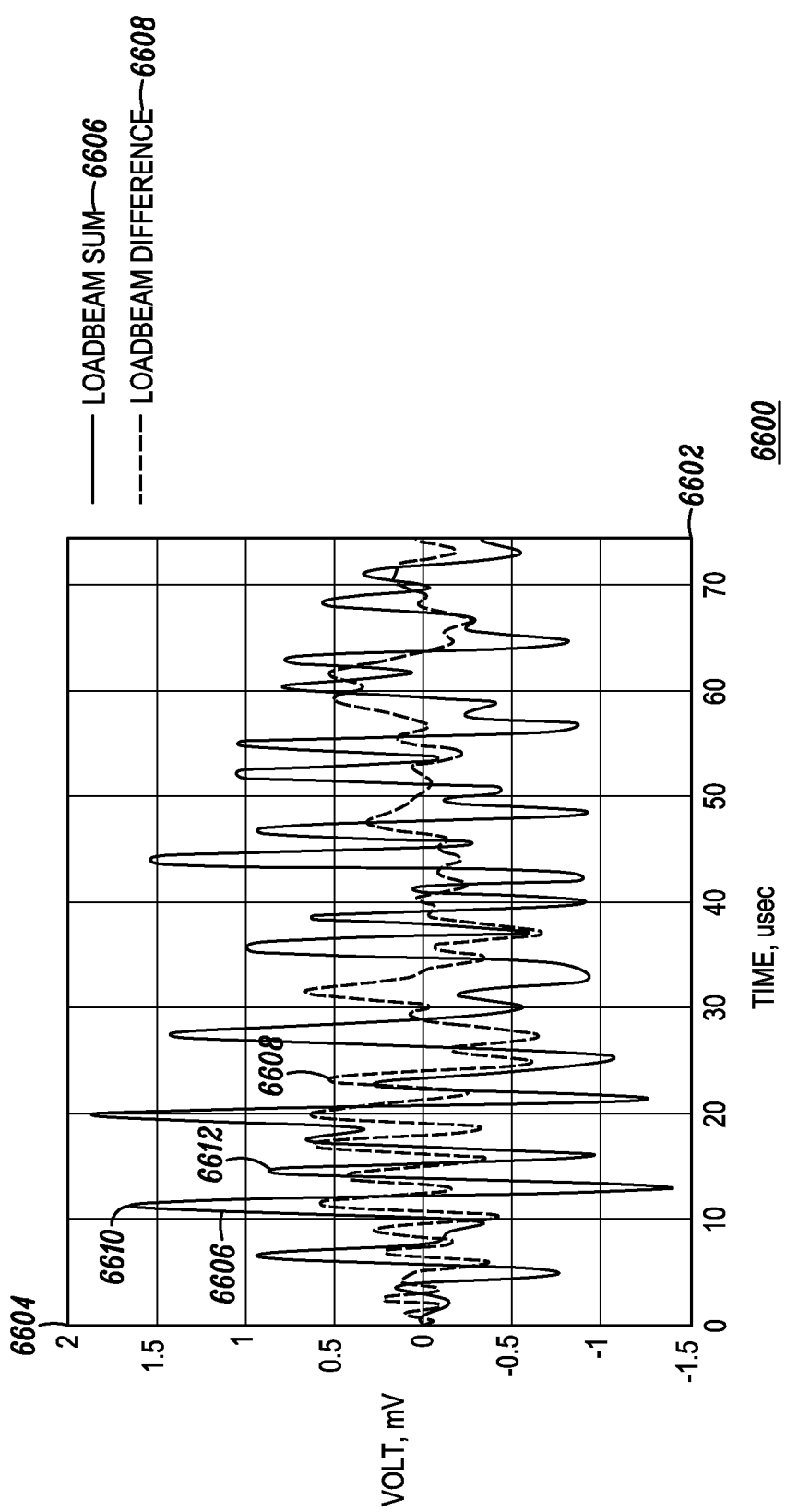
FIG. 66 illustrates a graph of sum and difference of loadbeam piezoelectric sensor voltages versus time for disk asperity measurement in accordance with the present embodiment FIG. 67, comprising

To facilitate determining the presence of HDI contacts between the slider and disk in accordance with the present embodiment, FIG. 64 illustrates a graph 6400 of a normalized disk asperity contact horizontal and vertical forces 6406 versus time having duration of 0.3 microseconds, where time is plotted on the x-axis 642 and normalized force is plotted on the y-axis 6404. FIGS. 65 and 66 illustrate graphs 6500, 6600 of sum and difference of flexure piezoelectric sensor voltages (graph 6500, summed signal 6506, difference signal 6508) and loadbeam piezoelectric sensor voltages (graph 6600, summed signal 6606, difference signal 6608) versus time for disk asperity measurements in accordance with the present embodiment. Time is plotted along x-axes 6502, 6602 and voltage is plotted along y-axes 6504, 6604. Referring to the graph 6500, the flexure piezoelectric sensor summed signal 6506 takes approximately ten microseconds to build up to point 6510 and a cycle later 6512 approximates a 350 kHz signal. Referring to the graph 6600, the loadbeam piezoelectric sensor summed signal 6606 similarly takes approximately ten microseconds to build up to point 6610 and a cycle later 6612 approximates a 350 kHz signal. The flexure and loadbeam piezoelectric sensor voltage sum and differences signals will be contaminated by lower frequency vibrations associated with the VCM, piezoelectric actuator and turbulence excitations, typically at low frequencies less than 25 khz. Since the flexure and loadbeam HDI contact output signals are an order of magnitude higher in frequency (350 khz versus 25 khz) the high-frequency HDI contact signals can be separated using high-pass filtering techniques.

Figure 67A:
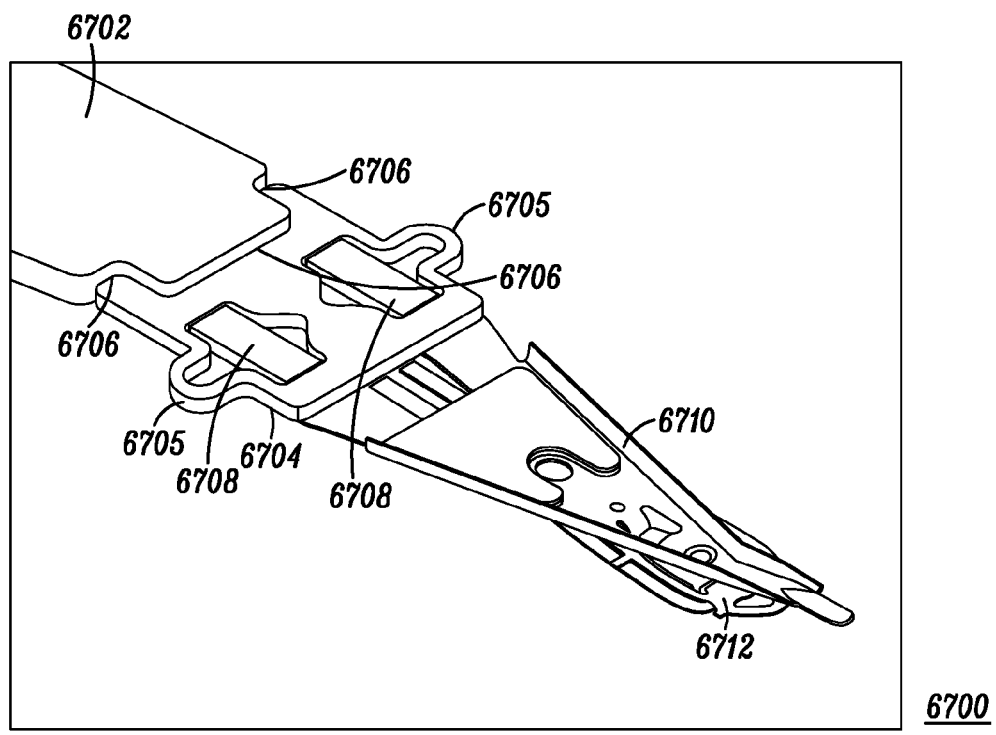
Figure 67B:
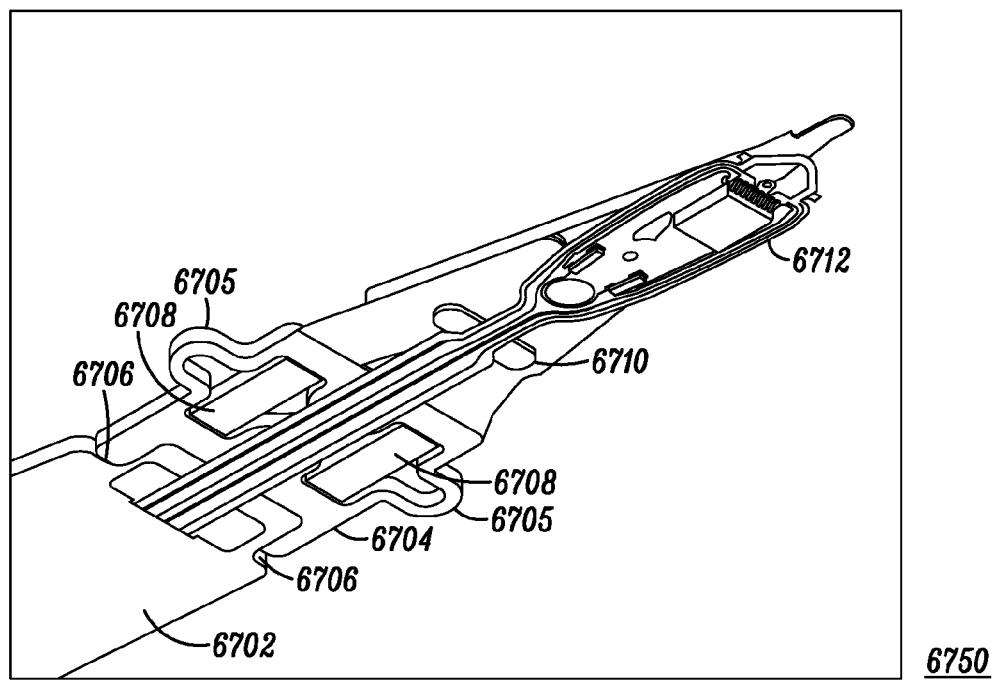

While the description hereinabove describes devices using both flexure piezoelectric sensors and loadbeam piezoelectric sensors, in accordance with an alternate embodiment, similar compensation and suppression effects can be achieved using only flexure piezoelectric sensors or only loadbeam piezoelectric sensors. FIG. 67, comprising FIGS. 67A and 67B, depicts perspective views 6700, 6750 of a micro-milliactuator in accordance with the alternate embodiment, wherein FIG. 67A is a top, front, left perspective view 6700 of the micro-milliactuator in accordance with the alternate embodiment and FIG. 67B is a bottom, front, left perspective view 6750 of the micro-milliactuator in accordance with the alternate embodiment. As can be seen from the views 6700, 6750, the mount plate 6704 is thinner than the actuator arm 6702. The mount plate 6704 thickness, width of "phi" sections 6705 and thickness and plan view size of the piezoelectric actuators 6708 are all optimized to provide a sufficiently rigid connection between the end of the unimount arm 6702 and the loadbeam 6710 while still allowing flexibility to rotate when the piezoelectric actuators 6708 are actuated. All metal parts in the design are made of stainless steel to facilitate laser welding attachments at laser weld sites 6706. The tab structure of the mount plate 6704 provides additional stiffness to the mount plate/arm connection by providing room for additional laser welds 6706.

Figure 68A:
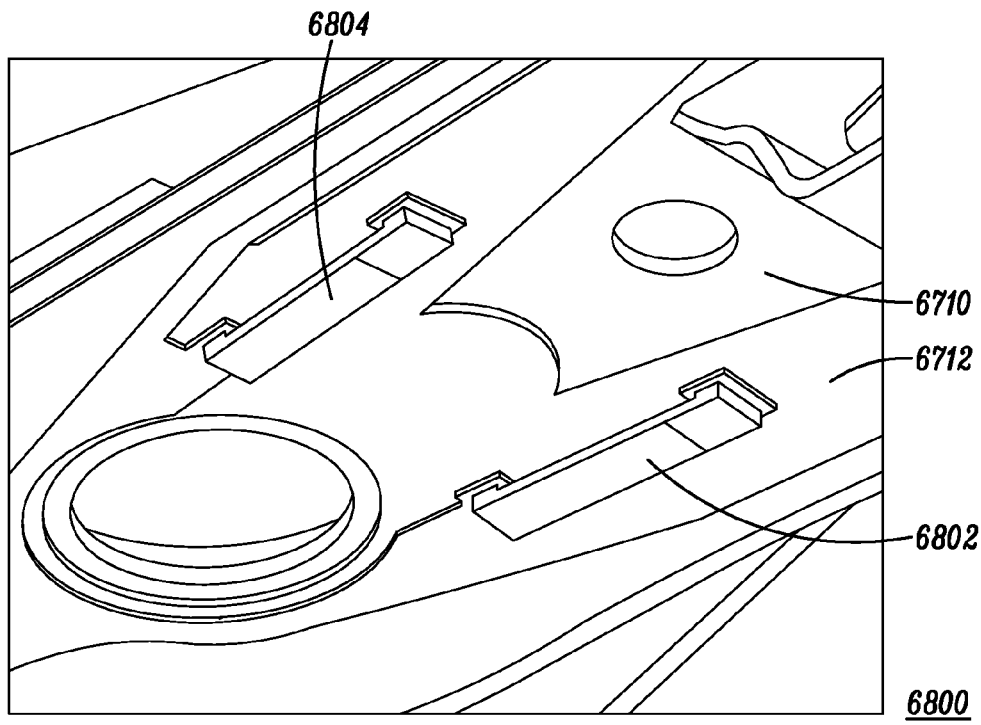
Figure 68B:
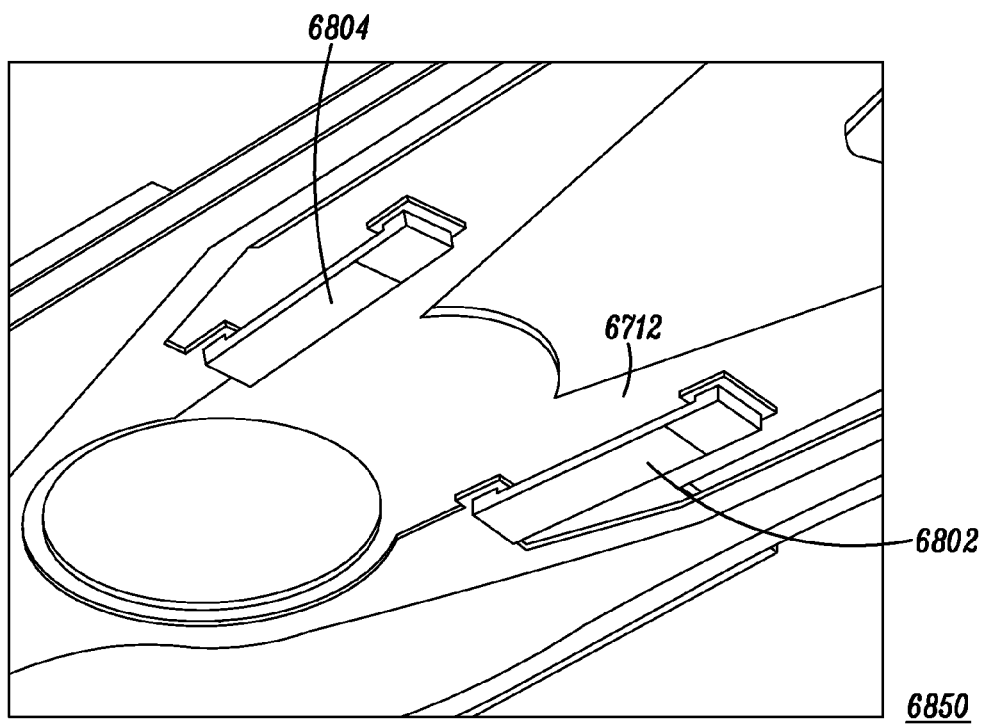

FIG. 68, comprising FIGS. 68A and 68B, depicts bottom, front, left perspective views 6800, 6850 of the micro-milliactuator focused on the piezoelectric sensors 6802, 6804 in accordance with the alternate embodiment of the present embodiment, wherein FIG. 68A is a view 6800 of the loadbeam 6710 with a flexure structure 6712 attached and FIG. 68B is a view 6850 of the flexure structure 6712 alone. The flexure structure 6712 includes a stainless steel base layer, an insulator layer, a layer of conductive traces including the piezoelectric sensors 6802, 6804, and a cover insulative layer. The flexure structure 6712 is laser welded to the loadbeam 6710. Mounting the piezoelectric sensors 6802, 6804 on the flexure structure 6712 advantageously allows for routing of the piezoelectric sensor signals to a servo system controller along with the read/write signals from/to the slider in the conductive layer of the flexure structure 6712.

The piezoelectric sensors 6802, 6804 allow for vibration mode sensing for vibration compensation and suppression during operation of a hard disk drive system. As discussed above, vibration in the hard disk drive system can come from many sources such as "swage" excitation vibrations in response to the coarse movement of the slider across the surface of the disk medium, micro-milliactuator piezoelectric actuator excitation vibrations in response to the fine movement of the slider across the surface of the disk medium and windage turbulence excitation of the unimount arm, loadbeam, flexure and the disk itself.

Figure 69:
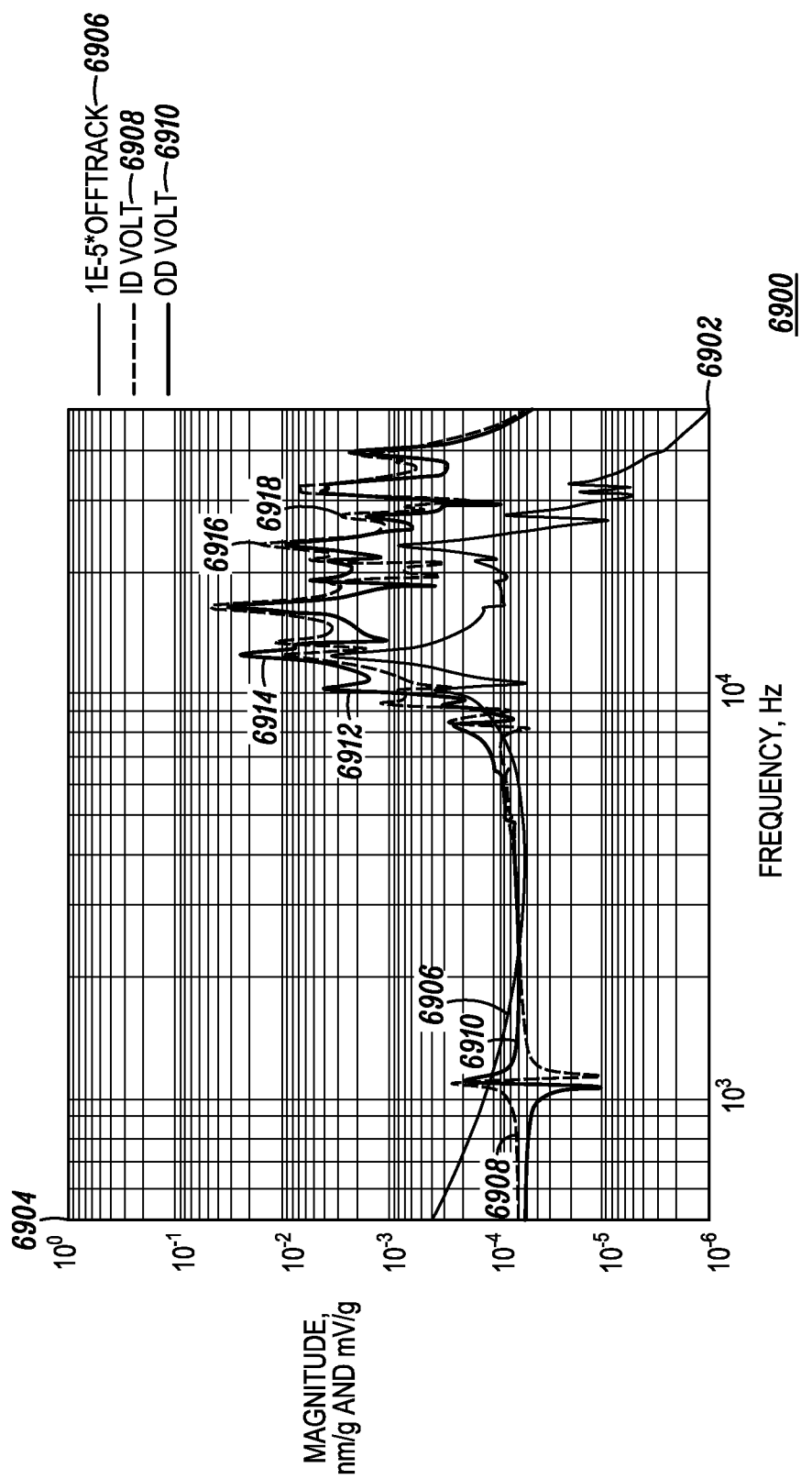
FIG. 69 illustrates a graph of unimount arm swage excitation offtrack overlaid with signals from the flexure piezoelectric sensors of the micro-milliactuator in accordance with the alternate embodiment of FIG. 67.

FIG. 69 illustrates a graph 6900 of swage excitation resonance overlaid with signals from the flexure sensors of the micro-milliactuator in accordance with the alternate embodiment. The swage excitation offtrack signal 6906 is plotted along with the inner diameter and outer diameter sensor signals 6908, 6910 from the inner diameter and the outer diameter piezoelectric sensors 6802, 6804. As seen from the graph 6900, the piezoelectric sensors 6802, 6804 can sense resonances excited during swage translation or actuator rotation, particularly actuator arm torsion 6912 (i.e., rotation) and sway modes 6914 (i.e., lateral movement), and loadbeam torsion 6916 and sway modes 6918.

Figure 70:
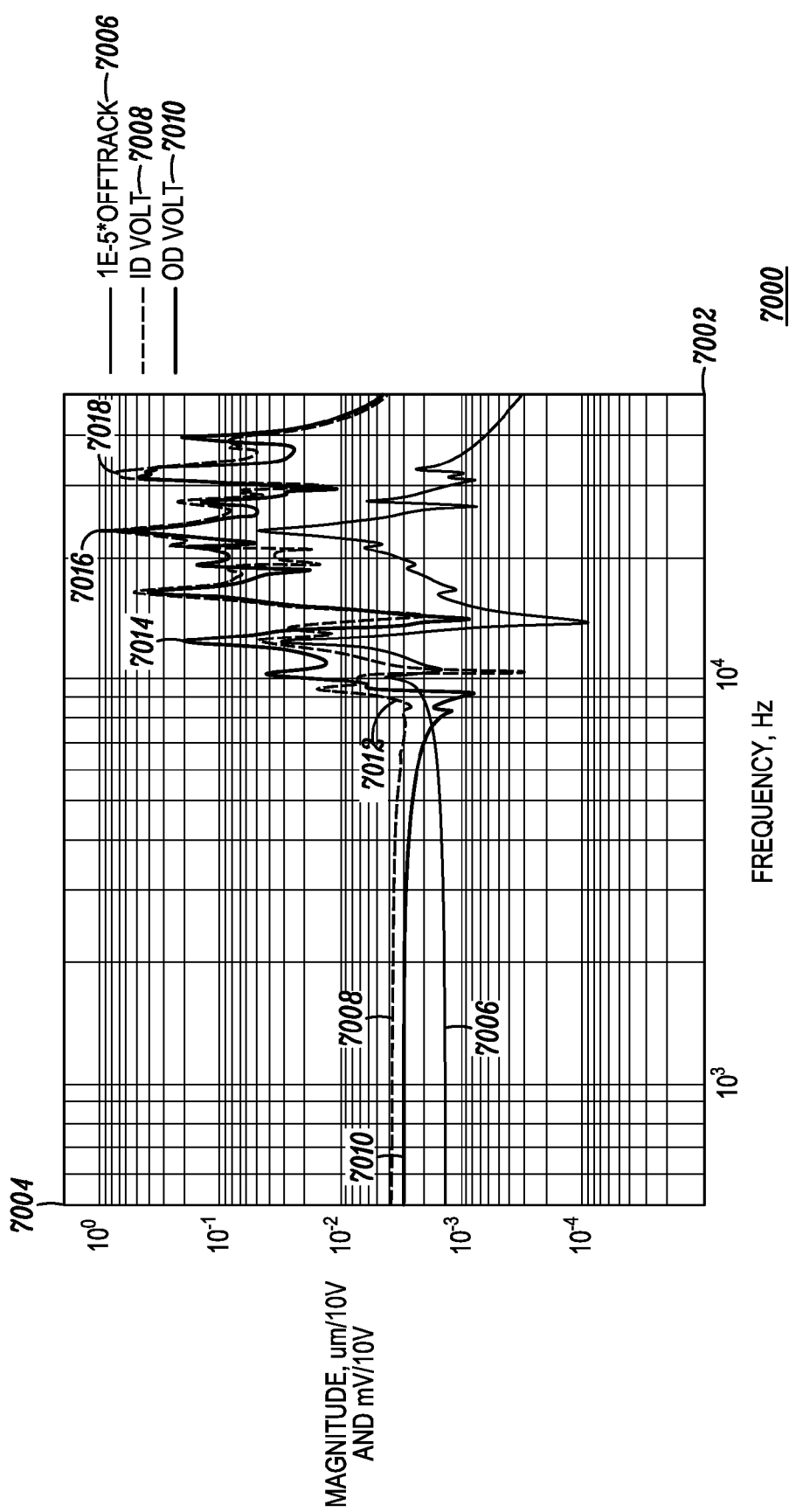
FIG. 70 illustrates a graph of unimount arm piezoelectric actuator excitation offtrack overlaid with voltages from the flexure piezoelectric sensors of the micro-milliactuator in accordance with the alternate embodiment of FIG. 67.

FIG. 70 illustrates a graph 7000 of piezoelectric excitation resonance offtrack 7006 overlaid with signals 7008, 7010 from the flexure sensors 6802, 6804 of the micro-milliactuator in accordance with the alternate embodiment. Note that the piezoelectric excitation is from the two piezoelectric actuators 6708 used to move the loadbeam 6710, not the piezoelectric sensors 6802, 6804. As seen from the graph 7000, the piezoelectric sensors 6802, 6804 can sense modes excited by piezoelectric excitation, particularly arm torsion and sway modes 7012, 7014, and from loadbeam torsion and sway modes 7016, 7018.

Figure 71:
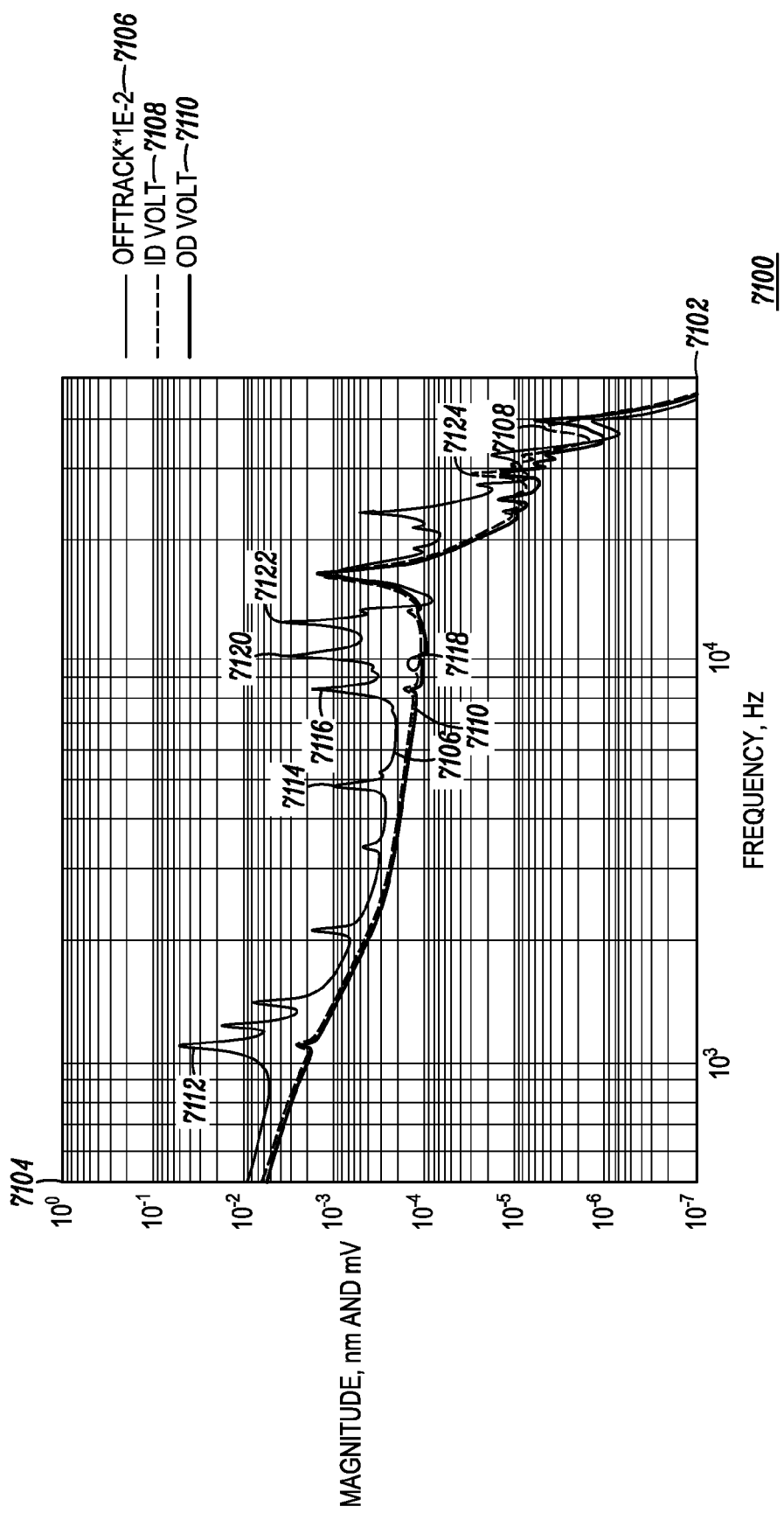
FIG. 71 depicts a graph of unimount arm turbulence excitation offtrack overlaid with voltages from the flexure piezoelectric sensors of the micro-milliactuator in accordance with the alternate embodiment of FIG. 67.

FIG. 71 depicts a graph 7100 of turbulence excitation resonance offtrack 7106 overlaid with signals 7108, 7110 from the flexure piezoelectric sensors 6802, 6804 in accordance with the alternate embodiment. Unlike the piezoelectric sensor 6802, 6804 responses to swage and milliactuator PZT excitations (the graph 6900 and the graph 7000), only one major mode of vibration excited by turbulence is able to be sensed, the flexure leg bending/torsion modes 7112 (an arm first bending mode), 7114 (a unimount second bending mode), 7116 (a first bending arm torsion mode), 7118 (a first torsion mode), 7120 (a suspension/arm second bending mode), 7122 (a flexure leg bending/torsion mode), and 7124 (a flexure trace bending mode). Since this mode can be sensed, the servo system can be used to improve performance.

Thus, novel apparati and methods for vibration sensing, compensation and suppression to improve the accuracy of track following in hard disk drives for both micro-milliactuators and micro-microactuators has been shown and described which provides reduced inertia, increased rigidity and vibration compensation and suppression capability, as well as providing a hard disk drive system which allows more precise location control of the read/write head enabling use of disk media with greater storage capability.

While several exemplary embodiments have been presented in the foregoing detailed description of the invention, it should be appreciated that a vast number of variations exist, including variations as to the structures formed through varying manufacturing parameters or hierarchical structure shapes and sizes. It should further be appreciated that the exemplary embodiments are only examples, and are not intended to limit the scope, applicability, dimensions, or configuration of the invention in any way. Rather, the foregoing detailed description will provide those skilled in the art with a convenient road map for implementing an exemplary embodiment of the invention, it being understood that various changes may be made in the function and arrangement of elements and method of fabrication described in an exemplary embodiment without departing from the scope of the invention as set forth in the appended claims

What is claimed is:

1. A micro-milliactuator comprising:
 a piezoelectric actuator mount plate including one or more side tabs for enabling attachment of the piezoelectric actuator mount plate to an actuator arm;
 one or more piezoelectric actuators mounted to the piezoelectric actuator mount plate and rotating the micro-milliactuator in response to control signals;
 a suspension load beam coupled to the piezoelectric actuator mount plate at a first end and capable of mounting a slider at a second end opposite the first end;
 a suspension flexure physically coupled to the suspension load beam and carrying a plurality of conductive traces, wherein some of the plurality of conductive traces provide data signals via flexure legs to the slider; and
 one or more sensors coupled to the suspension flexure and the suspension load beam for vibration compensation and suppression, the one or more sensors generating sensor signals in response to sensed vibrations during operation and providing the sensor signals to corresponding ones of the plurality of conductive traces for generation of the control signals, the control signals comprising voice coil motor coarse control signals and micro-milliactuator fine control signals,
 wherein the one or more sensors comprise one or more load beam piezoelectric sensors coupled to the suspension load beam for sensing load beam strain on the suspension load beam,
 wherein the suspension load beam comprises a load beam weld at one end of each of the one or more load beam piezoelectric sensors for coupling the load beam strain in the suspension load beam to stretching of the one or more load beam piezoelectric sensors, and
 wherein the suspension load beam further comprises a load beam slot located over and perpendicular to each of the one or more load beam piezoelectric sensors for coupling the load beam strain to stretching of the one or more load beam piezoelectric sensors.

2. The micro-milliactuator in accordance with claim 1 wherein the one or more sensors further comprise one or more flexure piezoelectric sensors coupled to the suspension flexure for sensing strain on the flexure legs of the suspension flexure, the strain on the flexure legs comprising bending of the flexure legs.

3. The micro-milliactuator in accordance with claim 2 wherein the one or more flexure piezoelectric sensors comprise one or more of an inner diameter flexure piezoelectric sensor and an outer diameter flexure piezoelectric sensor.

4. The micro-milliactuator in accordance with claim 1 wherein the one or more load beam piezoelectric sensors comprise one or more of an inner diameter load beam piezoelectric sensor and an outer diameter load beam piezoelectric sensor.

5. The micro-milliactuator in accordance with claim 1 wherein the suspension load beam comprises a load beam damper for dampening vibrations in the suspension load beam.

6. The micro-milliactuator in accordance with claim 1 wherein the one or more side tabs enable laser weld attachment of the piezoelectric actuator mount plate to the actuator arm.

7. The micro-milliactuator of claim 1, wherein the actuator arm is one of (i) a unimount arm and (ii) an E-block arm.

8. An actuator arm assembly comprising:
an arm;
a slider for reading and writing information to disk media in response to data signals;
a fine actuator comprising a micro-milliactuator, the fine actuator mounting the slider above the disk media and comprising one or more piezoelectric actuators for translating or rotating the slider in response to fine actuator control signals, wherein the fine actuator further comprises one or more sensors physically coupled thereto for vibration compensation and suppression, the one or more sensors generating sensor signals in response to sensed vibrations during operation, the fine actuator control signals generated at least partially in response to the sensor signals,
wherein the fine actuator further comprises a piezoelectric actuator mount plate coupled to the arm and having the one or more piezoelectric actuators mounted thereon, the piezoelectric actuator mount plate including one or more side tabs for enabling attachment of the piezoelectric actuator mount plate to the arm; and
a suspension load beam coupled to the piezoelectric actuator mount plate at a first end and capable of mounting the slider at a second end opposite the first end;
wherein the one or more sensors comprise one or more load beam piezoelectric sensors coupled to the suspension load beam for sensing load beam strain on the suspension load beam,
wherein the suspension load beam comprises a load beam weld at one end of each of the one or more load beam piezoelectric sensors for coupling the load beam strain in the suspension load beam to stretching of the one or more load beam piezoelectric sensors, and
wherein the suspension load beam further comprises a load beam slot located over and perpendicular to each of the one or more load beam piezoelectric sensors for coupling the load beam strain to stretching of the one or more load beam piezoelectric sensors.

9. The actuator arm assembly in accordance with claim 8 wherein the arm is one of a unimount arm and an E- block arm.

10. The actuator arm assembly in accordance with claim 8 further comprising:
a suspension flexure physically coupled to the suspension load beam and carrying a plurality of conductive traces, wherein some of the plurality of conductive traces provide the data signals via flexure legs of the suspension flexure to the slider,
and wherein the one or more sensors further comprise one or more flexure piezoelectric sensors coupled to the suspension flexure for sensing strain on the flexure legs of the suspension flexure.

11. The actuator arm assembly in accordance with claim 10 wherein the one or more flexure piezoelectric sensors comprise one or more of an inner diameter flexure piezoelectric sensor and an outer diameter flexure piezoelectric sensor.

12. The actuator arm assembly in accordance with claim 8 wherein the one or more load beam piezoelectric sensors comprise one or more of an inner diameter load beam piezoelectric sensor and an outer diameter load beam piezoelectric sensor.

13. The actuator arm assembly in accordance with claim 8 wherein the suspension load beam comprises a load beam damper for dampening vibrations in the suspension load beam.

14. The actuator arm assembly in accordance with claim 8 wherein the one or more side tabs that enable laser weld attachment of the piezoelectric actuator mount plate to the arm.

15. A hard disk drive comprising:
a disk media for storing information on tracks identified thereon;
a motor for rotating the disk media;
an actuator arm assembly comprising an arm, a slider, a suspension load beam, and a fine actuator comprising a micro-milliactuator, the fine actuator mounting the slider above the disk media, the slider locatable above an identified one of the tracks (i) in response to coarse control signals controlling a rotating coil coupled to the actuator assembly for rotating the actuator assembly and (ii) in response to fine control signals controlling translation or rotation of the slider by activating one or more piezoelectric actuators; and
a controller for generating the coarse control signals and the fine control signals in response to location information corresponding to the identified one of the tracks and sensor signals received from one or more sensors physically coupled to the actuator assembly for vibration compensation and suppression, the sensor signals generated in response to vibrations sensed by the one or more sensors during operation of the hard disk drive,
wherein the fine actuator comprises the one or more sensors and a piezoelectric actuator mount plate, the piezoelectric actuator mount plate (i) having the one or more piezoelectric actuators mounted thereon and (ii) including one or more side tabs for enabling attachment of the piezoelectric actuator mount plate to the arm,
wherein the one or more sensors comprise one or more load beam piezoelectric sensors coupled to the suspension load beam for sensing load beam strain on the suspension load beam,
wherein the suspension load beam is coupled to the piezoelectric actuator mount plate at a first end and capable of mounting the slider at a second end opposite the first end,
wherein the suspension load beam comprises a load beam weld at one end of each of the one or more load beam piezoelectric sensors for coupling the load beam strain in the suspension load beam to stretching of the one or more load beam piezoelectric sensors, and
wherein the suspension load beam further comprises a load beam slot located over and perpendicular to each of the one or more load beam piezoelectric sensors for coupling the load beam strain to stretching of the one or more load beam piezoelectric sensors.

16. The hard disk drive in accordance with claim 15 wherein the rotating coil comprises a voice motor coil.

17. The hard disk drive in accordance with claim 15 wherein the actuator arm assembly further comprises:
a suspension flexure physically coupled to the suspension load beam and carrying a plurality of conductive traces, wherein some of the plurality of conductive traces provide data signals via flexure legs of the suspension flexure to the slider, and
wherein the one or more sensors further comprise one or more flexure piezoelectric sensors coupled to the suspension flexure for sensing strain on the flexure legs of the suspension flexure, the one or more sensors generating the sensor signals in response to the vibrations sensed thereby and providing them to the controller via associated ones of the plurality of conductive traces.

18. The hard disk drive in accordance with claim 15 wherein the vibration sensed by the one or more sensors comprise one or more of actuator arm vibrations resulting from excitation of the rotating coil, actuator arm vibrations resulting from excitation of the one or more piezoelectric actuators, actuator arm vibrations resulting from turbulence between the actuator arm assembly and the disk media, actuator arm vibrations resulting from z-axis shock force to the hard disk drive, and actuator arm vibrations resulting from hard disk interference between the actuator arm assembly and the disk media.

19. A method for controlling a hard disk drive actuator assembly comprising:
    determining location information corresponding to a location on a disk media for performing a read or write operation;
    generating coarse and fine actuator control signals for locating a slider mounted on the actuator assembly above an identified track of the disk media in response to the location information;
    providing motor control signals to a motor coupled to the disk media for rotating the disk media; and
    providing the (i) coarse and (ii) fine actuator control signals to the actuator assembly for (i) rotation of the actuator assembly by a rotating coil and (ii) rotation or translation of the slider by one or more piezoelectric actuators, respectively, the coarse and fine actuator control signals modified during operation of the actuator assembly in response to sensor signals for vibration compensation and/or suppression, the sensor signals received from one or more sensors physically coupled to the actuator assembly for sensing vibrations during operation, the one or more piezoelectric actuators being mounted on a piezoelectric actuator mount plate that includes one or more side tabs for enabling attachment of the piezoelectric actuator mount plate to an arm of the actuator assembly,
    the one or more sensors comprising one or more load beam piezoelectric sensors coupled to a suspension load beam for sensing load beam strain on the suspension load beam, the suspension load beam being coupled to the piezoelectric actuator mount plate at a first end and capable of mounting the slider at a second end opposite the first end, and the suspension load beam comprising: (i) a load beam weld at one end of each of the one or more load beam piezoelectric sensors for coupling the load beam strain in the suspension load beam to stretching of the one or more load beam piezoelectric sensors; and (ii) a load beam slot located over and perpendicular to each of the one or more load beam piezoelectric sensors for coupling the load beam strain to stretching of the one or more load beam piezoelectric sensors.

20. The method in accordance with claim 19 wherein the one or more sensors comprise at least one pair of piezoelectric sensors, each of a pair of the at least one pair of piezoelectric sensors being located horizontally across the actuator assembly from one another, and wherein providing the coarse and fine actuator control signals to the actuator assembly comprises modifying the coarse and fine actuator control signals during operation of the actuator assembly in response to a sum of sensor signals from one or more pairs of the at least one pair of piezoelectric sensors for compensation and/or suppression of actuator assembly bending vibration modes.

21. The method in accordance with claim 19 wherein the one or more sensors comprise at least one pair of piezoelectric sensors, each of a pair of the at least one pair of piezoelectric sensors being located horizontally across the actuator assembly from one another, and wherein providing the coarse and fine actuator control signals to the actuator assembly comprises modifying the coarse and fine actuator control signals during operation of the actuator assembly in response to a difference of sensor signals from one or more pairs of the at least one pair of piezoelectric sensors for compensation and/or suppression of actuator assembly torsion vibration modes.

22. A micro-milliactuator comprising:
    a piezoelectric actuator mount plate;
    one or more piezoelectric actuators mounted in the piezoelectric actuator mount plate and rotating the micro-milliactuator in response to control signals;
    a suspension load beam coupled to the piezoelectric actuator mount plate at a first end and capable of mounting a slider at a second end opposite the first end;
    a suspension flexure physically coupled to the suspension load beam and carrying a plurality of conductive traces, wherein some of the plurality of conductive traces provide data signals via flexure legs to the slider; and
    one or more sensors coupled to the suspension flexure and the suspension load beam for vibration compensation and suppression, the one or more sensors generating sensor signals in response to sensed vibrations during operation and providing the sensor signals to corresponding ones of the plurality of conductive traces for generation of the control signals, the control signals comprising voice coil motor coarse control signals and micro-milliactuator fine control signals,
    wherein the one or more sensors comprise one or more load beam piezoelectric sensors coupled to the suspension load beam for sensing load beam strain on the suspension load beam,
    wherein the suspension load beam comprises a load beam weld at one end of each of the one or more load beam piezoelectric sensors for coupling the load beam strain in the suspension load beam to stretching of the one or more load beam piezoelectric sensors, and
    wherein the suspension load beam further comprises a load beam slot located over and perpendicular to each of the one or more load beam piezoelectric sensors for further coupling the load beam strain to stretching of the one or more load beam piezoelectric sensors.

* * * * *

UNITED STATES PATENT AND TRADEMARK OFFICE
CERTIFICATE OF CORRECTION

| | | |
|---|---|---|
| PATENT NO. | : 9,437,230 B2 | Page 1 of 1 |
| APPLICATION NO. | : 14/082784 | |
| DATED | : September 6, 2016 | |
| INVENTOR(S) | : Michael Hatch | |

It is certified that error appears in the above-identified patent and that said Letters Patent is hereby corrected as shown below:

Title Page, Item (54) and in the Specification, Column 1, before "AND METHOD OF OPERATION OF MICRO-MILLIACTUATORS AND MICRO-MICROACTUATORS" insert --DESIGN--

Signed and Sealed this
Twenty-fifth Day of October, 2016

Michelle K. Lee
*Director of the United States Patent and Trademark Office*